US005233172A

United States Patent [19]

Chadima, Jr. et al.

[11] Patent Number: 5,233,172

[45] **Date of Patent: * Aug. 3, 1993**

[54] INSTANT PORTABLE BAR CODE READER

[75] Inventors: George E. Chadima, Jr., Cedar Rapids, Iowa; Vadim Laser, Cincinnati, Ohio

[73] Assignee: Norand Corporation, Cedar Rapids, Iowa

[ * ] Notice: The portion of the term of this patent subsequent to Feb. 11, 2003 has been disclaimed.

[21] Appl. No.: 572,898

[22] Filed: Aug. 24, 1990

Related U.S. Application Data

[60] Division of Ser. No. 464,849, Jan. 16, 1990, abandoned, which is a division of Ser. No. 339,953, Apr. 18, 1989, Pat. No. 4,894,523, and Ser. No. 418,884, Oct. 10, 1989, abandoned, which is a division of Ser. No. 339,953, Apr. 18, 1989, Pat. No. 4,894,523, which is a continuation of Ser. No. 234,880, Aug. 19, 1988, abandoned, which is a division of Ser. No. 827,286, Feb. 7, 1986, Pat. No. 4,766,300, which is a continuation of Ser. No. 637,693, Aug. 6, 1994, Pat. No. 4,570,057, which is a continuation of Ser. No. 334,811, Dec. 28, 1981, abandoned.

[51] Int. Cl.[5] .......... G06K 7/10

[52] U.S. Cl. .......... 235/472; 235/462

[58] Field of Search .......... 235/462, 463–467, 235/470, 472

[56] References Cited

U.S. PATENT DOCUMENTS

| | | | |
|---|---|---|---|
| 3,991,299 | 11/1976 | Chadima, Jr. et al. . | |
| 4,096,992 | 6/1978 | Nojiri et al. | 235/462 |
| 4,115,703 | 9/1978 | Dobras | 235/472 |
| 4,140,271 | 2/1979 | Nojiri et al. | 235/440 |
| 4,158,194 | 6/1979 | McWaters et al. | 235/454 X |
| 4,210,802 | 7/1980 | Sakai | 235/462 X |
| 4,251,798 | 2/1981 | Swartz et al. | 235/472 X |
| 4,282,425 | 8/1981 | Chadima, Jr. et al. | 235/462 |
| 4,387,297 | 6/1983 | Swartz et al. | 235/462 |
| 4,570,057 | 2/1986 | Chadima, Jr. et al. | 235/472 |
| 4,593,186 | 6/1986 | Swartz et al. | 235/472 |
| 4,652,750 | 3/1987 | Eastman et al. | 235/472 |
| 4,818,856 | 4/1989 | Matsushima et al. . | |
| 4,841,129 | 6/1989 | Tawara et al. . | |
| 4,894,523 | 1/1990 | Chadima, Jr. et al. | 235/472 |
| 5,021,642 | 6/1991 | Chadima, Jr. et al. | 235/472 |

*Primary Examiner*—Stuart S. Levy
*Assistant Examiner*—Joseph A. Rhoa
*Attorney, Agent, or Firm*—McAndrews, Held & Malloy, Ltd.

[57] ABSTRACT

In an exemplary embodiment, a hand held bar code reader has a handle portion and a reader head portion which may be held spaced from a bar code data carrier during a reading operation. Light energy is directed outwardly through a window so as to illuminate a bar code sensing region in front of the window having a depth dimension of at least about ten millimeters, and an optical system focuses bar code patterns in the sensing region onto an image photosensor in the reader unit with a resolution so as to read e.g. bar code formats with a minimum bar or space width of about 0.0075 inch or less. The bar code image is converged through a generally rectangular optical aperture and is reflected onto the image photosensor by a reflecting mirror positioned relative to the image photosensor by virtue of their common association with a printed circuit board.

36 Claims, 7 Drawing Sheets

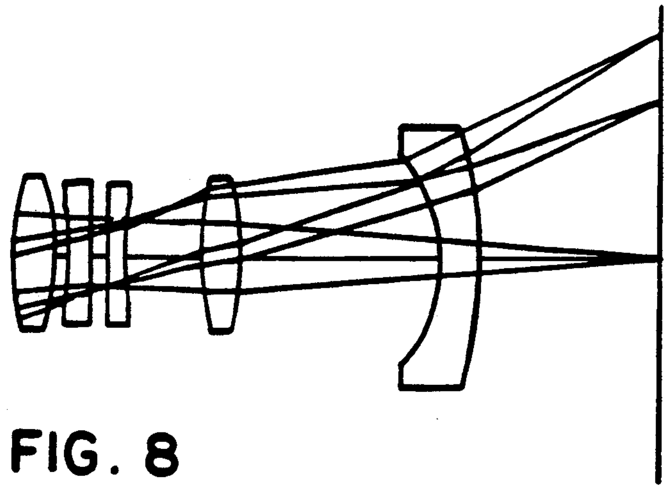
FIG. 8
FIG. 9
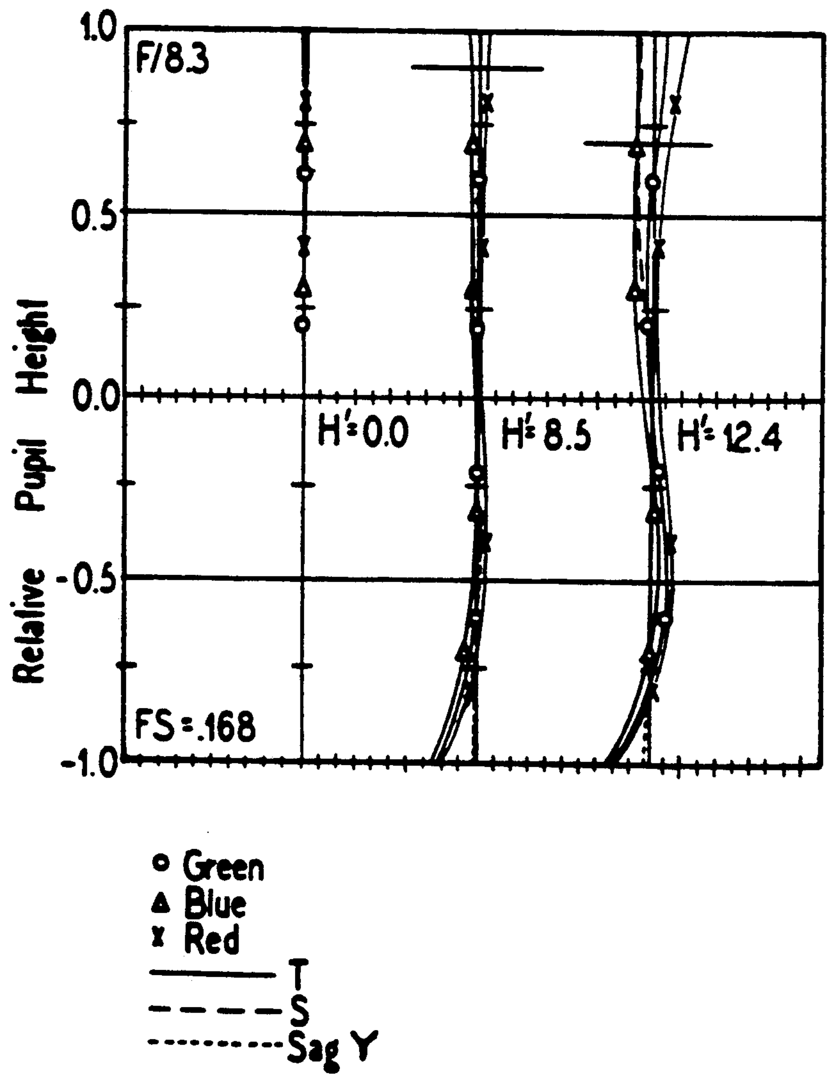

INSTANT PORTABLE BAR CODE READER

CROSS-REFERENCE TO RELATED APPLICATIONS

This is a division of our pending application Ser. No. 07/464,849 filed Jan. 16, 1990, now abandoned. Said application Ser. No. 07/464,849 is a division of our application Ser. No. 07/339,953 filed Apr. 18, 1989, now U.S. Pat. No. 4,894,523 issued Jan. 16, 1990, and also of our pending application Ser. No. 07/418,884 filed Oct. 10, 1989 (now abandoned). Said application Ser. No. 07/418,884 is a division of said application Ser. No. 07/339,953. Said application Ser. No. 07/339,953 is a continuation of our application Ser. No. 07/234,880 filed Aug. 19, 1988 (now abandoned). Said application Ser. No. 07/234,880 is in turn a division of our application Ser. No. 06/827,286 filed Feb. 7, 1986, now U.S. Pat. No. 4,766,300 issued Aug. 23, 1988. Said application Ser. No. 06/827,286 is a continuation of our prior application U.S. Ser. No. 06/637,693 filed Aug. 6, 1984, now U.S. Pat. No. 4,570,057 issued Feb. 11, 1986. Said application Ser. No. 06/637,693 is in turn a continuation of our earlier application Ser. No. 06/334,811 filed Dec. 28, 1981, now abandoned.

SUMMARY OF THE INVENTION

The present invention, in one important aspect, is directed to the provision of a particularly facile and effective hand held reader unit for the instantaneous reading of complete bar code patterns of curved or irregular configuration, and comprising an optical system which accomodates itself to a compact and rugged, yet lightweight construction capable of economical manufacture.

In another aspect, the invention provides a high speed bar code reader system and method which is capable of reading a complete bar code pattern as an entity for computer processing without requiring the reader unit to be moved during the read-in operation; such system and method being further optimized by the provision of a flash illuminator of special configuration for providing a particularly uniform obliquely directed light output over the full depth of the optical field of the reader lens system, and by the provision of a lens system which is adjusted in its spectral response and stop aperture characteristics so as to achieve a high resolution and accuracy over a sufficient depth of field to read high density bar patterns with marked curvature or surface irregularity.

It is therefore an important object of the invention to provide a portable instant bar code reader and method providing improved optical characteristics.

Another object resides in the provision of a bar code reader system and method exhibiting an improved flash type illuminator.

It is also an object of the invention to provide a portable instant bar code reader system and method wherein the optical and electronic construction are interrelated so as to provide for quick-repeat, more accurately focussed reading where an initial reading is ineffective because of marginal reading conditions or the like.

Still another object resides in the provision of a hand held bar code scanner having novel electronic, optical and structural features adapted to the implementation of the various objects set forth above.

Features of the invention include the provision of a reader unit with a wide field of view and substantial focal depth, which yet has a narrow hand grip configuration, and a compact optical system; an optics system which accomodates a single unitary circuit board configuration, a rigid lens mounting arrangement which furthers the achievement of a precise and reliable optical system with a dust and moisture proof enclosure and substantial impact resistance; and an optical system providing an optical field of extended depth coupled with an optimum focus at a selected close up position and electronics for signalling an inaccurate reading and automatically repeating the read operation if necessary as the operator adjusts the unit toward the optimum reading position until a valid reading is achieved.

These and other features, objects and advantages of the present invention will be understood in greater detail from the drawings and the following description wherein reference numerals illustrate a preferred embodiment.

BRIEF DESCRIPTION OF THE DRAWINGS

FIG. 8 is a somewhat diagrammatic view illustrating the basic optics of the illustrated embodiment and showing the lens arrangement generally in the plane of FIG. 3;

FIG. 9 is a plot illustrating lateral aberrations for the system of FIGS. 1 through 8;

DETAILED DESCRIPTION

Figure 1:
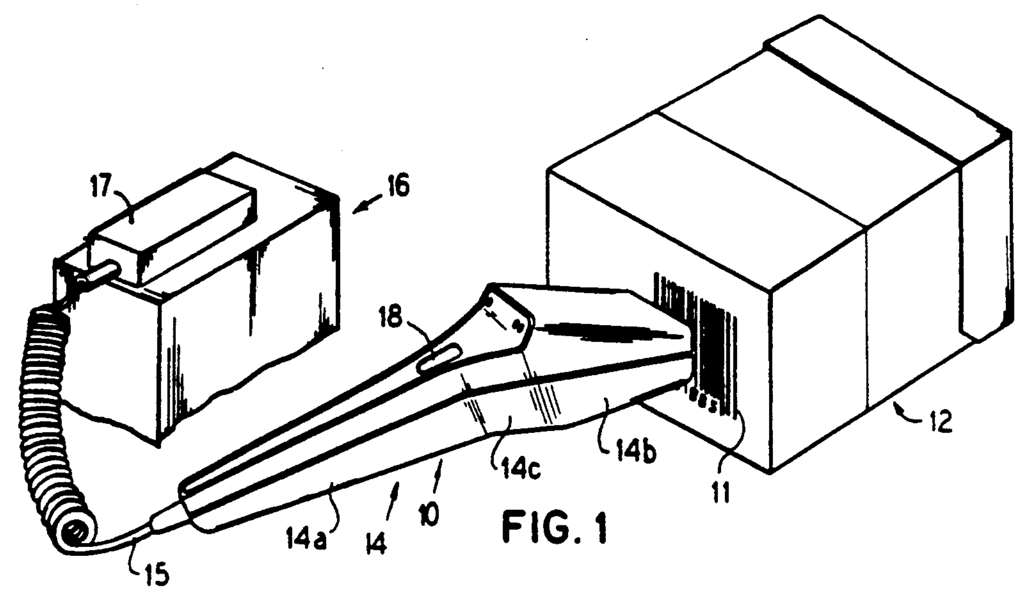
FIG. 1 is a somewhat diagrammatic perspective view illustrating a hand-held reader unit and associated components in operative reading association with a bar code pattern on a container.

Referring to FIG. 1 there is illustrated an overall bar code reader system in accordance with the present invention, and showing a hand-held reader unit 10 in scanning relation to a bar code pattern 11 associated with a product container 12. By way of example, the bar pattern 11 may be formed in accordance with the universal product code and may have a length of 65 millimeters. Various other bar code types are known in the art, such as EAN, CODBAR, CODE 39, INTERLEAVED 2/5, etc.

The hand-held unit is shown as comprising a case 14 including a portion 14a of a size to be gripped by the user, a head portion 14b for containing the reading optics and a connecting portion 14c integrally connecting the hand-grip portion 14a with the optical reading head portion 14b. The head portion 14b has a width so as to be operative to receive a sufficient portion of the bar pattern 11 so as to completely read the same while the head portion 14b is in essentially stationary relationship to the bar pattern 11. Thus, the head portion 14b may have an overall width of 3.0 inches and may have an overall height dimension of one inch. On the other hand, the hand grip portion 14a may taper from an overall width of about one and one-half inches adjacent the intermediate portion 14c to a width of about 0.828 inch at its rear end. The height dimension of the hand grip portion 14a may likewise taper slightly from the intermediate portion toward the rear end portion, from a height dimension of about one and one-quarter inches to about three-quarter inches. The lower margins such as 14d of the hand grip portion 14a are smoothly rounded for example with a radius of curvature of 0.46 inch, the bottom wall of the hand grip portion 14a being formed on a radius of 5.00 inch in the transverse direction so as to enhance the comfort with which the hand grip portion can be grasped. The forward portion of the hand grip portion 14a has a perimeter such that the thumb and first finger of the hand are normally overlapping or touching during handling of the reader unit 10.

With the reader unit 10 resting on a horizontal surface, the intermediate portion 14c will have a separation of approximately three-eighth inch above the horizontal surface, while the top surface 14e of the head portion 14b will extend at a pronounced acute angle to the horizontal which facilitates observation of the bar code pattern as the unit 10 is placed in scanning relation thereto by the user. For example, with the unit 10 resting on a horizontal surface, the upper surface 14e of the head portion 14b may be inclined at an angle of 25° to the horizontal.

The length of the hand grip portion 14a may be about four inches so as to be comparable to the width of the hand when placed in comfortable gripping relation to the unit 10. The overall length of the head portion 14b with the unit 10 resting on a horizontal surface may be about two and one quarter inches measured in a horizontal direction.

A cable 15 is indicated as connecting the unit 10 with host equipment 16 via a suitable link or interface 17. For the case of portable equipment, unit 16 may include a battery, and link 17 may include a battery operated high voltage power supply as well as suitable signal interface circuitry. In this way the complete system of FIG. 1 may be completely portable, without requiring any connecting wires to stationary equipment.

The reader unit 10 may have a weight of eight ounces, an overall length of 7.38 inches, an overall width of 2.63 inches, and a thickness generally of one inch except at a raised section 14f at the rear end of the head portion 14b.

An important feature of the unit 10 of FIG. 1 relates to the provision of a hand-held reader configuration whereby the unit can be readily manipulated in all degrees of freedom and be held at a desired angular relationship to a product container or the like with the four fingers and palm of the hand while the thumb of the user is utilized to depress an operating button 18 located centrally of the top surface of the unit and at the forward end of the hand grip portion 14a. While with the illustrated embodiment a complete reading of the bar pattern 11 takes place in an extremely brief instant, a stable gripping of the hand-held unit during operation is still desirable for the sake of comfort and to minimize fatigue over an extended period of use.

While the bar code pattern 11 is shown on a flat planar surface, it is significant that the reader unit 10 is also effective with curved or irregularly shaped labels. Thus, the bar code pattern 11 may be read even though it extends along a curved surface having a radius of curvature of 1.25 inches, for example. Such a label with a 1.25 inch of curvature and with a length dimension of 1.8 inches requires reading of a field with a depth of about 0.4 inch, for example. Thus, certain portions of the bar code pattern 11 may be in direct contact with the operative end of the unit 10 while other portions of the bar code pattern may be spaced by distances of up to 0.4 inch. The illustrated unit is thus effective in reading bar code patterns applied about the curved perimeter of cylindrical containers such as cans, as well as bar code patterns applied to flexible bag type containers and the like.

DESCRIPTION OF FIGS. 2 AND 3

Figure 2:
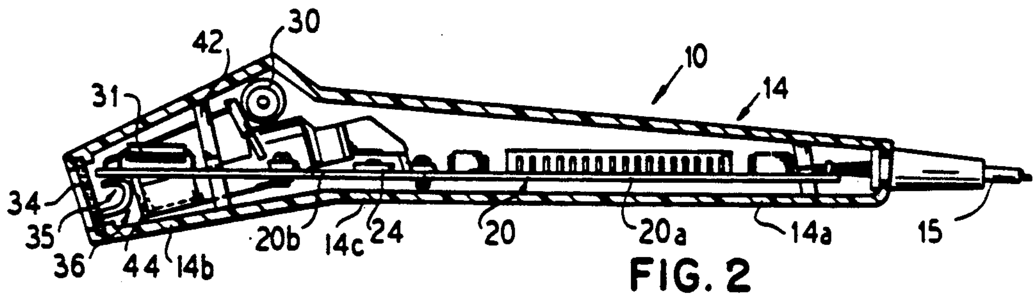
FIG. 2 is a somewhat diagrammatic longitudinal sectional view showing the general layout and configuration of the reader unit of FIG. 1.
Figure 3:
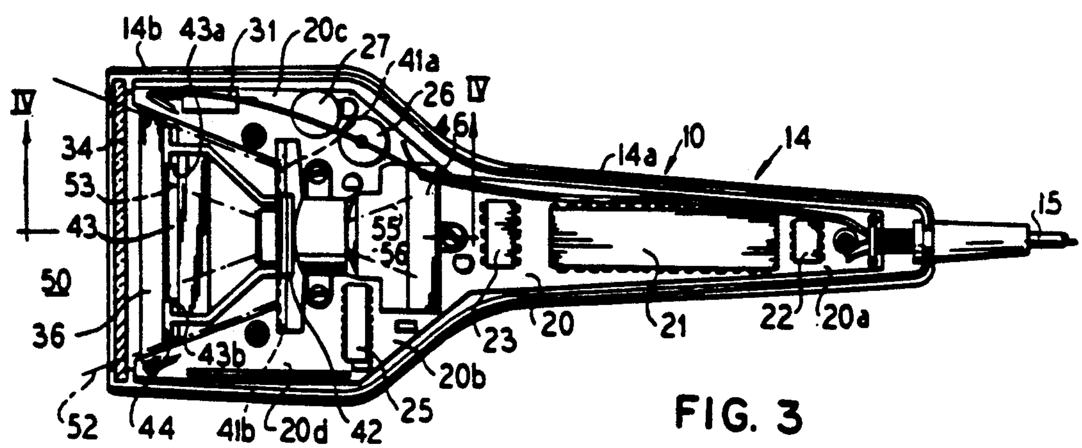
FIG. 3 is a somewhat diagrammatic plan view of the reader unit of FIG. 2 with a top casing part removed and internal components diagrammatically indicated.

FIG. 2 is a longitudinal sectional view of the hand-held reader unit 10 of FIG. 1 illustrating the arrangement of parts therein; and FIG. 3 is a plan view of the reader unit 10 with an upper section of the case 14 removed to show the layout of parts internally of the unit. These views show a printed circuit board 20 having a rear section 20a with a microcomputer integrated circuit pack 21, a bidirectional line driver integrated circuit pack 22, and an analog switch integrated circuit pack 23, for example. Referring to FIG. 2, an intermediate portion 20b of the circuit board 20 carries centrally thereof a photodetector integrated circuit pack 24. As seen in FIG. 3, the intermediate portion 20b of the circuit board carries other components such as an operational amplifier pack 25, a "beeper" component 26 and a transformer 27. In FIG. 2 at a forward portion of the casing 14, a flash energy storage capacitor assembly is physically designated by reference numeral 30, and a triggering capacitor is indicated physically by reference numeral 31. As seen in FIG. 3, the forward portion of the circuit board 20 is separated into two finger portions 20c and 20d arranged at the lateral margins of the case portion 14b.

Figure 5:
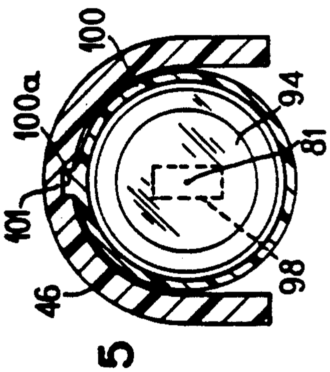
FIG. 5 is a somewhat diagrammatic, cross-sectional view taken along the line V—V of FIG. 4.
Figure 6:
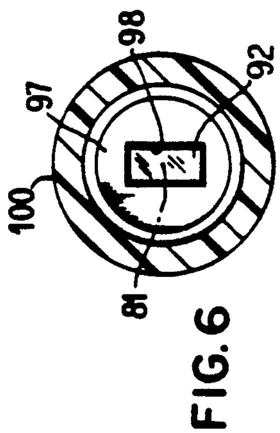
FIG. 6 is a somewhat diagrammatic, cross-sectional view taken along the line VI—VI in FIG. 4.

At the extreme forward end of the casing 14 is an optical window 34 which serves for the optical coupling of the unit 10 with a bar code pattern such as indicated at 11 in FIG. 1. Adjacent a lower portion of window 34 is a flash reflector 35 forming a part of a reading light source assembly 36, shown in further detail in FIG. 4. The light source 36 serves to project a sheet of light through the window 34 for flooding a sensing region of substantial depth in front of the window 34, in which region the bar code pattern 11, FIG. 1, is to be located. The light reflected by a bar code pattern in the sensing region is reflected back through the window 34 so as to impinge on a first mirror 41 of a mirror assembly 42. Light incident upon the mirror 41 is reflected forwardly toward a second mirror 43 of a second mirror assembly 44. From the second mirror 43, light from the sensing region is directed rearwardly into an optical housing 46. The optical housing 46 together with the mirror mounts 42 and 44 are parts of a unitary optical framework which rigidly mounts all of the optical parts including mirrors 41 and 43 and the other optical components including an infrared rejecting filter 47. Further details of the optical system will be apparent from the following description of FIGS. 4–6.

Referring to FIGS. 2 and 3, the width dimension of the reflector 35 of light source 36 may be approximately 2.29 inches, so as to effectively illuminate a sensing region in front of the optical window 34 which may have an extent of about 2.5 inches directly in front of the optical window 34 and an extent of about 2.7 inches at a depth of one inch in front of the window 34. Thus, the total width of the image field may be taken as approximately 65 millimeters at a distance of approximately four millimeters from the center line of the optical window 34. Thus, as viewed in FIG. 3, the marginal rays of the light image entering the unit 10 through the window 34 from the sensing region and converging on the first mirror 41 may each form an angle of convergence relative to a central longitudinal axis of the optical system having a value in the range from about ten degrees to about twenty degrees. Thus, as viewed in FIG. 3, a sensing region 50 in front of the optical window 34 may be defined by marginal light, rays such as indicated at 51 and 52 which are directed through the optical window 34 and converge toward the respective lateral margins of the first mirror 41. The width of the sensing region 50 may be at least fifty millimeters, and the depth of the sensing region 50 may be at least about three millimeters, and preferably at least about ten millimeters. The optical system should be effective to focus the bar code pattern 11, FIG. 1, onto the photodetector 24 for positions within the sensing field 50 with a resolution of at least about forty line pairs per millimeter for an angle of convergence of each marginal ray 51, 52 of about fifteen degrees relative to the central longitudinal axis of the optics as viewed in FIG. 3. This corresponds to resolving bars having a width dimension in the direction of high resolution of about 125 microns (five mils, one mil equals 0.001 inch).

The first mirror 41 may have a length dimension of about 1.6 inches, while the second mirror 43 may have a length dimension of about 1.2 inches, for example. The lateral margins of the first mirror 41 are indicated at 41*a* and 41*b* in FIG. 3, while the lateral margins of the mirror 43 are indicated at 43*a* and 43*b* in FIG. 3. The marginal light rays as reflected from the mirror 43 toward the filter 47 are indicated at 53 and 54 in FIG. 3. The further margins of the light energy from the sensing region as it passes through the lenses of the optical system are indicated by the dash lines 55 and 56 in FIG. 3. As will be described particularly with reference to FIG. 6 hereafter, the light energy transmitted by the optical system is converged so as to pass through an aperture with a width in the high resolution direction of the bar code pattern 11 with a dimension of about two millimeters, for example, For the illustrated embodiment, the light energy from the sensing region 50 after passing through the narrow optical aperture within the housing 46, diverges over a substantial distance and comes to a focus at a light sensing region of the photodetector 24 having a dimension in the high resolution direction of 26 millimeters, for example, the image from the bar code region 50 being focused in inverted relation onto the light sensitive region of the photodetector 24.

The infrared filter 47 may serve to essentially block infrared radiation having a wave length greater than about 700 nanometers. It is considered that better contrast is obtained by filtering the infrared portion of the light spectrum entering the window 34 from the sensing region 50. Further, it is considered that improved resolution is obtained over the desired depth of the sensing region 50 because of the presence of the infrared filter 47.

The optical window 34 may have a thickness of about 2.5 millimeters and be of a tempered glass material so as to be readily cleaned while resisting breakage. The image of the bar code pattern may be focused onto the light sensitive region of the photodetector 24 through a quartz window having a thickness of 0.5 millimeter and across an air gap of 1.14 millimeter, for example. Thus, the ratio of the length of the image at the bar code sensing region 50 to the length of the focussed image at the light sensitive region of the photodetector 24 may be about 2.5, for example.

DESCRIPTION OF FIGS. 4, 5 AND 6

Figure 4:
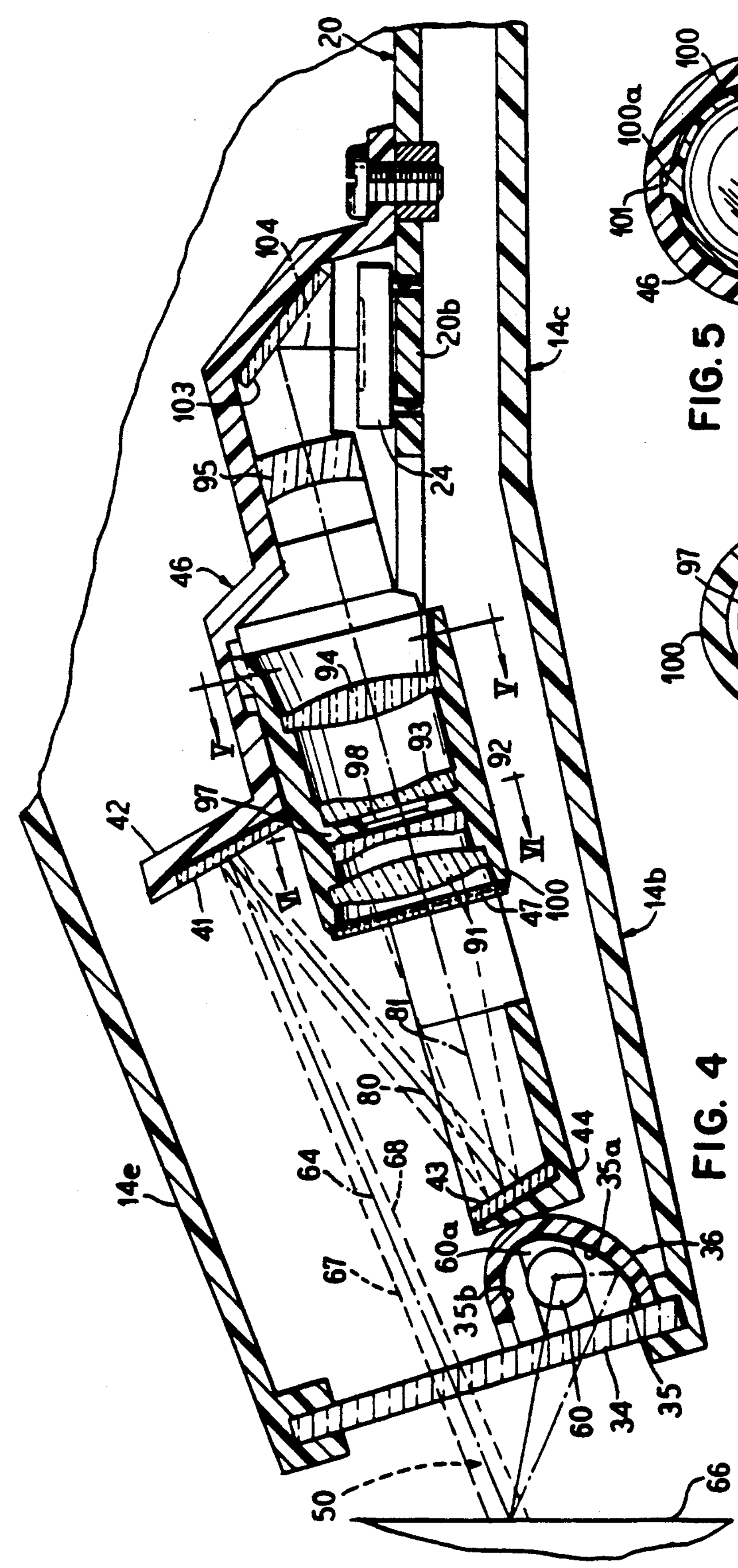
FIG. 4 is an enlarged partial somewhat diagrammatic view of the reader unit of FIG. 3, the section of FIG. 4 being taken along the lines IV—IV of FIG. 3.

FIG. 4 is a partial enlarged longitudinal sectional view of the reader unit 10, taken along the lines IV—IV of FIG. 3.

From FIG. 4 it will be seen that light source 36 includes a flash tube 60 which extends for the length of the light source assembly 36. For example, flash tube 60 may have an overall length of 68 millimeters, and may have right angle end portions such as indicated at 60*a* extending rearwardly from the assembly 36 through slots such as indicated at 61. The tube 60 may have a diameter of four millimeters and may have its center located at a focus of an eliptical portion 35*a* of reflector 35. Thus, a light ray such as indicated at 62 emitted from the center of the tube 60 will be reflected at the eliptical portion 35*a* and impinge in the bar code sensing region 50 at a point 63 representing a second focal point with respect to the eliptical configuration of reflector portion 35*a*. Point 63 is illustrated as lying on an optical axis 64 which intersects the first mirror 41 at a central point. Line 66 in FIG. 4 may represent a surface of a container such as 12 containing a bar code pattern such as indicated at 11 in FIG. 1. Marginal rays of light reflected from the surface 66 in the plane of FIG. 4 are indicated at 67 and 68, for example.

The eliptical portion 35*a* has an axis such as indicated at 70 which is inclined relative to a normal to the surface of window 34 by an accute angle such as 21°. Thus, light reflected from the eliptical portion 35*a* is generally directed upwardly and obliquely to the central optical axis 64.

Light directed away from the eliptical portion 35*a* from the center of tube 60 impinges on a segmental cylindrical portion 35*b* which serves to redirect the light onto the eliptical portion 35*a*, again for further reflection in a generally upward direction and obliquely to the central axis 64.

The direct light from tube 60 which penetrates the sensing region 50 is also directed generally upwardly and obliquely to the central optical axis 64.

The resultant direct and reflected light from tube 60 floods the sensing region 50 and defines a sheet of light directed into region 50 obliquely to the central optical axis 64.

As illustrated by dot dash line 80, mirror 41 reflects incoming light energy along an axis 80 from its front surface, and mirror 43 reflects light impinging thereon along a central axis 81. from its front surface.

The light energy directed along the axis 81 impinges on the infrared filter 47 in a substantially nor or perpendicular direction, and the transmitted light energy then tranverses a lens system including lenses 91–95. Between lenses 92 and 93 there is provided a light stop member 97 providing a rectangular optical aperture 98. The aperture 98 has a width dimension extending in the high resolution direction of the optical image being transmitted which is substantially less than the vertical dimension corresponding to the direction of low resolution (parallel to the bars of the bar code pattern 11). By way of example, the horizontal dimension of the aperture 98 may be about two millimeters while the vertical dimension may be about four millimeters.

The lenses 91–94 are rigidly mounted by means of a lens barrel 100 having a key 100*a* fitting into a slot 101 of the optical housing 46. The light stop member 97 may be integral with this light barrel 100. Each of the lenses 91–94 may be symmetrical with respect to the central longitudinal axis 81 passing through the center of the rectangular aperture 98.

As seen at the right in FIG. 4, the optical axis 81 intersects a reflecting mirror 103 whose front surface is reflective so as to direct the light energy along an axis 104 normal or perpendicular to the light sensitive surface of the photodetector 24 which is mounted on the printed circuit board 20 at the intermediate region 20*b*.

DESCRIPTION OF FIG. 7

Figure 7:
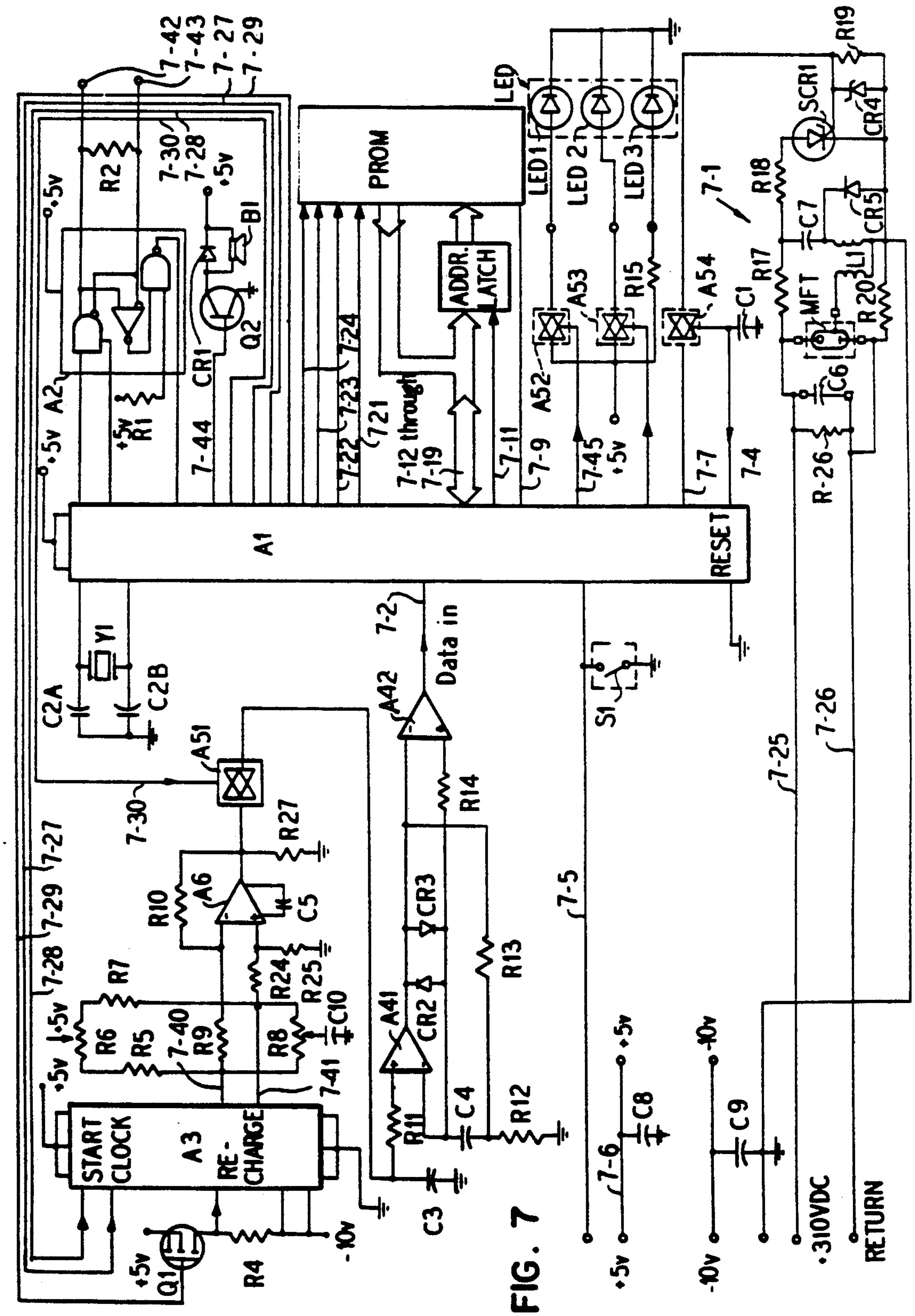
FIG. 7 is a diagrammatic illustration showing exemplary details of a suitable electric circuit configuration for the system of FIGS. 1 through 6.

FIG. 7 is an overall diagrammatic view showing the electric circuitry which is housed within the portable hand-held unit itself. The following description applies to the operation of this circuitry whether it is associated with a portable battery operated terminal or with a fixed installation such as a cash register, computer port or the like.

The hand-held unit is placed near the bar code pattern to be read and the trigger switch actuator associated with switch S1, FIG. 7 is momentarily depressed. In response to such signal from switch S1 or a comparable proximity sensor, microprocessor A1 outputs a signal to the flash tube section indicated at 7-1 in the lower right portion of FIG. 7. The tube MFT flashes and the bar code image is reflected through an optical system to a 1024 element diode array line scanner indicated at A3 in the upper left of FIG. 7. This image is rapidly shifted out, filtered, amplified and squared up before passing to the "Data In" input 7-2 of the microprocessor A1.

The microprocessor A1 processes this input data, calculates bar spacing and widths and derives the bar code number. If the number is not valid, the microprocessor retriggers the flash tube MFT and repeats the reading process. The final valid number is serially shifted out of the microprocessor A1 and into the data device such as a Norand model 101 terminal, a cash register, a computer port or the like.

In point of sale (POS) applications, the microprocessor A1 is left on continuously. When first turned on, input 7-4 of microprocessor A1 (RESET) is held low by capacitor C1. The capacitor C1 charges and when input line 7-4 exceeds 2.5 volts, the microprocessor is ready to begin program execution.

In a portable application utilizing battery power, the reader unit operates from a battery pack, and to prolong its life, the microprocessor is powered down when not needed. With such portable operation, when trigger switch S1 is closed, a scan proximity line 7-5 goes low, this line being connected with a model 101 terminal. Such terminal then applies 5 volts at input line 7-6 so as to supply power to the microprocessor A1. With power applied, capacitor C1 charges and when its voltage value is above 2.5 volts, the microprocessor is placed in operational condition. In addition, output line 7—7 from microprocessor A1 is isolated from the flash tube circuit 7-1 by means of a bilateral switch A54. During power up and down, the potential on output line 7—7 changes unpredictably and could flash the lamp MFT; to prevent this, bilateral switch A54 is opened during this interval.

The microprocessor A1 controls all functions within the hand-held unit. For the illustrated embodiment, the application program may reside in an external programmable read only memory PROM. To access the PROM, the microprocessor outputs the address as two data groups. The low address bits are placed onto the data bus 7-12 through 7-19 and are latched by a data latch associated with the PROM circuit when output 7-11 goes high then low again. The microprocessor then outputs the remaining address on output lines 7-21 through 7-24. The PROM retrieves the data byte from the location chosen by the address bus. When output line 7-9 from the microprocessor goes low, the PROM outputs are enabled and output the data byte onto the data bus for transfer to microprocessor A1. In another embodiment of the invention, the microprocessor A1 will include up to four kilobytes (4K) of internal factory masked program read only memory.

The flash tube section 7-1 is powered via lines 7-25 and 7-26 from an external power source. A voltage of 310 volts is supplied from a user supplied source of power. A voltage of 400 volts may be supplied from the model 101 previously mentioned. The applied power charges a charge storage capacitor C6 connected across the miniature flash tube MFT. The flash tube contains two electrodes with Xenon gas separating them. A fine wire is wound around the cathode end of the tube. When a high voltage is applied to this wire, the Xenon gas is ionized, lowering the resistance between the end electrodes. The gas breaks down, releasing light energy in the process. The capacitor is rapidly discharged as a very high current spike creating the intense light output. When the current and voltage fall below the gas sustaining potential, the flash is extinguished and the gas again becomes non-conductive. The actual flash is of very short duration.

To create the trigger voltage, the 310 volts is stepped up by a trigger transformer L1 and capacitor C7. In the quiescent state, a silicon controlled rectifier SCR1 is non-conducting and the trigger circuit is open. The capacitor C7 in series with the primary of transformer L1 is charged to 310 volts peak through a current limiting resistor R17.

When the microprocessor is ready for a flash it drives output line 7—7 high so as to cause the silicon controlled rectifier SCR1 to conduct and to complete the trigger circuit. Current flows from the capacitor C6 through SCR1 to the other side of the trigger transformer L1. The 310 volt capacitor pulse is stepped up through transformer action to over 4,000 volts (4 KV) and is sent to the flash tube MFT, triggering a flash. The capacitor C6 is discharged, and the loop current decays toward zero. Output line 7—7 returns to a low potential condition and when the current through SCR1 is less than its latch-up value, SCR1 returns to the non-conducting state and the capacitor C6 begins recharging.

For point of sale applications, capacitor C6 is a low leakage electrolytic and is constantly across the power supply. This allows rapid recharge and flash rates to occur.

For the case of a portable power supply, power for capacitor C6 is generated by a small step-up converter that is located in the portable interface module. There is also a sense circuit that monitors the voltage on the charged storage capacitor C6 and turns off the converter when the capacitor is charged, and turns it back on again after a flash or when the capacitor charge has leaked down to approximately 375 volts (375 VDC). Because this unit is operating off of battery power, it takes much longer to recharge the capacitor than in the case of a point of sale unit. Recharge time takes from 300 to 500 milliseconds (300 to 500 MSEC), depending on the state of the batteries.

Component A3 in FIG. 7 is a 1024 element line scanner, for example, Reticon RL 1024 G integrated circuit pack. The scanner component A3 comprises a row of silicon photodiodes, each with an associated storage capacitor on which to integrate photocurrent, and a multiplex switch for periodic readout via an integrated shift register scanning circuit. Each photo diode capacitor is charged to a known level; then the array is exposed to the bar code. Light areas cause the photodiodes to discharge their associated capacitors while dark area photodiode capacitors retain full charges. The shift register scanner is stepped from element to element and the capacitor voltage level is read out to the microprocessor until all 1024 elements have been read.

Within the scanner are two photodiode arrays. Both arrays contain photodiodes and capacitors. The video array produces the actual bar code image while the dummy array is masked from the light source. Scanner switching noises are induced capacitively into both arrays and interfere with the video signal. As the scanner is stepped, the video and dummy outputs are presented to an external differential operational amplifier A6. The common mode noise on the lines is effectively cancelled, leaving only the video differential signal for further processing.

The microprocessor A1 controls all signals that cause the scanner A3 to operate. Before the flash tube is fired, the scanner capacitors are charged to +5 volts (+5 V). Microprocessor output 7-28 goes high then low at the START input of scanner A3 to reset the scanner internal shift register to the first element. Processor output line 7-29 goes low turning on the transistor Q1 and thus bringing the scanner recharge input to plus five volts. Internally the first scanner element capacitors are charged in the dummy and video arrays through their respective MOS transistors. Processor output line 7-27 sends one pulse to the scanner CLOCK input and the scanner shift register turns off the first element, then turns on the second element MOS transistor, and the second set of capacitors in the dummy and video arrays are recharged. Processor output 7-27 continues pulsing the clock input of scanner A3 until all 1024 capacitor elements have been charged. In addition, the integrating charge capacitor is charged to plus five volts.

The processor initiates the signal at 7—7 that fires the flash tube, and the bar code pattern is reflected through optics onto the scanner photodiode video array. Where light falls, the photodiode capacitors discharge.

Processor output 7-28 leading to the START input of the scanner goes high then low, resetting the scanner shift register to the first element position.

The MOS transistor is turned on and the charge from the integrating charge capacitor discharges into the photodiode's associated capacitor. If the element was exposed to white light, i.e. a white bar, the capacitor is discharged. The integrating charge capacitor equalizes with the photodiode capacitor. If the element was dark, the capacitor would not discharge and the integrating charge capacitor would discharge very little. A MOS buffer amplifier senses the capacitor charge and places the voltage level on scanner output line 7-40 of component A3. The dummy array element capacitor also is charged by the integrating charge capacitor associated with this array. A second MOS amplifier places the capacitor voltage level on scanner output line 7-41.

Scanner output lines 7-40 and 7-41 change simultaneously in potential as a result of switching noises coupled into the arrays but only output 7-40 contains valid video information. The small capacitor size limits the charge that can be held and it begins dissipating rapidly. This factor plus various circuit losses limits the output voltage swings at output lines 7-40 and 7-41 between zero and four millivolts (4 mV).

Processor output lines 7-29 returns low and the transistor Q1 turns on and biases the scanner RECHARGE input to five volts so that the photodiode's capacitor and integrating charge capacitor recharge to plus five volts in both arrays.

Processor output 7-27 pulses high then low to the scanner CLOCK input, stepping the internal shift register to the second element in both the video and dummy arrays. The above sequence repeats and the second element capacitor is read out to the processor via output lines 7-40 and 7-41.

Scanner outputs 7-40 and 7-41 contain noise impulses from various switching circuits. These outputs are presented to a balanced differential input operational amplifier A6. The operational amplifier A6 cancels the noise of equal amplitude and phase.

The video output 7-40 of scanner component A3 contains valid data not present on output 7-41 so that this valid data is not cancelled and instead is amplified to a usable level for the following circuits. The amplifier provides a voltage input to output gain of approximately 68 times. Across the scanner output is a DC balancing network R6 through R9 and a simple noise filter to permit the differential amplifier A6 to produce a cleaner output.

Before the processor steps the scanner to the next element, it samples the differential output from amplifier A6. For this purpose output line 7-30 goes high to the bilateral switch A51 enabling it to pass the signal output from operational amplifier A6 to charge capacitor C3 of a sample and hold circuit. After a preset period processor line 7-30 returns low and capacitor C3 holds the output of operational amplifier A6.

A zero crossing detector is associated with the output of capacitor C3 and comprises an operational amplifier A41, two diodes CR2 and CR3, resistors R12, R13 and R14 and capacitor C4. The signal from the scanner is a sine wave signal and this signal is squared by means of the zero crossing detector. The operational amplifier gain is set at four and amplifies the incoming wave form. Capacitor C4 is also charged but at a slower rate and its voltage remains lower. When the incoming wave form rises to within 0.7 volt of the capacitor peak voltage the second operational amplifier A42 senses the voltage change and its output snaps to the opposite state. The diode CR2 is forward biased and discharges capacitor C4 while the input falls. When the input begins to rise and comes within 0.7 volt, the other diode CR3 is turned on and the second operational amplifier A42 senses this difference and the output changes to the opposite state.

The processor A1 samples input 7-2 (DATA IN) for a signal level. After opening the sample gate A51 by means of line 7-30 the program waits for several milliseconds to allow the operational amplifiers to stabilize. The processor A1 checks the input port 7-2 at a time when the operational amplifier output will be a valid high or low level.

The processor shifts the scanner to look at the next element then samples if the level is high (corresponding to a white bar area) or low (corresponding to a dark bar area). The processor keeps track of the number of elements that are high (white) and when the black area starts, stores the number of white elements in memory and begins counting the dark elements. When the white area begins, the dark element count is stored and the processor begins counting the white elements. After all 1024 elements have been read, the processor has a pattern of white and dark element counts corresponding to the dark and white widths of the code pattern. The processor program algorithm uses these counts to derive the bar code number.

If the final number does not match its check number or the number of bars is incorrect, the processor repeats the read process again until a correct number is produced. For a point of sale unit, the processor will retry for twenty times, then turns off. Releasing the switch S1 resets the processor for the next read cycle. For a portable unit, because it runs at a slower rate, the processor will continue flashing of the light source MFT until the pattern number is recognized or the unit switch S1 is opened.

When a valid pattern number is derived, the processor converts the number to an ASCII character string and outputs these to a bidirectional line driver A2 shown at the upper right in FIG. 7. The TTL (transistor transistor logic) level data is converted to a differential signal and is sent to a suitable receiver via output lines 7-42 and 7-43.

On a portable unit, the processor output port is tied directly to the portable interface module. The portable interface module then gates the data signal to the model 101 unit previously mentioned. The portable interface module also converts the EIA level signals from the model 101 unit to the TTL level required by the circuitry of FIG. 7.

For use with a point of sale unit, the processor will provide an output at line 7-44 to beep the small on board speaker B1 when there is a good scan, as well as supplying an enabling signal to output line 7-45 so as to light a green LED indicated at LED1 at the lower right of FIG. 7. The diode LED2 emits red light so as to indicate an error condition. The portable unit does not require a speaker and relies upon the model 101 to sound its internal beeper element for a valid number.

FIG. 8 is a plot of a specific exemplary optical system embodying lenses 91-95, stop aperture member 97 with aperture 98, and showing optical surfaces S1-S4 and S6-S11 of the lenses 91-95 in a plane through the respective vertices at axis 81.

The system of FIGS. 8-14 has essentially the characteristics previously described including a resolution at ± fifteen degree converging marginal rays 51, 52, FIG. 3, of forty line pairs per millimeter, and a depth of focus of about twenty-five millimeters, and a close-in optimum focal plane located about six millimeters in front of the front surface of window 34. The system can resolve the previously described high density bar code with five mil code intervals and a 1.8 inch length on a surface with a radius of curvature of about 1.25 inch. Thus the depth of field for sensing sharply curved bar code patterns extends to at least ten millimeters in front of the front surface of window 34.

In FIGS. 8-14, the focal length of the system is 24.23 millimeters and the magnification is −3300. The f-number is f/8.3.

FIG. 9 is a plot showing lateral aberrations of the lens system for green, blue and red wavelengths of light. The ordinate shows relative pupil height, and the abscissa is plotted for image heights H' in millimeters. In each of FIGS. 8-14, the solid lines T refer to the tangential plane while the dash lines refer to the sagittal plane. In FIG. 9, the dotted lines refer to the "SAG Y" or Y component of the sagittal ray fan.

Figure 10:
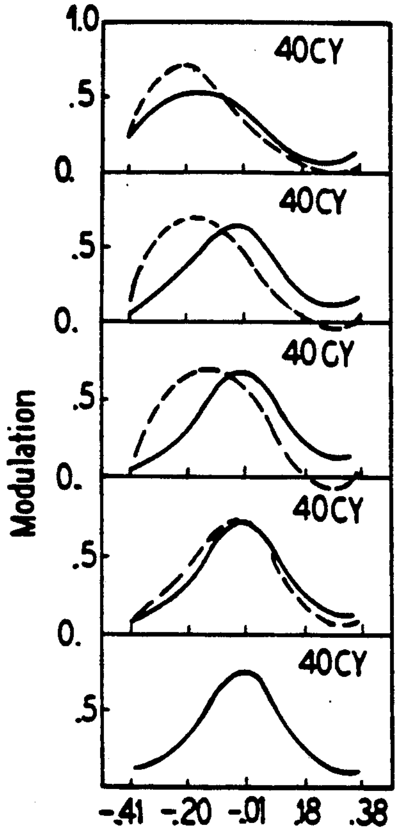
FIGS. 10 and 11 show optical transfer functions for the system of FIGS. 1 through 9, FIG. 10 being for the "Through Focus" condition and FIG. 11 being for the "Best Focus" condition.
Figure 11:
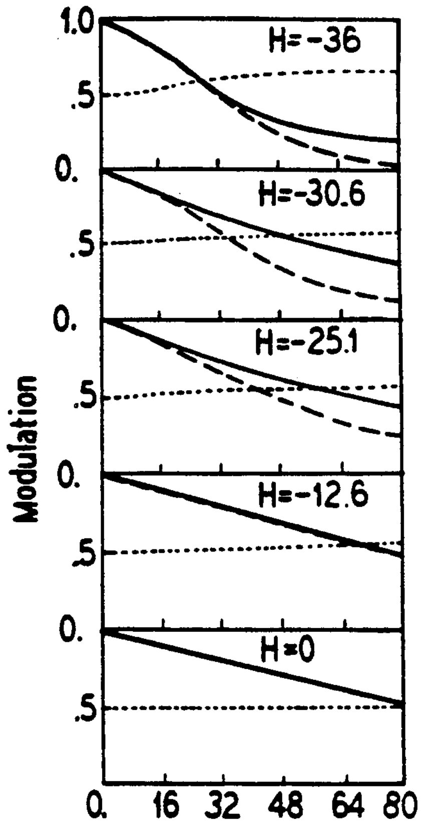

FIGS. 10 and 11 show plots of the optical transfer function with ordinate scales of relative values from zero to one for modulation, and with abscissa values in millimeters. FIG. 10 is taken for the "Through Focus" condition and FIG. 11 refers to the "Best Focus" condition of −.01 millimeter as shown in FIG. 10, the lowermost plot.

FIGS. 10 and 11 show the desired resolution of forty cycles per millimeter. Again the solid lines are for the T or tangential plane and the dash lines are for the S or sagittal plane. The dotted lines in FIG. 11 show the phase variation of the optical transfer function.

The five plots in each of FIGS. 10 and 11 are for respective object heights H in millimeters, namely H=−36 mm, H=−30.6 mm, H=−25.1 mm, H=−12.6 mm, and H=0 mm.

Figure 12:
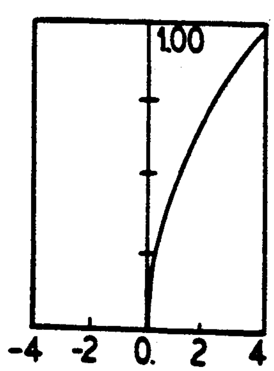
FIGS. 12, 13 and 14 illustrate radial distortion, geometrical astigmatism, and MTF astigmatism, respectively, for the system of FIGS. 1 through 11.
Figure 13:
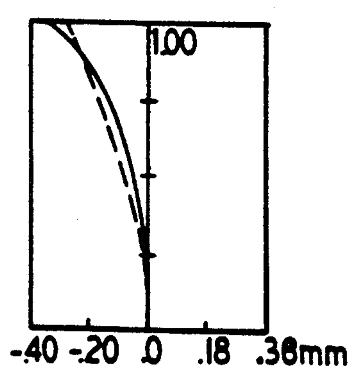
Figure 14:
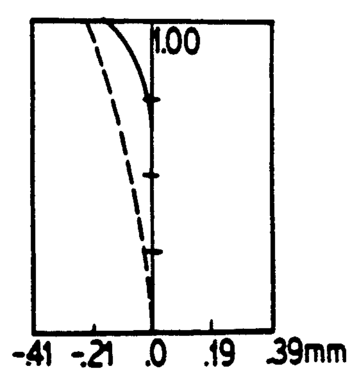

FIGS. 12-14 are plots showing radial distortion, geometrical (classical) astigmatism, and MTF astigmatism. The ordinate scale shows relative values between zero and one, while the abscissa scale is in millimeters relative to the focus position.

An exemplary set of specifications of the lens system which gave the results of FIGS. 8 through 14, is as follows, (the optical surfaces being indicated in parenthesis for the respective lenses):

Exemplary Lens System Specification

| Lens Ref. Number (and Lens Surface) | Radius (millimeters) | Thickness (millimeters) | Clear Aperture (diameter millimeters) |
|---|---|---|---|
| 91(S1) | 13.5153 | 2.40000 | 6.98 |
| 91(S2) | −17.1251 | 1.10247 | 6.04 |
| 92(S3) | −10.8715 | 1.40000 | 4.75 |
| 92(S4) | −37.7869 | .50000 | 4.03 |
| 97(S5) | plano | .50000 | 3.69 |
| 93(S6) | 37.7869 | 1.40000 | 3.83 |
| 93(S7) | 10.8715 | 4.31965 | 4.31 |
| 94(S8) | 17.1251 | 2.40000 | 8.50 |
| 94(S9) | −13.5153 | 12.00000 | 8.91 |
| 95(S10) | −7.9373 | 2.00000 | 11.08 |
| 95(S11) | −37.4635 | 12.04436 | 13.68 |

Lenses 91, 94 and 95 are of an acrylic lens material known as type 493 572, and lenses 92 and 93 are of a polystyrene lens material, type 592 307.

In FIG. 8, the following dimensions apply as system first order properties:

f/9.00, H = −30.000 mm
magnification −4000
OBD = −92.9562 mm (object plane 0 to 51)
BRL = 28.0221 mm (S1 to S11 along axis 81)
IMD = 12.0444 mm (S11 to image plane I)
OVL = 133.023 mm (object plane 0 to image plane I)

In FIG. 4, the axis of the elliptical reflector portion 35*a* may intersect axis 64 at ten millimeters in front of the front surface of window 34.

The details of a lens system which is effective to transmit an optical image of a bar code pattern from a sensing field 50 with a depth of about one inch and a width of about 2.5 inches to a flat photodetector surface twenty-five microns wide and about one inch in length, is as follows:

mirror 41 at an angle of 57.5 degrees to axis 81, plus or minus fifteen minutes of arc;
distance along axis 64 from bar code sensing region 50 to the front reflective surface of mirror 41, about 46.5 millimeters;
distance along axis 80 from the front reflective surface of mirror 41 to the front reflective surface of mirror 43, about 20.5 millimeters;
mirror 43 at an angle of 75 degrees plus or minus ten minutes of arc, relative to axis 81;
distance along axis 81 from front reflective surface of mirror 43 to first lens surface (S1) of lens 91, about 19.5 millimeters;
distance along axis 81 from first lens surface (S1) of lens 91 to back lens surface (S9) of lens 94, about fourteen millimeters;
distance along axis 81 from the back lens surface (S9) of lens 94 to the vertex of the concave front surface (S10) of lens 95, about twelve millimeters.
distance along axis 81 from the back convex surface (S11) of lens 95 to the front reflective surface of mirror 103, about 7.5 millimeters plus or minus 0.1 millimeter;
distance along axis 104 from the front surfave of mirror 103 to the image plane of photodetector 24, about 3.5 millimeters plus or minus 1 millimeter
mirror 103 at an angle of about 37.5 degrees plus or minus ten minutes of arc, relative to axis 81;
angle between axis 81 and the plane of the printed circuit board 20, about fifteen degrees.

Thus, the total optical distance along axes 64, 80, 81 and 104 is about 125 millimeters. This optical path occupies a physical length of the casing 14 of about seventy-five millimeters, so that a substantial reduction in the length of the forward portion of unit 10 is achieved.

Figure 15:
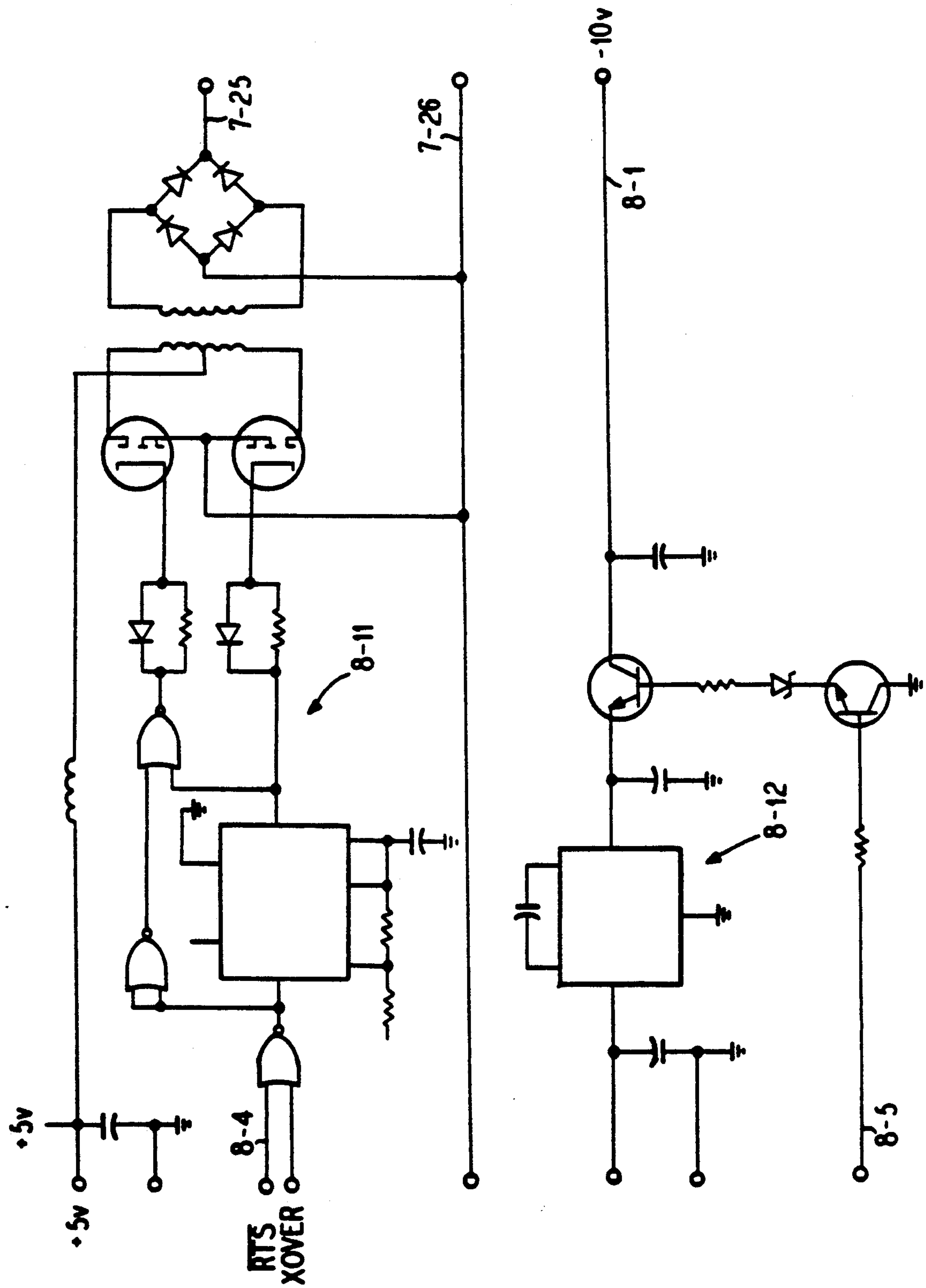
FIGS. 15 and 16 together provide a diagrammatic showing of the electric circuitry for the interface component 17, FIG. 1, where the unit 16 is itself battery operated and portable.
Figure 16:
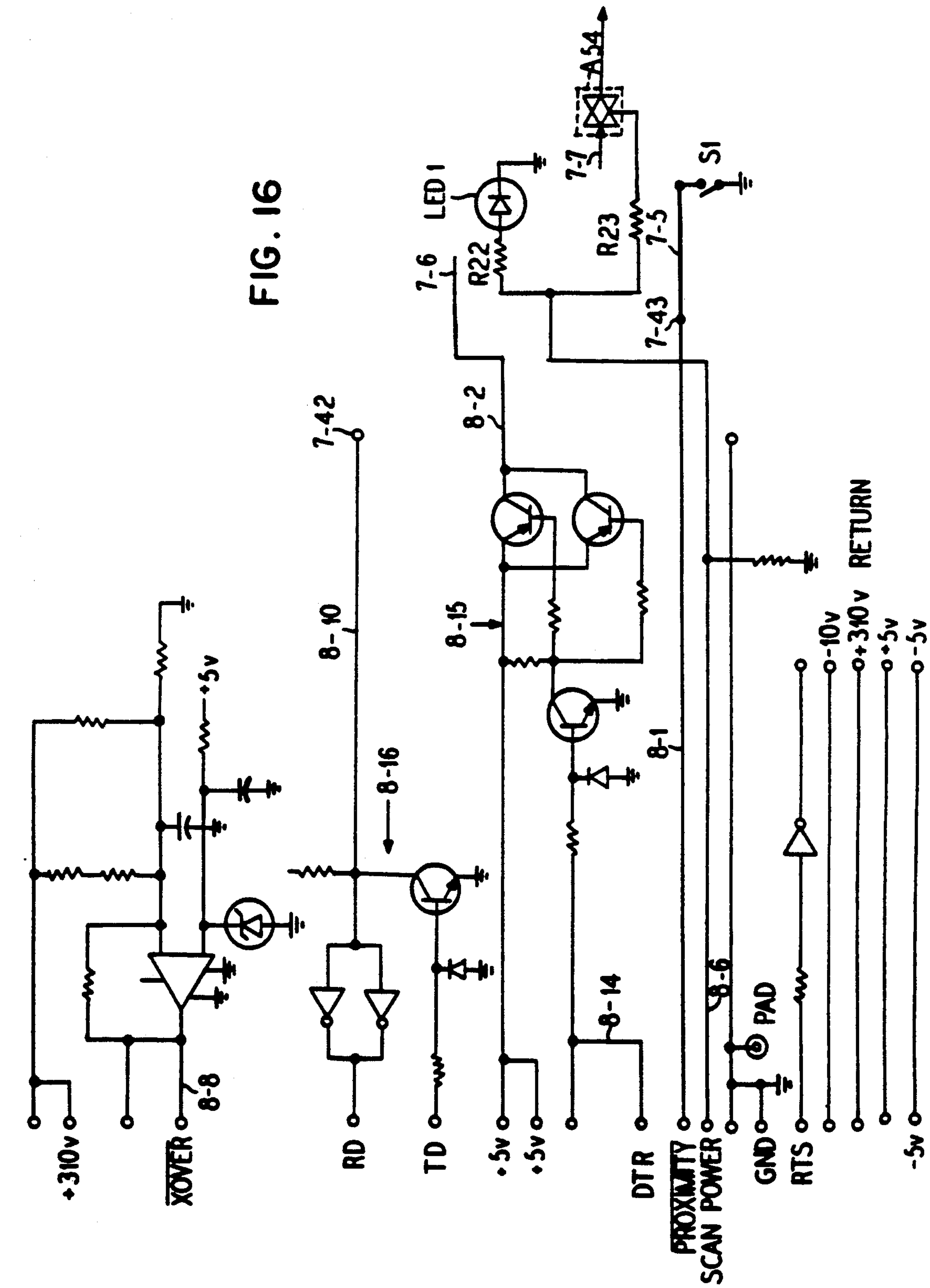

FIGS. 15 and 16 show the circuitry for interface 17 when it is associated with a Model 101 portable system corresponding to component 16 in FIG. 1.

For the case where the circuitry of FIGS. 15 and 16 is associated with the reader circuit of FIG. 7, switch S1 will be decoupled from processor A1, and actuation of button 18 to close switch S1 will be transmitted via conductors 7-5, FIG. 7 to point 7-43 shown at the upper right of FIG. 7, and from this point via conductor 8-1, FIG. 16, to the "$\overline{\text{PROXIMITY}}$". The interface module 17 of FIGS. 15 and 16 plugs into the model 101 unit 16 and provides any required level conversion between the model 101 and the reader unit of FIG. 7. The interface module of FIG. 16 generates plus 400 volts for the flash tube and the minus ten volts for the scanner module A3. Both of these supplies and the plus five volts from output 8-2 of FIG. 16 are switched at the interface module under Model 101 control.

A scan is initiated when the trigger switch S1, FIG. 7, is depressed. This gives a "$\overline{\text{PROXIMITY}}$" signal to the model 101 via conductor 8-1 in the same manner as a prior art scanning wand. After receiving $\overline{\text{PROXIMITY}}$, the model 101 checks $\overline{\text{XOVER}}$ to verify that the high voltage is charged to an acceptable level. If not, the model 101 circuit raises RTS at 8-4, FIG. 15 to enable the high voltage charge circuit. The model 101 then waits for $\overline{\text{XOVER}}$ to go low, or up to 750 milliseconds, whichever comes first. If the $\overline{\text{XOVER}}$ signal does not indicate a valid high voltage within the 750 millisecond time out, a charge error is indicated. If $\overline{\text{XOVER}}$ goes valid within the 750 millisecond time-out then the model 101 drops RTS and raises DTR at 8-5, FIG. 15. The DTR signal is used by the interface module to switch the low voltage supplies to the reader unit of FIG. 7.

After raising DTR, the model 101 waits for a Bell (07 HEX) from the reader circuit of FIG. 7. The time-out for this is also 750 milliseconds. If the Bell is not received, a bad scan is assumed. After receiving the Bell, the model 101 sends a three character control word to the reader of FIG. 7. The first character is the minimum length expected, added to an ASCII 0 (30 HEX), the second character is the maximum length expected, added to an ASCII 0 and third character is an ASCII ACK (06 HEX). The minimum and maximum are sent in this fashion to reduce communication overhead and still maintain an ASCII protocol.

After the control word is sent, the model 101 turns on SCAN POWER at 8-6, FIG. 16 to enable the strobe. The model 101 monitors $\overline{\text{XOVER}}$ to detect a flash and waits up to 100 milliseconds before assuming a bad scan. After $\overline{\text{XOVER}}$ at 8—8, FIG. 16, goes low, the model 101 waits up to 750 milliseconds for the reader to send the decoded bar code data. If no data is received at line 8-10, FIG. 16, within 750 milliseconds or if the reader sends an ASCII "*", a bad scan is indicated and a retry will be attempted if $\overline{\text{PROXIMITY}}$ at line 8-1 is still present.

If valid data is received from the reader, then the first character indicates which type of label was scanned. The decoded label then follows with a modulus ten hash digit, and ASCII carriage return, and an ASCII line feed added onto the end.

If the data meets the model 101 requirements for a good scan, then the model 101 drops DTR at conductor 8-5 and powers off the reader unit. If not, then an ASCII NAK is sent to the reader, and a retransmission is requested. If the data was good, then the model 101, under application control, can indicate a good scan on the reader by turning on SCAN POWER at 8-6, FIG. 16.

FIG. 15 shows the circuitry at 8-11 for the flash tube firing. When the RTS input 8-4 is active, the 300 volt direct current generator charges its output capacitor to the maximum voltage $V_M$ and is shut off by the signal XOVER until the output voltage reaches a fixed lower voltage $V_L$ at which point the 300 volt generator is started until the output reaches $V_M$. If RTS is inactive, the 300 volt generator is off.

Section 8-12 in FIG. 15, supplies minus ten volts to output 8-1, which in turn supplies component A3, the diode array chip A3 of FIG. 7. When DTR at 8-5 is active, conductor 8-14, FIG. 16 is also active so as to switch plus five volts from the model 101 to output line 8-2 via circuit block 8-15, so that the processor A1 is powered up.

A data link circuit is indicated at 8-16 in FIG. 16 which interfaces the READ (RD) signal and the TRANSMIT DATA (TD) signals from the model 101 over a single line 8-10 to the reader processor A1 via terminal 7-42 at the upper right in FIG. 7.

The proximity line 8-1 of FIG. 16 is an input to the model 101 indicating that the operator has depressed the reader button 18 requesting a read operation.

The SCAN POWER line 8-6 is an output from the model 101 allowing the flash tube to be fired by the reader processor A1 (via output 7—7).

In operation, the model 101 receives a request to scan (PROXIMITY) signal via conductor 8-1 FIG. 16 from the reader circuit of FIG. 17. The model 101 raises DTR at 8-14 which turns on the reader processor A1. The reader processor sends a "Bell" signal to the model 101 via terminal 7-42 and conductor 8-10, FIG. 16. The model 101 checks XOVER at 8—8 for full charge. When 300 volts is charged (XOVER) the model 101 sends the reader a go ahead character via conductor 8-10, FIG. 16, and terminal 7-42, and enables the flash via SCAN POWER at 8-6, FIG. 16. The reader decodes the data from the scanner A3, FIG. 7, and sends a character or characters back to the model 101 via terminal 7-42 and conductor 8-10, FIG. 16. If a valid character is read, it is passed to the model 101. The cycle is complete and will not start again until the button 18 is released and depressed again by the operator. If the reader gets an invalid code a character (*) is sent to the model 101 indicating no read and the cycle starts again.

In the portable application, the reader unit operates from the battery pack of the model 101 and to prolong its life, the central processing unit Al, FIG. 7, is powered down when not needed.

When the trigger switch 51 is closed, the model 101 proximity line, 7-5, FIG. 7, 8-1, FIG. 16, goes low. The model 101 applies five volts to the central processing unit Al. The capacitor charges and above 2.5 volts at Cl, FIG. 7, releases the central processing unit Al to operate. In this mode, however, conductor 7-4 and the upper plate of capacitor Cl are disconnected from the gate of switch A54, switch A54 instead being controlled via line 7-6 as shown in FIG. 16. In addition, output line 7—7 from processor Al, FIG. 7, is isolated from the flash tube circuit by the bilateral switch A54. During power-up and down, conductor 7—7 from the processing unit Al changes unpredictably and could flash the lamp, so that the bilateral switch A54 is opened. Because the bilateral switch A54 is controlled by the same signal that drives the green LED 1 (good scan), FIG. 16, the switch A54 is only turned on for a short time. It is timed to coincide with the reader flash signal from conductor 7—7 at the output of processor Al. The switch A54 is also turned on during the time the green LED 1 is on to indicate a good scan.

In the commercial equipment, fixed base, versus portable components 16 were implemented by a circuit arrangement which eliminated the need for jumpers by going to a cut-only arrangement.

To correct a band width problem, the op-amp A6 was changed to a type CA3130 E. This part has a much higher gain-band width product than the amplifier previously used. It is also more stable over the temperature range and voltage range. The second and third stages use an LM358N, (A41 and A42, FIG. 7) which was comparable to a previous part.

The recharge control transistor Q1 was changed from a 2N3906 to a VP0106 to eliminate the need for two resistors. The existing circuit was stabilized over temperature by the addition of a 2.2 kilohm resistor, but it became apparent that there was no room for the extra resistor. The VP0106 also eliminated a further resistor allowing other parts to be moved around.

In checking the alternating current noise adjustment at R8, FIG. 7, it became apparent that there was an unknown noise element. This was found to be caused by the lack of output load on amplifier A6. By adding R27, a ten thousand ohm pull-down resistor to the output of the CA3130E operational amplifier, the noise was eliminated. After adding R27, the adjustment of R8 was easy to complete.

The circuits as shown herein were deemed ready for release to production. The changes indicated were considered to accomplish some significant improvements.

Exemplary product specifications for a commercial reader unit in accordance with the present invention are as follows:

Using a standard UPC-A label, the read rate design goals are:

First Read Rate . . . 95%
Second Read Rate . . . 98%
Third Read Rate . . . 99.5%

Not more than 7.3 errors in ten thousand accepted reads (per "The Effect of the Design of the IBM Proposed UPC Symbol and Code on Scanner Decoding Reliability").

Depth of field: Up to 0.4 inch (ten millimeters).

The reader will read bar codes with a minimum bar/space width of 7.5 mils (0.0075 inch) at a contrast ratio of 50% or greater. Each bar or space must be within plus ten percent of its nominal size, and the maximum width of a bar code is 1.8 inches from first start bar to last stop bar, including add on, if any. A quiet zone of not less than five times the narrowest element of the start or stop bars is required on each end.

Minimum label radius must be greater than 1.25 inches for a 1.8 inch label.

The reader will currently support the following codes: UPC-A, UPC-E, EAN-13, and EAN-8 with or without add-on 2 or 5.

The scanning modules are encoded in ROM and can be modified to support other bar codes at the factory.

Pursuant to 37 CFR 1.96 (a)(2)(ii), a computer printout (in continuous web form) is found in an accompanying protective cover and is designated "COMPUTER PRINTOUT APPENDIX PURSUANT TO 37 CFR 1.96(a)(2)(ii)". For the sake of identification of this material, it may be noted that the printout sheets are numbered beginning with the third sheet as "PAGE 1" through "PAGE 57". PAGE 57 begins a "CROSS REFERENCE" listing which continues for five sheets without page numbers.

The first page (without apage number) of the listing includes the following notation:

"JOB=RDXIL PRINTED ON 17-DEC-81 at 03:09 PM FOR USER [1, 160]"

It will be apparent that many modifications and variations may be effected without departing from the scope of the novel concepts and teachings of the present invention.

IN THE UNITED STATES PATENT AND TRADEMARK OFFICE

APPLICANTS: George E. Chadima, Jr., Vadim Laser

TITLE: "Instant Portable Bar Code Reader" (Attorney's Case No. P-81,663)

COMPUTER PRINTOUT
APPENDIX
PURSUANT TO 37 CFR 1.96(a)(2)(ii)

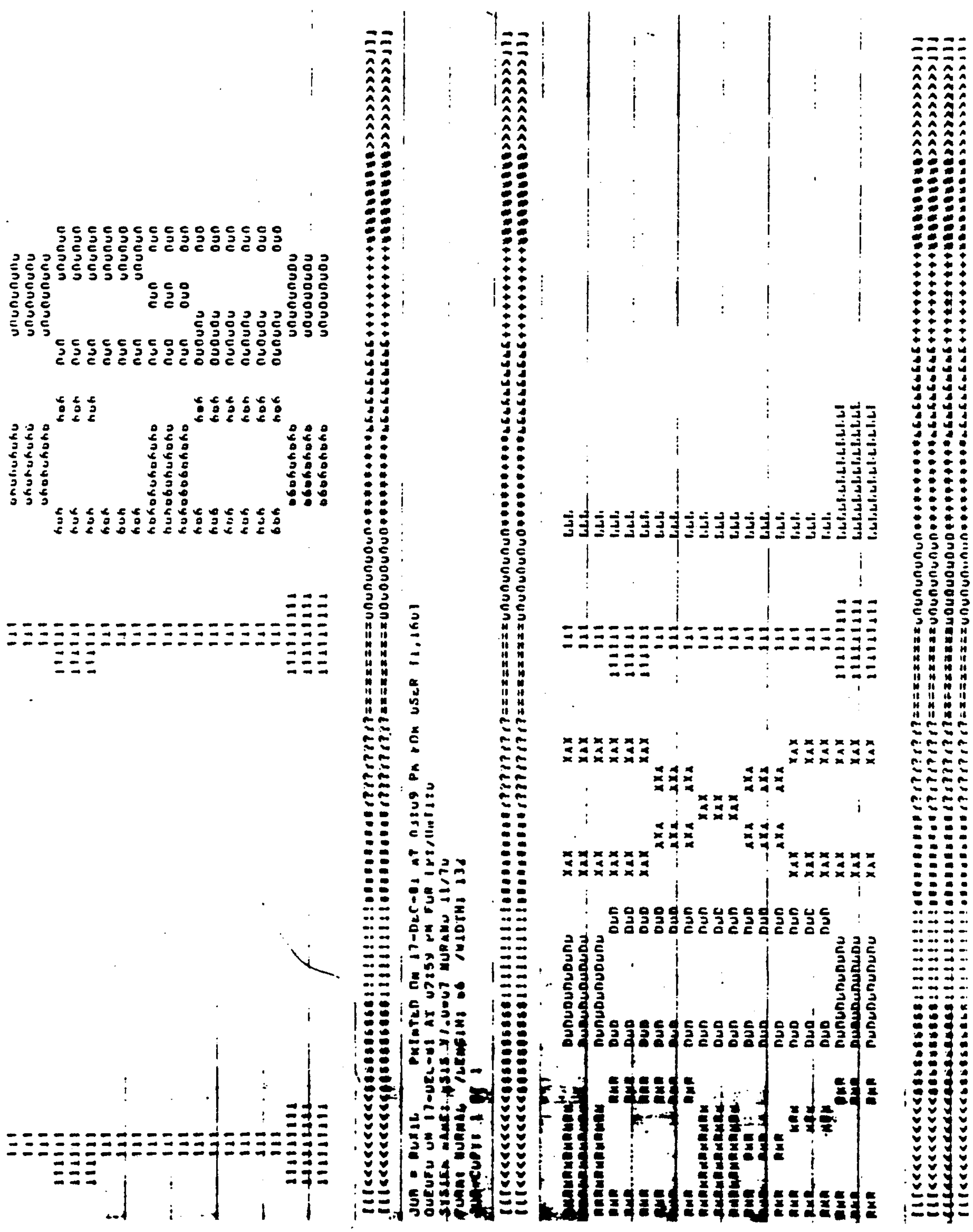
PRINTED ON 17-DEC-81

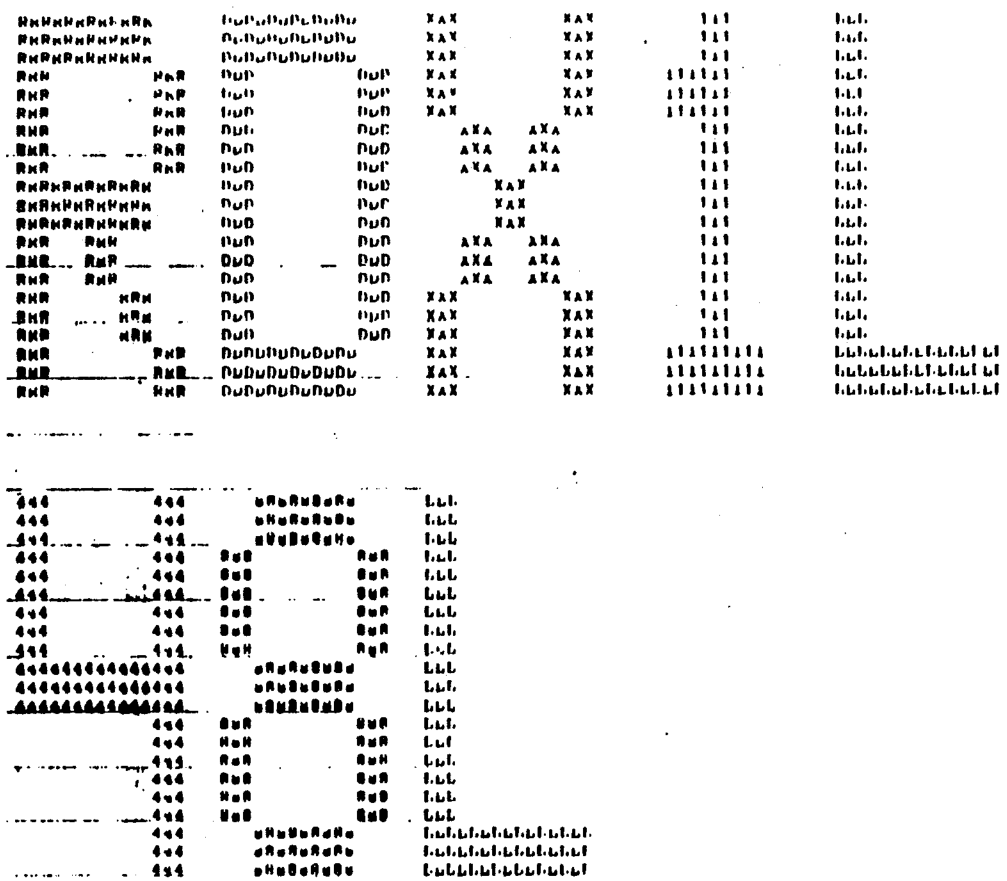

```
[[[<<<<<<<<<<<$a$a$a$a$a$:!!!!!!!!!!!#########(?(?(?(?(?===========uOuOuOuOuO**********&a&a&a&a&a++++++++++%%%%%%%%%%>>>>>>>>>>]]]
[[[<<<<<<<<<<<$a$a$a$a$a$:!!!!!!!!!!!#########(?(?(?(?(?===========uOuOuOuOuO**********&a&a&a&a&a++++++++++%%%%%%%%%%>>>>>>>>>>]]]

JOB = ROXIL      PRINTED ON 17-DEC-81 AT 03:09 PM FOR USER [1,160]
COPY    1 OF     2    /DELETE: NO   FILE = DB1   :[50,52]ROXIL .4BL
RECORD TYPE: STREAM      FORMAT TYPE: FORTRAN

[[[<<<<<<<<<<<$a$a$a$a$a$:!!!!!!!!!!!#########(?(?(?(?(?===========uOuOuOuOuO**********&a&a&a&a&a++++++++++%%%%%%%%%%>>>>>>>>>>]]]
[[[<<<<<<<<<<<$a$a$a$a$a$:!!!!!!!!!!!#########(?(?(?(?(?===========uOuOuOuOuO**********&a&a&a&a&a++++++++++%%%%%%%%%%>>>>>>>>>>]]]
```

```
LINE  ADDR  B1 B2 B3 B4 ERROR   ROXIT.48P,PORT,UPC-A,E(0,1),EAN-8,13,ADDON 2,5

                                        TITLE   'ROXIT.48P,PORT,UPC-A,E(0,1),EAN-8,13,ADDON 2,5
                                * CONDITIONAL ASSEMBLY SWITCHES
      0000                      DEBUG   EQU     0       SWITCH FOR CONDITIONALLY INCLUDING DEBUG CODE
                                *
                                * AUTHOR JIM WAITE
                                *
                                * HISTORY
                                *
                                * ROXIT
                                * VER 1.0       12-10-81        CREATED FROM ROXIC VER 1.4
                                *                               CHANGED RED LITE TO WHAT GREEN LITE MEANT.
                                *                                CHANGED GREEN LITE TO MEAN GOOD READ,
                                *                                OPPOSITE OF WHAT RED LITE MEANT.
                                *
                                * ROXIC
                                * VER 1.4       08-21-81        DELETED THE 1,2,7,8 25% TEST ADDED
                                *                                IN VERSION 1.2. LEFT IN THE '*'
                                *                                TEST.
                                *                               ADDED DC2 HOST READ COMMAND.
                                *                               CHANGED 'OUTCHAR' TO WAIT 1 BIT TIME
                                *                                BEFORE SENDING A CHARACTER SO THAT
                                *                                THE OTHER END HAS TIME TO FINISH
                                *                                SENDING THE STOP BIT BEFORE THIS
                                *                                END MIGHT SEND A RESPONSE.
                                *
                                * VER 1.3       08-14-81        MODIFIED 'INIT' AND 'READ' TO HANDLE
                                *                                REITCON AND DIGITIZER BETTER.
                                *                                DOUBLES ANALOG SIGNAL STRENGTH.
                                *
                                * VER 1.2       06-19-81        MODIFIED 'CHAR' AND ADDED 'R4VSR7'
                                *                                SO THAT C1/C2, C3/C4 COMPARISON FOR
                                *                                DETERMINATION OF 1/7, 2/8 CHARACTERS
                                *                                THE LARGER COUNT MUST BE LARGER
                                *                                THAN THE SMALLER COUNT PLUS 25%.
                                *                                THIS WILL HELP REDUCE SUBSTITUTIONS.
                                *
                                * VER 1.1       06-10-81        MODIFIED 'READER' TO:
                                *                                DELAY INPUTTING THE DATA AND SHIFT
                                *                                THE INPUT TO A TIME WHEN CIRCUIT
                                *                                NOISE FROM THE INPUT WOULD BE LESS
                                *                                HARMFUL.
                                *                               MODIFIED 'GUARD' TO:
                                *                                CHANGE THE GUARD REQUIREMENT FROM
                                *                                +/-25%+1 TO 50%.
                                *
                                * VER 1.0       04-16-81        RELEASED
                                *
                                * MACROS
                                *
                                ERR     MACRO
                                        CLR     F0
                                        CPL     F0
                                        ENDM
                                *
                                JERR    MACRO   ADDR
                                        JF0     ADDR
                                        ENDM
                                *
                                JOK     MACRO   ADDR
                                        LOCAL   LAB1
                                        JF0     LAB1
```

```
                 JMP      ADDR
      LARI       SET      $
                 ENDM
      *
      JOEN       MACRO    ADDR
                 JT0      ADDR
                 ENDM
      *
      JPORT      MACRO    ADDR
                 JNT0     ADDR
                 ENDM
      *
      PAGE       MACRO    SIZE
                 ORG      (($+SIZE-1)/SIZE)*SIZE
                 ENDM
      *
      ON         MACRO
                 CLR      F0
                 ENDM
      *
      RETERR     MACRO
                 CLR      F0
                 CPL      F0
                 RET
                 ENDM
      *
      RETOK      MACRO
                 CLR      F0
                 RET
                 ENDM
      *
      * TESTABLE FLAGS AND INPUT DEFINITIONS
      *
      * F0     ERROR FLAG
      * F1     NOT USED
      * T0     LOW = PORTABLE MODE
      * T1     NOT USED
      * INT    RECEIVE DATA
      *
      * EQUATES
      *
      * PORT 1 BITS
0080  BEEPER     EQU      128     BEEPER CONTROL
0040  GREEN      EQU      64      GREEN LITE - LAST READ WAS GOOD
0020  RED        EQU      32      RED LITE - ENABLED
0010  FLASH      EQU      16      IMAGE ARRAY CONTROL SIGNAL
0008  SAMPLE     EQU      8       IMAGE ARRAY CONTROL SIGNAL
0004  RECHARG    EQU      4       IMAGE ARRAY CONTROL SIGNAL
0002  START      EQU      2       IMAGE ARRAY CONTROL SIGNAL
0001  CLOCK      EQU      1       IMAGE ARRAY CONTROL SIGNAL
      *
      * PORT 2 BITS
0080  TXD        EQU      128     TRANSMIT DATA OUTPUT BIT
0040  TXEN       EQU      64      TRANSMIT ENABLE - RECEIVE ALWAYS ENABLED
0020  TRIGR      EQU      32      TRIGGER SWITCH BIT - LOW EQUALS TRUE
0010  BARBIT     EQU      16      BAR DATA INPUT BIT
      *
      * HOST COMMUNICATION CONTROL CHARACTERS
0006  ACK        EQU      6       FROM HOST TO INDICATE LAST DATA WAS OK
      *                            HANDLED IN 'SEND'
0015  NAK        EQU      21      FROM HOST TO INDICATE LAST DATA WAS BAD
      *                            HANDLED IN 'SEND'
0011  DC1        EQU      17      FROM HOST TO ENABLE DATA TRANSFER
```

```
                *                     TRAPPED IN 'GETCHAR'
0014            DC2     EQU     18    FROM HOST TO INITIATE A READ CYCLE
                *                     TRAPPED IN 'WAITON'
0013            DC3     EQU     19    FROM HOST TO DISABLE DATA TRANSFER
                *                     TRAPPED IN 'GETCHAR'
0007            BEL     EQU     7     TO HOST AS POWER-UP SIGNAL
0005            ENQ     EQU     5     FROM HOST TO REQUEST ID MESSAGE
                *                     TRAPPED IN 'GETCHAR'
000A            EIX     EQU     3     FROM HOST TO RESTART THIS PROCESSOR
                *                     TRAPPED IN 'INI'
0000            NULL    EQU     0     USED TO INDICATE EMPTY RECEIVE BUFFER
                *
                * ASCII CHARACTER EQUATES
000D            CR      EQU     13    CARRIAGE RETURN
000A            LF      EQU     10    LINE FEED
0020            SP      EQU     32    SPACE
0000            EOD     EQU     0     INDICATES END-OF-DATA WITHIN A BUFFER
                *
                * BARCODE TYPE EQUATES
0000            UPC     EQU     0     UPC - MUTUALLY EXCLUSIVE WITH EAN
0001            EAN     EQU     1     EAN - MUTUALLY EXCLUSIVE WITH UPC
0000            SHORT   EQU     0     SHORT - MUTUALLY EXCLUSIVE WITH LONG
0002            LONG    EQU     2     LONG -  MUTUALLY EXCLUSIVE WITH SHORT
0004            ADDON2  EQU     4     MUTUALLY EXCLUSIVE WITH ADDON5
0008            ADDON5  EQU     8     MUTUALLY EXCLUSIVE WITH ADDON2
                *
0080            BACKCHR EQU     128   DECODED CHARACTER BACKWARD BIT FLAG
                *
                * ADDRESS EQUATES
0000            ROMBEG  EQU     0
0003            VECTOR3 EQU     3     EXTERNAL INTERRUPT VECTOR
0007            VECTOR7 EQU     7     TIMER INTERRUPT VECTOR
0020            RAMBEG  EQU     32
0100            RAMEND  EQU     256
                *
                * RAM STORAGE AREA DEFINITIONS
                *
0008            STACK   EQU     8
                        ORG     RAMBEG
0020            INCHAR  DS      1            RECEIVE DATA BUFFER - INTERRUPT LOADED
0021            TRYS    DS      1            BAD SCAN RETRY COUNTER
                *
0022            FRAMPTR DS      1            PTR TO COUNT'S FRAMING DUCT
0023            CHARPTR DS      1            PTR TO LOCATION OF NEXT DECODED CHARACTER
0024            ADDPTR  DS      1            PTR TO RIGHT END OF COUNTS AFTER DECODE
0025            EODPTR  DS      1            POINTER TO END OF COUNTS
0026            BACKSW  DS      1            BACKWARDS SWITCH, <>0 = BACKWARDS
                *
0027            CHARS   EQU     $
0027            CHARTYP DS      1            DECODED BARCODE TYPE - 1ST BYTE OF CHARS
0028            CHARF1  DS      1            DECODED BARCODE F1 CHARACTER FOR EAN-13
0029            CHARBEG DS      14           DECODED BARCODE CHARACTERS
0035                    DS      1            PLUS 1 FOR EOD
                *
0036            CHARADD DS      5            DECODED BARCODE ADDON CHARACTERS
003B                    DS      1            PLUS 1 FOR EOD
                *
003C            CNTBEG  DS      RAMEND-$     BAR COUNTS OCCUPY REST OF RAM LESS 1 FOR EOD
0100            CNTEND  EQU     $
                *
                * ROM CODE
                *
                        ORG     ROMBEG
```

```
0000                 BEGIN
0000   04 05                  JMP     BEGIN2
                              ORG     VECTOR3
0003   A4 05                  JMP     INT
                     * INIT PROGRAM VARIABLES AND I/O
0005   F4 7F         BEGIN2   CALL    INIT              INITIALIZE VARIABLES AND I/O
                     *
                     * MAIN SCAN LOOP STARTS HERE
                     *
0007                 SCAN
                      IF DEBUG
                      ENDIF
0007                          JPORT   SCAN2             IF PORTABLE THEN SKIP TRIGGER WAIT
0009   E4 AE                  CALL    WAIT              WAIT FOR ENABLE AND SCAN TRIGGER
000B   B9 21         SCAN2    MOV     R1,#TRYS          INIT BAD SCAN RETRY COUNTER
000D   B1 EC                  MOV     @R1,#-20          (UPCOUNTER)
000F   99 9F                  ANL     P1,#-1-GREEN-RED        TURN OFF GOOD READ, READY LITES
0011   14 3B         SCANLP2  CALL    READ      READ BARCODE BIT ARRAY INTO MEMORY AS BARCODE COUNTS
0013   14 B0                  CALL    FILTER            FILTER OUT INVALID COUNTS
0015   14 B5                  CALL    ADJUST            ADJUST COUNT VALUES BY A FACTOR
                      IF DEBUG
                      ENDIF
0017   34 00                  CALL    DECODE            DECODE BARCODE COUNTS INTO CHARACTERS
0019                          JPORT   SCAN4             IF PORTABLE THEN SEND THE DATA
001B                          JERR    SCNERR2
001D   54 00         SCAN4    CALL    SEND              SEND DECODED BAR CODE TO HOST
001F                          JERR    SCNERR2           DATA NOT ACCEPTED
0021                          JPORT   $                 LOOP HERE IF PORTABLE - WE GET POWERED DOWN
0023   89 40                  ORL     P1,#GREEN         TURN ON GOOD READ LITE
0025   94 00                  CALL    BEEP              SHORT BEEP MEANS GOOD
0027   04 07                  JMP     SCAN              GOTO WAIT FOR NEXT TRIGGER
0029   F4 C8         SCNERR2  CALL    TRIGGER           IF NO TRIGGER
002B   C6 37                  JZ      SCNERR4           THEN EXIT WITH ERROR
002D   B9 21                  MOV     R1,#TRYS          ELSE CHECK FOR LAST TRY
002F   11                     INC     @R1
0030   F1                     MOV     A,@R1
0031   C6 37                  JZ      SCNERR4           LAST RETRY - EXIT WITH ERROR
0033   94 16                  CALL    DELAY6            WAIT 60MS BEFORE RE-FLASHING
0035   04 11                  JMP     SCANLP2
0037   99 BF         SCNERR4  ANL     P1,#-1-GREEN      TURN OFF GOOD READ LITE
0039   04 07                  JMP     SCAN
                     *
                     * CLEAR DIODE BIT ARRAY AND FLASH
                     * READ 1024 BIT ARRAY
                     * COUNT EACH SERIES OF 1 OR 0 BITS AND STORE THE COUNTS IN RAM
                     * ONE BIT REPRESENTS 0.0025": 255 BITS REPRESENTS 0.6375"
                     * BIT COUNTS ARE LIMITED AT 255 - THEY ARE NOT ALLOWED TO WRAP.
                     *
003B                 READ
                     * INIT READ VARIABLES
003B   27                     CLR     A                 INITIALIZE REGISTERS
003C   AA                     MOV     R2,A              0/1 COUNT SWITCH
003D   AB                     MOV     R3,A              COUNT
003E   BC 04                  MOV     R4,#4             LOOP COUNTER - 1024
0040   AD                     MOV     R5,A              LOOP COUNTER - 1024
0041   B8 3C                  MOV     R0,#CNTBFG        PTR TO COUNTS
                     * CLEAR BIT ARRAY
0043   89 06                  ORL     P1,#START+RECHARG        INITIATE ARRAY RECHARGE CYCLE
0045   99 FE                  ANL     P1,#-1-CLOCK
0047   99 FD                  ANL     P1,#-1-START
0049   89 01         RDCLRB   ORL     P1,#CLOCK
004B   99 FE                  ANL     P1,#-1-CLOCK      CLEAR REMAINING BITS
004D   ED 49                  DJNZ    R5,RDCLRB
```

```
0049 EC 49                DJNZ    R4,RDCLNR
                 * FLASH
0051 89 13                ORL     P1,#FLASH+START+CLOCK   INITIATE ARRAY READ-OUT CYCLE
0053 ED 53                DJNZ    R5,$           DELAY FOR FLASH TUBE TO FINISH FLASHING
0055 99 EF                ANL     P1,#-1-FLASH-CLOCK
0057 99 FD                ANL     P1,#-1-START
0059 BC 04                MOV     R4,#4          RE-INIT HIGH BYTE OF BIT COUNTER
                 * READ ARRAY
005B 0A          READLP   IN      A,P2           DATA FROM SAMPLE OF PREV LOOP CYCLE
005C 89 08                ORL     P1,#SAMPLE     DATA FROM CLOCK OF PREV LOOP CYCLE
005E 99 F7                ANL     P1,#-1-SAMPLE
0060 89 05                ORL     P1,#CLOCK+RECHARG      400NS CIRCUIT DELAY AND POSITIONS
0062 00                   NOP
0063 00                   NOP
0064 99 FB                ANL     P1,#-1-RECHARG         THE 'IN' TO CAUSE MINIMUM NOISE.
0066 99 FE                ANL     P1,#-1-CLOCK
0068 1B                   INC     R3             BUMP BAR COUNT
0069 2B                   XCH     A,R3           IF BAR BIT COUNT
006A 96 6D                JNZ     READ2          ZERO
006C 07                   DEC     A              THEN SET BAR/SPACE COUNT BACK TO 255
006D 2B          READ2    XCH     A,R3
006E 53 10                ANL     A,#BARBIT      MASK BAR BIT
0070 2A                   XCH     A,R2           SAVE NEW BIT LEVEL
0071 DA                   XRL     A,R2           IF BIT LEVEL
0072 C6 7D                JZ      READ6          CHANGED
0074 27                   CLR     A              THEN CLEAR NEW COUNT
0075 2B                   XCH     A,R3           AND
0076 A0                   MOV     @R0,A          STORE OLD COUNT.
0077 18                   INC     R0             ADJUST COUNT PTR
0078 F8                   MOV     A,R0
0079 D3 FF                XRL     A,#CNTEND-1
007B C6 84                JZ      READEX         EXIT - COUNT AREA FULL
007D ED 5B       READ6    DJNZ    R5,READLP      LOOP 256 X 4 TIMES
007F EC 5B                DJNZ    R4,READLP
0081 FB                   MOV     A,R3           WRITE LAST COUNT
0082 A0                   MOV     @R0,A
0083 18                   INC     R0
0084 89 05       READEX   ORL     P1,#RECHARG+CLOCK
0086 C4 E9                JMP     CNTEND         GOTO END COUNT BUFFER
                 *
                 * FILTER ELIMINATES AN INVALID COUNT BY ADDING IT INTO THOSE COUNTS
                 * ON EACH SIDE. THIS ASSUMES THAT A BAD ARRAY BIT(S) CAUSED AN
                 * INVALID TRANSITION. THIS INVALID TRANSITION OR COUNT SHOULD
                 * REALLY BE PART OF THE COUNTS ON EACH SIDE OF IT. WITH PRESENT
                 * 2.5/1 OPTICS THE NARROWEST UPC BAR COULD BE AS LOW AS 2.
                 * THEREFORE INVALID COUNTS ARE 0 < BAR COUNT < 2.
                 *
                 *
                 * COUNT       : 0   1   2   3   4   5   6
                 *             :---     ---     ---     ---
                 * VALUE       :   :   :   :   :   :   :   :
                 * BEFORE      : 1 : 3 : 5 : 1 : 6 : 1 : 3 : END
                 *             :   :---:   :---:   :---:   :---- . . .
                 *             :
                 *             :---     ---
                 * VALUE       :   :   :   :
                 * AFTER       : 9 : 13: 3 : END
                 *             :   :---:   :---- . . .
                 *             :
                 *             :
                 *
0088 B8 3C       FILTER   MOV     R0,#CNTBEG     INIT COUNT PTRS
008A F0                   MOV     A,@R0
```

```
008B  C6 B1           JZ      FILIFA          NO COUNTS
008D  B9 3D           MOV     R1,#CNTBFG+1    NEXT COUNT PTR
008F  03 FE           ADD     A,#-2           INVALID COUNT?
0091  F0              MOV     A,@R0
0092  E6 A0           JNC     FIL12           (YES)
0094  F1      FILILP  MOV     A,@R1           IS NEXT COUNT PTR AT EOD?
0095  C6 B2           JZ      FILIFOD         (YES)
0097  03 FE           ADD     A,#-2           IS NEXT COUNT < MINIMUM COUNT?
0099  F6 AC           JC      FILINXT         (NO)
009B  F1              MOV     A,@R1           THEN NEXT COUNT
009C  60              ADD     A,@R0           PLUS FIRST COUNT
009D  19              INC     R1
009E  F6 A3           JC      FIL14
00A0  61      FIL12   ADD     A,@R1           PLUS COUNT AFTER NEXT COUNT
00A1  E6 A5           JNC     FIL16
00A3  23 FF   FIL14   MOV     A,#255          (COUNT OVERFLOW - SET TO COUNT LIMIT)
00A5  A0      FIL16   MOV     @R0,A           TO FIRST COUNT
00A6  F1              MOV     A,@R1           IS NEXT COUNT PTR AT EOD?
00A7  C6 B2           JZ      FILIFOD         YES
00A9  19              INC     R1
00AA  04 94           JMP     FILILP
00AC  18      FILINXT INC     R0              NOT BAD COUNT - BUMP FIRST COUNT PTR
00AD  F1              MOV     A,@R1           MOVE NEXT COUNT
00AE  A0              MOV     @R0,A           TO FIRST COUNT
00AF  19              INC     R1              BUMP NEXT COUNT PTR
00B0  04 94           JMP     FILILP
00B2  18      FILIFOD INC     R0
00B3  C4 E9   FILIFA  JMP     CNTEOD          GOTO END COUNT BUFFER
              *
              * ADJUST COUNTS BY 4 TIMES.
              * BIGGEST COUNT SHOULD BE LESS THAN 64 BEFORE ADJUSTMENT.
              * MULTIPLY COUNTS BY 4 LIMITING RESULT TO 255.
              * THIS ALLOWS MORE ACCURACY IN BINARY APPROXIMATION ALGORITHMS
              * USED IN 'FINDI' AND 'DELTAT'.
              *
00B5  B8 3C   ADJUST  MOV     R0,#CNTBFG
00B7  F0      ADJLP   MOV     A,@R0           GET COUNT
00B8  C6 CA           JZ      ADJEX           EOD
00BA  F7              RLC     A               TIMES 2
00BB  12 C2           JB0     ADJ2            VALUE OVERFLOW
00BD  F7              RLC     A               TIMES 2
00BE  12 C2           JB0     ADJ2
00C0  04 C4           JMP     ADJ4
00C2  23 FF   ADJ2    MOV     A,#255          MULTIPLY OVERFLOW - SET COUNT TO MAX VALUE
00C4  A0      ADJ4    MOV     @R0,A           PUT BACK COUNT
00C5  18              INC     R0
00C6  04 B7           JMP     ADJLP
00C8  83      ADJEX   RET
              *
              * COMPARE OF R4 TO R7.
              * RETURN ERROR IF = ELSE OK AND CARRY INDICATES WHICH IS LARGER.
              *
00C9  F0      R4VSR7  MOV     A,@R0           C2
00CA  AC              MOV     R4,A            R4 = C2
00CB  37              CPL     A
00CC  17              INC     A
00CD  6F              ADD     A,R7
00CE  C6 D2           JZ      R4R7ER          R4 = R7
              *       RRC     A               SAVE CARRY
              *       MOV     R1,A
              *       RLC     A
              ** MAKE SURE SMALLER COUNT IS IN R4
              ** AND LARGER COUNT IS IN R7
```

```
                  *          MOV    A,R6
                  *          JC     R6R72         R7 IS LARGER
                  *          XCH    A,R7          R6 IS LARGER; SWAP R6/R7
                  *          MOV    R6,A
                  *R6R72     RR     A             50%
                  *          RR     A             25%
                  *          ANL    A,#63
                  *          JNZ    R6R74
                  *          INC    A             MAKE SURE % IS AT LEAST 1
                  *R6R74     ADD    A,R6          SMALLER+%
                  *          CPL    A
                  *          ADD    A,R7          PLUS SMALLER
                  *          JNC    R6R7ERR       LARGER <= SMALLER+%; ERROR
                  *          MOV    A,R1          RESTORE CARRY
                  *          RLC    A
                             RETUR
00D0              R6R7ERR RETERR
00D2
00D5                         PAGE   256           NEXT PAGE
                  *
0100   B8 22      DECODE  MOV    R0,#FRAMPTR      INIT FRAMING UPCOS PTR
0102   B0 3D              MOV    @R0,#CPTINEG+1   (SKIP QUIET ZONE COUNT)
0104              DECODLP
                   IF DEBUG
                   ENDIF
0104   D4 05             CALL   FRAME         FRAME COUNTS, RETURN TYPE INDEX IN R1,
0106                     JERR   DECUFRR       RETURN COUNT POINTER IN R0.
0108   23 20             MOV    A,#' '
010A   F4 DB             CALL   FISIR         BLANK F1
010C   B4 B0             CALL   CLRBACK       CLEAR BACKWARDS SWITCH
010E   B4 F4             CALL   SETCPTR       INIT CHARACTER BUFFER POINTER
                  * INDEX JUMP TABLE VIA R7 FOR DECODE
0110   23 14             MOV    A,#LOW,DECTAB
0112   6F                ADD    A,R7
0113   B3                JMPP   @A
0114   18         DECTAB DB     .LOW.UPCEANL  R7=0 UPC-A, EAN-13
0115   53                DB     .LOW.EAN8     R7=1 EAN-8
0116   9D                DB     .LOW.UPCEB    R7=2 UPC-E BACKWARD
0117   A4                DB     .LOW.UPCEF    R7=3 UPC-E FORWARD
                  *
                  * UPC-A OR EAN-13
0118   54 42      UPCEANL CALL  CHAR6TS       DECODE 6 CHARACTERS - LEFT HALF
011A   54 42             CALL   CHAR6TS       DECODE 6 CHARACTERS - RIGHT HALF
011C                     JERR   DECUFLP
011E   B8 4E             MOV    R0,#CHARBEG+6 RIGHT HALF INDICATES DIRECTION OF SCAN
0120   94 AE             CALL   DIRIS1
0122                     JERR   UELB          MIXED DIRECTION - MIGHT BE BACKWARDS
0124   E6 38             JNC    UELF          FORWARD
0126   B9 34      UELB   MOV    R1,#CHARBEG+11
0128   94 CC             CALL   SWAP          BACKWARDS - SWAP CHARACTERS END-FOR-END
012A   D4 B0             CALL   SETBACK       SET BACKWARDS SWITCH
012C   B8 29             MOV    R0,#CHARBEG
012E   94 C2             CALL   DIRCOMP       COMPLEMENT DIRECTION BITS AFTER SWAP
0130   B8 2F             MOV    R0,#CHARBEG+6
0132   94 AE             CALL   DIRIS1
0134                     JERR   DECUFRR       DIRECTION SHOULD BE 'ALL SAME'
0136   F6 4C             JC     DECUFRR       DIRECTION SHOULD BE 'LEFT'
0138   94 47      UELF   CALL   DIRCHRF       GET EAN-13 F1 CHAR PER DIRECTION PATTERN
013A                     JERR   DECUFRR       SHOULD FIND A F1 OF '0' FOR UPC-A
013C   B8 43             MOV    R0,#.LOW.CHKA13 13 DIGIT FIELD CHECK MULTIPLIER TABLE
013E   74 42             CALL   MODCHK        CHECK MOD CHECK CHARACTER
0140                     JERR   DECUFRR
                  * UPC-A OR EAN-13: IF F1 IS 0 THEN EAN ELSE UPC.
0142   B8 28             MOV    R0,#CHARF1
```

```
0146 F8               MOV   A,R0
0145 D3 40            XRL   A,#'0'          F1 = 07
0147 96 4F            JNZ   UEEEANL         NO - EAN LONG
0149 B0 20            MOV   @R0,#' '        UPC LONG - BLANK F1
014B 23 02            MOV   A,#LONG+UPC
014D 04 B4            JMP   DECUT
014F 23 03  UEEEANL   MOV   A,#LONG+EAN
0151 24 B4            JMP   DECUT

                ;
                ; EAN-8
0153 54 36  EAN8      CALL  CHAR41S         DECODE 4 CHARACTERS - LEFT HALF
0155 54 36            CALL  CHAR41S         DECODE 4 CHARACTERS - RIGHT HALF
0157                  JERR  DECUFER
0159 B8 29            MOV   R0,#CHARBEG     BOTH HALVES INDICATE DIRECTION
015B 94 AF            CALL  DIRTST
015D                  JERR  DECUFER         DIRECTION SHOULD BE 'ALL SAME'
015F F6 67            JNC   FSF             FORWARD
0161 B9 30            MOV   R1,#CHARBEG+7
0163 94 CC            CALL  SWAP            BACKWARDS - SWAP CHARACTERS END-FOR-END
0165 D4 00            CALL  SETBACK         SET BACKWARDS SWITCH
0167 BE A1  FSF       MOV   R6,#.LOW.CHKF8  EAN-8 CHECK MULTIPLIER TABLE
0169 74 B2            CALL  MODCHK          CHECK MOD CHECK CHARACTER
016B 23 01            MOV   A,#EAN+SHORT
016D 24 B4            JMP   DECUT

                ;
                ; UPC-E(0,1) FORWARDS
016F 54 32  UPCEF     CALL  CHAR61S         DECODE 6 CHARACTERS - ZERO SUPPRESSED FORWARDS
0171                  JERR  UEF2
0173 94 07            CALL  DIRCHK7         GET #SYS/CHECK CHARS PER DIRECTION PATTERN
0175                  JOK   UECHK           DIRECTION OK, GOTO DO MOD CHECK
0177 B8 27  UEF2      MOV   R0,#FRAMPTR     MIGHT BE A BACKWARDS SCAN CONFUSED
0179 F0               MOV   A,@R0           BY A '6' AS THE 1ST (LEFT) CHARACTER.
017A 03 02            ADD   A,#2            ADJUST FRAMING POINTER AND
017C A0               MOV   @R0,A
017D D4 6F            CALL  FRAME2          TRY TO FRAME A BACKWARDS UPC SHORT.
017F                  JERR  DECUFER         NO-GO
0181 34 C8            CALL  UPCUB           DECODE UPC-E BACKWARDS
0183                  JERR  DECUFER
0185 B8 29            MOV   R0,#CHARBEG     IF EVERYTHING ELSE WORKED THEN THE
0187 F0               MOV   A,@R0           LEFT CHARACTER SHOULD BE A FORWARD '6'.
0188 D3 36            XRL   A,#'6'
018A 96 0C            JNZ   DECUFER
018C 24 94            JMP   UECHK

                ;
                ; UPC-E(0,1) BACKWARDS
018E 34 C8  UPCEB     CALL  UPCUB           DECODE UPC-E BACKWARDS
0190                  JERR  DECUFER
0192 B8 2E  UECHK     MOV   R0,#CHARBEG+5   PER 6TH CHAR'S VALUE DO MOD10 CHECK
0194 F0               MOV   A,@R0
0195 53 7F            ANL   A,#127          MASK OFF DIRECTION BIT
0197 03 CD            ADD   A,#-'3'
0199 E6 AE            JNC   UECU12          DIGIT 6 = 0, 1, OR 2
019B C6 A6            JZ    UEC3            DIGIT 6 = 3
019D 07               DEC   A
019E C6 AA            JZ    UEC4            DIGIT 6 = 4
01A0 BE A8            MOV   R6,#.LOW.CHK259 CHECK MULTIPLIER TABLE
01A2 24 B0            JMP   UECC
01A4 BE B7  UEC3      MOV   R6,#.LOW.CHK23  CHECK MULTIPLIER TABLE
01A6 24 B0            JMP   UECC
01A8 BE AC  UEC4      MOV   R6,#.LOW.CHK24  CHECK MULTIPLIER TABLE
01AA 24 B0            JMP   UECC
01AC BE B4  UECU12    MOV   R6,#.LOW.CHK2U12        CHECK MULTIPLIER TABLE
01AE 74 B2  UECC      CALL  MODCHK          CHECK MOD CHECK CHARACTER
```

```
01B4  23 90             MOV     A,#UPC+SHORT      TRY UPC-E FORWARD
01B6           DECUT    JERR    DECUPLP
01B6  F4 00             CALL    TIPESTR
01B8  F4 00             CALL    DECUADP           TRY TO DECODE AN ADDON CODE
01BA           DECUOK
                IF DEBUG
                ENDIF
01BB                    RETUR
01BC           DECUFRR
               * SET CHARTYP TO INVALID AND EOL THE 2 DATA BUFFERS
01BC  B9 27             MOV     R1,#CHARTYP
01BE  B1 2A             MOV     @R1,#'*'          '*' INDICATES BAD SCAN
01C0  19                INC     R1
01C1  B1 00             MOV     @R1,#EOD          EOD WITH NO DATA FOR MAIN BARCODE
01C3  94 DC             CALL    CHADEOD           EOD WITH NO DATA FOR ADDON
                IF DEBUG
                ENDIF
01C5                    RETERR
               *
               *
               *
01C6  B4 E4    UPCDB    CALL    SETCPTR           INIT CHARACTER BUFFER POINTER
01CA  54 32             CALL    CHARR1S           DECODE 6 CHARACTERS - ZERO SUPRESSED BACKWARDS
01CC                    JERR    UPCDEA
01CE  D4 00             CALL    SETBACK
01D0  B9 2E             MOV     R1,#CHARBEG+5
01D2  94 CC             CALL    SWAP              BACKWARDS - SWAP CHARACTERS END-FOR-END
01D4  B8 29             MOV     R0,#CHARBEG
01D6  94 C2             CALL    DIRCMP            COMPLEMENT DIRECTION BITS AFTER SWAP
01D8  84 07             JMP     DIRCHK7           GET #SYS/CHECK CHARS PER DIRECTION PATTERN
01DA  83       UPCDEA   RET
01DB                    PAGE    256               NEXT PAGE
               *
               * TRANSMIT FORMATTED BARCODE TO TERMINAL, SKIP BLANKS,
               * APPEND ASCII MOD 10 HASH CHARACTER, AND WAIT FOR RESPONSE.
               *
0200           SEND
                IF DEBUG
                ENDIF
0200  BA 00             MOV     R2,#0             CLEAR HASH TOTAL
0202  B8 27             MOV     R0,#CHARS         SEND DECODED BARCODE
0204  B4 9F             CALL    SENDBUF
0206  B8 36             MOV     R0,#CHARADD       SEND DECODED ADDON BARCODE
0208  B4 9F             CALL    SENDBUF
020A  FA                MOV     A,R2              SEND ASCII HASH TOTAL
020B  53 0F             ANL     A,#15
020D  43 30             ORL     A,#'0'            ADJUST TO ASCII
020F  B4 5B             CALL    OUTCHAR
0211  B4 55             CALL    OUTLINE
               * 0.5 SEC TIMEOUT TO RECEIVE RESPONSE
0213  BC 1B             MOV     R4,#24            TIME LIMIT FOR RESPONSE TO DATA
0215  F4 35    SENDPLP  CALL    GETCHAR           IF RECEIVE CHAR
0217  D3 06             XRL     A,#ACK            IS 'GOOD'
0219  C6 30             JZ      SENDOK            THEN EXIT OK
021B  D3 06             XRL     A,#ACK            (MASK ACCUM BACK TO WHAT IT WAS)
021D  D3 15             XRL     A,#NAK            IF 'BAD'
021F  96 27             JNZ     SENDR4
0221                    JUFN    SENDFRR           AND NOT PORTABLE THEN ERROR
0223  94 1A             CALL    DELAY1            ELSE DELAY 10MS THEN RE-SEND DATA
0225  44 00             JMP     SEND
0227           SENDR4   JPORT   SENDPLP           DON'T TIMEOUT IN PORTABLE
0229  FD 15             DJNZ    R5,SENDPLP        OUT OF RETRY
```

```
0228  FC 15              DJNZ    R4,SENDRLP      OUT OF TIME?
0220            SENDFHR  RETERN                  EXIT WITH ERROR
0430            SENDOK   RETOK                   EXIT WITH NO ERROR
                *
                * DECODE THE COUNTS INTO CHARACTERS
                *
                *
                *        :--------- T1 --------->:
                *        :                       :
                *        ------------------------------------------------
                *        :   C1   :    C2    :    C3    :    C4    :
                *        ------------------------------------------------
                *                 :                       :
                *                 :<-------- T2 --------->:
                *
                *
0232  54 49     CHAR6IS  CALL    CHAR            DECODE 6 CHARACTERS
0234  54 49              CALL    CHAR
0236  54 49     CHAR4IS  CALL    CHAR            DECODE 4 CHARACTERS
0238  54 49              CALL    CHAR
023A  54 49              CALL    CHAR
023C  54 49              CALL    CHAR
023E  F8                 MOV     A,R0
023F  03 05              ADD     A,#5            BUMP COUNT PTR 5 COUNTS
0241  A8                 MOV     R0,A            TO SKIP CENTER GUARD BARS.
0242  83                 RET
                *
0243  54 47     CHAD3IS  CALL    CHART
0245  54 47     CHAD2IS  CALL    CHART
0247  18        CHART    INC     R0
0248  18                 INC     R0
0249            CHAR     JERR    CHAREX
0248  34 00              CALL    FINDT
024D  C8                 DEC     R0
024E  C8                 DEC     R0
024F                     JERR    CHARERR         INVALID COUNT IN CHARACTER
0251  C8                 DEC     R0
0252  C8                 DEC     R0
0253  84 AA              CALL    DELTAT
0255                     JERR    CHARER1
0257  FE                 MOV     A,R6
0258  AD                 MOV     R5,A            R5 = T1
0259  94 4A              CALL    DELTAT
025B                     JERR    CHARERR
025D  FE                 MOV     A,R6            R6 = T2
025E  D3 05              XRL     A,#5
0260  C6 87              JZ      C1FO1           T2 = 5
0262  FD                 MOV     A,R5
0264  D3 02              XRL     A,#2
0265  C6 82              JZ      C1FO1           T1 = 2
0267  FD                 MOV     A,R5
0268  D3 05              XRL     A,#5
026A  C6 A5              JZ      C3FO1           T1 = 5
026C  FE                 MOV     A,R6
026D  D3 02              XRL     A,#2
026F  C6 A5              JZ      C3FO1           T2 = 2
0271  FD                 MOV     A,R5
0272  D3 03              XRL     A,#3
0274  96 99              JNZ     CHAR2           T1 = 4
0276  C8                 DEC     R0              T1 = 3, COMPARE C1 VS. C2, 12 OR 21, TO TELL
0277  C8                 DEC     R0              THE RIGHT 1/7'S AND LEFT 2/8'S APART
0278  F0                 MOV     A,@R0           C1
0279  AF                 MOV     R7,A            R7 = C1
```

```
027A  18              INC   R0        C2
027B  14 C9           CALL  R4VSR7    COMPARE LARGER-25% VS SMALLER
027D  18              INC   R0        (LEAVE R0 POINTING AT C3)
027E                  JERR  CHARERR
0280  F6 0F           JC    C2EQ1
0282  B9 01   C1EQ1   MOV   R1,#1     C1 = 1
0284  FD              MOV   A,R5
0285  07              DEC   A
0286  AA              MOV   R2,A      C2 = 11-C1
0287  37              CPL   A
0288  17              INC   A
0289  6E              ADD   A,R6
028A  AB              MOV   R3,A      C3 = 12-C2
028B  6D              ADD   A,R5      C4 = 7-11-C3
028C  44 B1           JMP   CHAR4
028E  BA 01   C2EQ1   MOV   R2,#1     C2 = 1
0290  FD              MOV   A,R5
0291  07              DEC   A
0292  A9              MOV   R1,A      C1 = 11-C2
0293  FE              MOV   A,R6
0294  07              DEC   A
0295  AB              MOV   R3,A      C3 = 12-C2
0296  6D              ADD   A,R5      C4 = 7-11-C3
0297  44 B1           JMP   CHAR4
0299  18      CHAR2   INC   R0        T1 = 4, COMPARE C3 VS. C4, 12 OR 21, TO TELL
029A  F0              MOV   A,@R0     THE LEFT 1/7'S AND RIGHT 2/8'S APART
029B  AF              MOV   R7,A      R7 = C4
029C  C8              DEC   R0        C3
029D  14 C9           CALL  R4VSR7    COMPARE LARGER-25% VS SMALLER
029F                  JERR  CHARERR   75%LARGER < SMALLER = ERROR
02A1  BB 02           MOV   R3,#2     C3 = 2 UNLESS
02A3  E6 A7           JNC   C3EQ2     C3 > C4 THEN C3 = 2
02A5  BB 01   C3EQ1   MOV   R3,#1     C3 = 1
02A7  FB      C3EQ2   MOV   A,R3
02A8  37              CPL   A
02A9  17              INC   A
02AA  6E              ADD   A,R6
02AB  AA              MOV   R2,A      C2 = 12-C3
02AC  37              CPL   A
02AD  17              INC   A
02AE  6D              ADD   A,R5
02AF  A9              MOV   R1,A      C1 = 11-C2
02B0  6E              ADD   A,R6      C4 = 7-C1-T2
02B1  37      CHAR4   CPL   A
02B2  03 07           ADD   A,#7
02B4  AC              MOV   R4,A      BACK OF 'INC A' ZERO JUSTIFIES MODULE SIZE
02B5  C9              DEC   R1        ZERO JUSTIFY MODULE SIZE
02B6  CA              DEC   R2        ZERO JUSTIFY MODULE SIZE
02B7  CB              DEC   R3        ZERO JUSTIFY MODULE SIZE
                      *
                      * CREATE TABLE LOOKUP MASK FROM 2-BIT VALUE OF C1, C2, C3, AND C4
                      * MASK IS B7-B0  C1C1 C2C2 C3C3 C4C4
                      * WHERE CNCN HAS A VALUE OF 0 TO 3 WHICH REPRESENTS A TRUE COUNT WIDTH
                      * OF 1-4 MODULES.
                      *
02B8  F9              MOV   A,R1      C1 VALUE OF 0-3
02B9  E7              RL    A         SHIFT C1 LEFT 2 BITS
02BA  E7              RL    A
02BB  4A              ORL   A,R2      C2
02BC  E7              RL    A
02BD  E7              RL    A
02BE  4B              ORL   A,R3      C3
02BF  E7              RL    A
```

```
02C0  E7                RL      A
02C1  4C                ORL     A,R4           C4
02C2  AD                MOV     R5,A           LOOK-UP MASK TO R5
02C3  BE 4H             MOV     R6,#.LOW.CHRTABF        SEARCH FOR FORWARD CHARACTER
02C5  74 32             CALL    TABSRCH
02C7                    JNZ     CHAR6
02C8  BE 55             MOV     R6,#.LOW.CHRTABB        SEARCH FOR BACKWARD CHARACTER
02CA  74 32             CALL    TABSRCH
02CC  43 80             ORL     A,#BACKCHR     TURN ON BACKWARDS BIT IN CHARACTER
02D1  44 D6             JMP     CHAR6
02D3  18        CHARERI INC     R0
02D4  23 2A     CHARERR MOV     A,#'*'         BAD CHARACTER VALUE
                 IF DEBUG
                 ENDIF
02D6  AA        CHAR6   MOV     R2,A           SAVE CHARACTER
02D7  B9 23             MOV     R1,#CHARPTR    POINT TO CHARACTER BUFFER PTR
02D9  F1                MOV     A,@R1          GET PTR
02DA  11                INC     @R1            BUMP CHARACTER PTR
02DB  A9                MOV     R1,A
02DC  FA                MOV     A,R2
02DD  A1                MOV     @R1,A          STORE CHARACTER
02DE  19                INC     R1             APPEND NEW END
02DF  B1 00             MOV     @R1,#EOD
                 IF DEBUG
                 ENDIF
02E1  18                INC     R0
02E2  18                INC     R0             LEAVE R0 POINTING AT C1 OF NEXT CHARACTER
02E3  83        CHAREX  RET
02F4                    PAGE    256
*
*
* CONVERT 4 CHARACTER COUNTS TO:
*
*       R7 = 1 = C1+C2+C3+C4 = 7 MODULE CHARACTER COUNT
*       R2 = 2.5T/7 = .35T = 1/4+1/16+T/32+1/64 = 2 MODULE COUNT REFERENCE
*       R3 = 3.5T/7 = .50T = 1/2 = 3 MODULE COUNT REFERENCE
*       R4 = 4.5T/7 = .64T = 1/2+1/8+1/64 = 4 MODULE COUNT REFERENCE
*
0300  BF 00     FINDT   MOV     R7,#0
0302  BE 04             MOV     R6,#4
0304  F0        FINDTLP MOV     A,@R0          ADD 4 COUNTS TOGETHER TO CREATE T
0305  6F                ADD     A,R7
0306  F6 2F             JC      FINDERR        ADD OVERFLOW
0308  AF                MOV     R7,A
0309  18                INC     R0
030A  EE 04             DJNZ    R6,FINDTLP
030C  97                CLR     C
030D  67                RRC     A       T/2
030E  AB                MOV     R3,A           R3 = T/2
030F  AC                MOV     R4,A           R4 = T/2
0310  97                CLR     C
0311  67                RRC     A       T/4
0312  AA                MOV     R2,A           R2 = T/4
0313  97                CLR     C
0314  67                RRC     A       T/8
0315  AE                MOV     R6,A
0316  6C                ADD     A,R4
0317  AC                MOV     R4,A           R4 = R4 + T/8
0318  FE                MOV     A,R6
0319  97                CLR     C
031A  67                RRC     A       T/16
031B  AE                MOV     R6,A
031C  6A                ADD     A,R2
```

```
0310  AA            MOV     R4,A                R4 = R2 + T/16
031E  FE            MOV     A,R6
031F  97            CLR     C
0320  67            RRC     A        T/32
0321  AE            MOV     R6,A
0322  6A            ADD     A,R2
0323  AA            MOV     R2,A                R2 = R2 + T/32
0324  FE            MOV     A,R6
0325  97            CLR     C
0326  67            RRC     A        T/64
0327  AE            MOV     R6,A
0328  6A            ADD     A,R2
0329  AA            MOV     R2,A                R2 = R2 + T/64
032A  FE            MOV     A,R6
032B  6C            ADD     A,R4
032C  AC            MOV     R4,A                R4 = R4 + T/64
032D                RETUR
032E        FINDFRR RETERR
            *
            * SEARCH TABLE AT R0 FOR MATCH ON MASK IN R5.
            * EACH TABLE IS 10 1-BYTE SEARCH ARGUMENTS.
            * THE RETURNED VALUE IS THE TABLE INDEX AS AN ASCII '0' TO '9'.
            *
0332  BF 0A TABSRCH MOV     R7,#10              TABLE LENGTH
0334  F8            MOV     A,R0                SAVE TABLE ADDR FOR RETURN VALUE CALC
0335  AC            MOV     R4,A
0336  F8    TABSLP2 MOV     A,R0
0337  A3            MOVP    A,@A                GET TABLE MASK
0338  DD            XRL     A,R5                COMPARE TO BAR CODE CHARACTER MASK
0339  C6 43         JZ      TABSFND
033B  18            INC     R0                  NOT EQUAL - BUMP TABLE INDEX TO NEXT MASK
033C  EF 36         DJNZ    R7,TABSLP2          LOOP THRU N TABLE ENTRIES
033E  23 2A         MOV     A,#'*'
             IF DEBUG
             ENDIF
0342                RETERR
0343  FC    TABSFND MOV     A,R4                SUBTRACT TABLE BEGIN ADDR
0344  37            CPL     A
0345  17            INC     A
0346  68            ADD     A,R0                FROM MATCH ADDR
0347  43 30         ORL     A,#'0'              AND MAKE IT ASCII
             IF DEBUG
             ENDIF
0349                RETUR
            *
            * MASK IS THE COUNT'S WIDTH IN MODULES ZERO NORMALIZED WITH
            * B7,6=C1, B5,4=C2, B4,3=C3, B1,0=C4.
            *
            * TABLE OF LEFT SCANNED CHARACTERS        C1234   1123
034B  90    CHRTABF DB      10010000B      0         3211    532
034C  54            DB      01010100B      1         2221    443
034D  45            DB      01000101B      2         2122    334
034E  30            DB      00110000B      3         1411    552
034F  48            DB      00010010B      4         1132    245
0350  18            DB      00011000B      5         1231    354
0351  03            DB      00000011B      6         1114    225
0352  21            DB      00100001B      7         1312    443
0353  12            DB      00010010B      8         1213    334
0354  81            DB      10000001B      9         3112    423
            *
            * TABLE OF RIGHT SCANNED CHARACTERS
0355  06    CHRTABR DB      00000110B      0         1123    235
0356  15            DB      00010101B      1         1222    344
0357  51            DB      01010001B      2         2212    433
```

```
0358  0C             DB      00001100B      3       1141    255
0359  60             DB      01100000B      4       2311    542
035A  24             DB      00100100B      5       1321    453
035B  C0             DB      11000000B      6       4111    527
035C  48             DB      01001000B      7       2131    344
035D  84             DB      10000100B      8       3121    433
035E  42             DB      01000010B      9       2113    324
                     *
                     * DIRECTION BIT PATTERN FOR UPC-E
035F  38    DIRTAB7  DB      111000B        0
0360  34             DB      110100B        1
0361  32             DB      110010B        2
0362  31             DB      110001B        3
0363  2C             DB      101100B        4
0364  26             DB      100110B        5
0365  23             DB      100011B        6
0366  2A             DB      101010B        7
0367  29             DB      101001B        8
0368  25             DB      100101B        9
                     *
                     * DIRECTION BIT PATTERN FOR EAN
0369  00    DIRTAB8  DB      000000B        0
036A  0B             DB      001011B        1
036B  0D             DB      001101B        2
036C  0E             DB      001110B        3
036D  13             DB      010011B        4
036E  19             DB      011001B        5
036F  1C             DB      011100B        6
0370  15             DB      010101B        7
0371  16             DB      010110B        8
0372  1A             DB      011010B        9
                     *
                     * DIRECTION BIT PATTERN FOR ADDON-5
0373  18    DIRTAB5  DB      11000B         0
0374  14             DB      10100B         1
0375  12             DB      10010B         2
0376  11             DB      10001B         3
0377  0C             DB      01100B         4
0378  06             DB      00110B         5
0379  03             DB      00011B         6
037A  0A             DB      01010B         7
037B  09             DB      01001B         8
037C  05             DB      00101B         9
                     *
                     * CALCULATES UPC MOD 10 CHECK AND COMPARES RESULT WITH DECODED
                     * CHECK DIGIT. WEIGHTING FACTOR IS IN TABLE ABD ON THIS PAGE
                     *
                     * ON ENTRY:
                     * R1 POINTS TO BUFFER AREA CONTAINING, FROM LEFT TO RIGHT, DATA
                     * DIGITS, CHECK DIGIT, END.
                     * R6 POINTS TO A TABLE OF WEIGHTING FACTORS.
                     *
                     * ON EXIT:
                     * IF CHECKS MATCH THEN NO ERROR SET ELSE ERROR SET.
                     *
037D  B9 36 MCHKAD5  MOV     R1,#CHARADD     DO CHECK ON ADDON CODE AREA
037F  AD             MOV     R5,A            CHECK SEED PASSED IN ACCUMULATOR
0380  64 86          JMP     MCHKLP2
0382  B9 28 MUPCHK   MOV     R1,#CHARBF
0384  BD 00          MOV     R5,#0           CLEAR CHECK BUCKET
0386  FE    MCHKLP2  MOV     A,R6            GET WEIGHTING FACTOR FOR THIS CHARACTER
0387  A3             MOVP    A,@A
0388  C6 91          JZ      MCHK2           SKIP IF FACTOR IS ZERO
```

```
03BA  AF              MOV   R7,A          USE FACTOR AS ADD-LOOP COUNTER
03BB  F0              MOV   A,R5          GET CHARACTER
03BC  61     MCHKLP4  ADD   A,@R1         ACCUM CHARACTER N TIMES
03BD  53              DA    A
03BE  EF BC           DJNZ  R7,MCHKLP4
0390  AD              MOV   R5,A          SAVE CHECK RESULT
0391  F1     MCHK2    MOV   A,@R1
0392  C6 98           JZ    MCHK4         EOD
0394  18              INC   R0            BUMP TABLE PTR
0395  19              INC   R1            BUMP CHARACTER STRING PTR
0396  64 86           JMP   MCHKLP2
0398  FD     MCHK4    MOV   A,R5          CHECK SHOULD BE ZERO
0399  53 0F           ANL   A,#15         MASK OFF ZONE
039B                  DA    A
039C  C6 A0           JZ    MCHKEX
039E                  ERR
03A0         MCHKEX
              IF DEBUG
              ENDIF
03A0  83              RET
             *
             * CHECK MULTIPLIER TABLES ON SAME PAGE AS 'MODCHK'
             *
03A1  00 03  CHKEN    DB    0,3                   ; 0,3,1,3,1,3,1,3,1
03A3  01 03 01 03  CHK813  DB  1,3,1,3,1          ; 1,3,1,3,1,3,1,3,1,3,1,3,1
03A7  01
03A8  03 01 03 01  CHK259  DB  3,1,3,1            ; 3,1,3,1,3,1,3,1
03AC  03 01 03 01  CHK24   DB  3,1,3,1,3,3,0,1    ; 3,1,3,1,3,3,0,1
03B0  03 03 00 01
03B4  03 01 03     CHK2012 DB  3,1,3              ; 3,1,3,3,1,3,1,1
03B7  03 01 03 01  CHK23   DB  3,1,3,1,1,3,0,1    ; 3,1,3,1,1,3,0,1
03BB  01 03 00 01
             *
03BE  03 09 03 09  CHKAD5  DB  3,9,3,9,3          ADDON-5 CHECK WEIGHTING FACTORS
03C3  03
             *
             * THIS ROUTINE DOES THE MOD CHECK ON ADDON-2 CODE
             * THE BINARY RESULT OF A MOD4 FUNCTION ON THE 2 ADDON-2 DIGITS
             * SHOULD MATCH THE DIRECTION BIT PATTERN OF THE 2 DIGITS.
             *
03C4  94 9D  MCHKAD2 CALL   DIRAD2                GET DIRECTION MASK (R5)
             * CONVERT 2 ASCII BCD DIGITS OF ADDON-2 CODE TO 1-BYTE BINARY
03C6  B9 36           MOV   R1,#CHARADD
03C8  F1              MOV   A,@R1         GET 10'S DIGIT
03C9  53 0F           ANL   A,#15
03CB  F7              RL    A
03CC  AA              MOV   R2,A          R2 = 2(10'S DIGIT)
03CD  F7              RL    A
03CE  F7              RL    A
03CF  6A              ADD   A,R2          2(10'S DIGIT) + 8(10'S DIGIT)
03D0  19              INC   R1
03D1  61              ADD   A,@R1         10(10'S DIGIT) + 1'S DIGIT
03D2  53 03           ANL   A,#3          MOD4
03D4  DD              XRL   A,R5          COMPARE TO DIRECTION BIT PATTERN
03D5  96 D9           JNZ   MAD2ERR
03D7                  RETOK
03D9         MAD2ERR  RETERR
             *
             * SEND DATA IN ROM TABLE POINTED TO BY R1
             * DATA MUST BE ON SAME PAGE AS THIS ROUTINE
             *
03DC  F9     OUTTAB   MOV   A,R1          R1 IS POINTER TO ROM DATA TO SEND
03DD  A3              MOVP  A,@A          GET CHAR @R1 ON THIS ROM PAGE
```

```
03DE  C0 E5            JZ     OUTAHEX         UNTIL END
03E0  B4 DD            CALL   OUTCHAR ,       SEND IT
03E2  19               INC    R1
03E3  64 DC            JMP    OUTIAB
03E5  83       OUTAHEX RET
               *
03E9  AC 31 30 00 IDMESG DB   'L10',EOD
03FA                   PAGE   256             NEXT PAGE
               *
               * UTILITY ROUTINES
               *
0400  BE CF    BEEP    MOV    R0,#203         BEEP ON/OFF FOR 100MS
0402  89 80    BEEPIT  ORL    P1,#BEEPER      BEEP ON FOR 100US
0404  BF 12            MOV    R7,#18
0406  EF 06            DJNZ   R7,$
0408  99 7F            ANL    P1,#-1-BEEPER   BEEP OFF FOR 3MSUS
040A  00               NOP
040B  BF 4B            MOV    R7,#75
040D  EF 0D            DJNZ   R7,$
040F  EE 02            DJNZ   R6,BEEPIT       BEEPED FOR 100MS?
0411  83               RET
               *
               *
               *
0412  23 32    DELAY50 MOV    A,#50
0414  84 1C            JMP    DELAY
0416  23 04    DELAY4  MOV    A,#4
0418  84 1C            JMP    DELAY
041A  23 01    DELAY1  MOV    A,#1
041C  AD       DELAY   MOV    R5,A            PASSED COUNT OF 10MS DELAYS
041D  BE 0A    DELP2   MOV    R6,#10          10 TIMES
041F  BF C8    DELP4   MOV    R7,#200         1000US
0421  FF 21            DJNZ   R7,$            EQUALS 10MS
0423  EE 1F            DJNZ   R6,DELP4
0425  ED 1D            DJNZ   R5,DELP2
0427  83               RET
               *
               * OUTPUT IN ASCII-HEX THE COUNTS IN MEMORY
               *
0428  BC 04    DUMPC4  MOV    R4,#4
042A  84 30            JMP    DMPLP2
               DUMPCNTS
042C  B9 3C            MOV    R1,#CNTBEG               COUNT ADDR
042E  BC FF            MOV    R4,#255
0430  BB 08    DMPLP2  MOV    R3,#8                    GROUPS PER LINE
0432  BA 04    DMPLP4  MOV    R2,#4                    COUNTS PER GROUP
0434  F1       DMPLP6  MOV    A,@R1
0435  B4 12            CALL   OUTHEX
0437  C6 48            JZ     DUMPEA          'U' CHAR IS END-OF-COUNTS
0439  19               INC    R1
043A  EC 3F            DJNZ   R4,DUMP6
043C  A4 0A            JMP    OUTSP
043E  EA 34    DUMP6   DJNZ   R2,DMPLP6
0440  B4 0A            CALL   OUTSP
0442  EB 32            DJNZ   R3,DMPLP4
0444  B4 55            CALL   OUTLINE
0446  84 30            JMP    DMPLP2
0448  A4 55    DUMPEA  JMP    OUTLINE
               *
               * ADDS COUNTS AND AND PAGE1 CALLED 'T'.
               * COMPARES THIS RESULT TO THE MODULE REFERENCES CALCULATED BY 'FIND1'.
               * THEN RETURNS THE WIDTH OF THE 2 COUNTS AS 2, 3, 4, OR 5 MODULES.
```

```
                  *
044A  B8 02       DELTA1   MOV   R0,#2              INIT T VALUE
044C  F0                   MOV   A,@R0
044D  AF                   MOV   R7,A
044E  18                   INC   R0
044F  F0                   MOV   A,@R0
0450  6F                   ADD   A,R7
0451  F6 65                JC    DELTERR            T TOO LARGE - FAIL WITH ERROR
0453  37                   CPL   A
0454  17                   INC   A
0455  AF                   MOV   R7,A
0456  6A                   ADD   A,R2
0457  F6 64                JC    DELTOK             T <= 2.5T/7 THEREFORE T = 2
0459  18                   INC   R0
045A  FF                   MOV   A,R7
045B  6B                   ADD   A,R3
045C  F6 64                JC    DELTOK             T <= 3.5T/7 THEREFORE T = 3
045E  18                   INC   R0
045F  FF                   MOV   A,R7
0460  6C                   ADD   A,R4
0461  F6 64                JC    DELTOK             T <= 4.5T/7 THEREFORE T = 4
0463  18                   INC   R0                 T >  4.5T/7 THEREFORE T = 5
0464              DELTOK   RETOK
0465  83          DELTERR  RET
                  *
                  * USE THE DIRECTION PATTERN OF THE 6 CHARACTERS AT R0 TO LOOK-UP
                  * A CHARACTER; FOR EAN-13 IT IS THE F1 CHARACTER, FOR UPC-E IT IS
                  * THE CHECK CHARACTER.
                  *
0467  B8 29       DIRCHR2  MOV   R0,#CHARREG        ADDR
0469  23 06                MOV   A,#6               LENGTH
046B  94 A1                CALL  DIRCHK             GET DIRECTION MASK
046D  B8 5F                MOV   R0,#LOW.DIRTAB2         UPC-E
046F  74 32                CALL  TABSRCH
0471                       JERR  DIRC12                  NOT FOUND - TRY UPC-E(1)
0473  F4 DF                CALL  CHK2STR            STORE CHECK DIGIT
0475  23 30                MOV   A,#'0'
0477  F4 DA                JMP   FISTR              STORE NUMBER SYSTEM NUMBER IN F1
0479  FD          DIRC12   MOV   A,R5               COMPLEMENT MASK AND TRY AGAIN
047A  D3 3F                XRL   A,#03              LOW 6 BITS ONLY
047C  AD                   MOV   R5,A
047D  B8 5F                MOV   R0,#LOW.DIRTAB2
047F  74 32                CALL  TABSRCH
0481  F4 DF                CALL  CHK2STR            STORE CHECK DIGIT
0483  23 31                MOV   A,#'1'
0485  E4 DA                JMP   FISTR              STORE NUMBER SYSTEM NUMBER IN F1
                  *
                  *
                  *
0487  B8 29       DIRCHRF  MOV   R0,#CHARREG        ADDR
0489  23 06                MOV   A,#6               LENGTH
048B  94 A1                CALL  DIRCHK             GET DIRECTION MASK
048D  B8 69                MOV   R0,#LOW.DIRTABE         EAN-13
048F  74 32                CALL  TABSRCH
0491  E4 DA                JMP   FISTR
                  *
                  *
                  *
0493  B8 36       DIRAD5   MOV   R0,#CHARADD        ADDR
0495  23 05                MOV   A,#5               LENGTH
0497  94 A1                CALL  DIRCHK             GET DIRECTION MASK
0499  B8 73                MOV   R0,#LOW.DIRTAB5         ADDON-5
```

```
0A9B 61 42                    JMP     TAROBCH
                      *
                      * PUT DIRECTION BITS OF N CHARACTERS AT R0 INTO R5
                      *
0A9D 78 36            DIRRD2  MOV     R0,#CHARADD       ADDR
0A9F 23 02                    MOV     A,#2              LENGTH
0AA1                  DIRCHR
                       IF DEBUG
                       ENDIF
0AA1 AF                       MOV     R7,A              LENGTH PASSED IN ACCUMULATOR
0AA2 7D 00                    MOV     R5,#0             CLEAR DIR BIT BUCKET
0AA4 E6               DCHRLP2 MOV     A,@R0
0AA5 53 80                    ANL     A,#120            GET CHAR'S DIR BIT
0AA7 4D                       ORL     A,R5              OR IT WITH PREVIOUS BUCKET VALUE
0AA8 F7                       RL      A                 SHIFT BUCKET LEFT 1 BIT
0AA9 AD                       MOV     R5,A
0AAA 18                       INC     R0
0AAB EF A4                    DJNZ    R7,DCHRLP2
0AAD B3                       RET
                      *
                      * SCAN DIRECTION BITS OF CHARACTERS FROM @R0 TO EOD.
                      * IF DIRECTION BITS ARE MIXED THEN RETURN ERROR.
                      * IF ALL LEFT THEN NO ERROR, NO CARRY.
                      * IF ALL 'RIGHT' THEN NO ERROR, CARRY.
                      *
0AAE                  DIRISI
                       IF DEBUG
                       ENDIF
0AAE F0                       MOV     A,@R0
0AAF C6 0D                    JZ      DIRERR            EOD - FAIL ERROR
0AB1 F7                       RLC     A                 1ST CHARACTER'S DIRECTION BIT TO CARRY
0AB2 18               DIRISLP INC     R0
0AB3 F0                       MOV     A,@R0             COMPARE DIRECTION BITS OF REST OF CHARACTERS
0AB4 C6 C0                    JZ      DIRISEX           EOD - FAIL OK
0AB6 F2 B8                    JB7     DIRIS4
0AB8 E6 B7                    JNC     DIRISLP           'LEFT' SCANNED - FORWARDS
0ABA A7                       CPL     C                 CAUSE DROP-THRU TO 'DIRERR'
0ABB F6 B2            DIRIS4  JC      DIRISLP           'RIGHT' SCANNED - BACKWARDS
0ABD                  DIRERR
                       IF DEBUG
                       ENDIF
0ABD                          RETERR
0ABD                  DIRISEX
                       IF DEBUG
                       ENDIF
04C0                          RETOK
                      *
                      * COMPLEMENT DIRECTION BITS FROM @R0 TO EOD
                      *
04C2                  DIRCOMP
04C2 F0               DIRCLP  MOV     A,@R0             GET CHARACTER
04C3 C6 C8                    JZ      DIRCEX            EOD
04C5 D3 80                    XRL     A,#120            COMPLEMENT DIRECTION BIT
04C7 A0                       MOV     @R0,A             PUT CHARACTER
04C8 18                       INC     R0
04C9 84 C2                    JMP     DIRCLP
04CB 83               DIRCEX  RET
                      *
                      * SWAP BYTES AT R0 END-FOR-END WITH THOSE AT R1
                      *
04CC                  SWAP
                       IF DEBUG
                       ENDIF
```

```
04CC  B8 29               MOV   R0,#CHARBEG
04CE  F9          SWAPLP  MOV   A,R1
04CF  37                  CPL   A
04D0  17                  INC   A
04D1  68                  ADD   A,R0
04D2  F6 DB               JC    SWAPFA       FAIL WHEN R1 <= R0
04D4  F0                  MOV   A,@R0        (R0) --> A
04D5  21                  XCH   A,@R1        A <--> (R1)
04D6  A0                  MOV   @R0,A        A --> (R0)
04D7  18                  INC   R0
04D8  C9                  DEC   R1
04D9  84 CE               JMP   SWAPLP
04DB  83          SWAPFA  RET
                  *
                  *
                  *
04DC  B9 36       CHADFUD MOV   R1,#CHARADD  FILL ADDON CHARACTER BUFFER WITH AN 'EOD'
04DE  B1 00               MOV   @R1,#EOD
04E0  83                  RET
04E1
                  *
0500  AD          OUTERR  MOV   R5,A
0501  B4 0A               CALL  OUTSP
0503  FD                  MOV   A,R5
0504  84 5B       OUTCDAS CALL  OUTCHAR
0506  23 2D       OUTDASH MOV   A,#'-'
0508  A4 5B               JMP   OUTCHAR
                  *
                  *
                  *
050A  23 20       OUTSP   MOV   A,#SP
050C  A4 5B               JMP   OUTCHAR
                  *
                  *
                  *
050E  84 5B       OUTCLIN CALL  OUTCHAR
0510  A4 55               JMP   OUTLINF
                  *
                  *
                  *
0512  AD          OUTHEX  MOV   R5,A         SAVE ACC.
0513  47                  SWAP  A            CONVERT LOW NIBBLE TO ASCII-HEX
0514  53 0F               ANL   A,#15
0516  03 25               ADD   A,#.LOW.HEXTAB
0518  A3                  MOVP  A,@A         GET ASCII-HEX FROM TABLE
0519  84 5B               CALL  OUTCHAR
051B  FD                  MOV   A,R5         DISPLAY LSB NIBBLE OF ACCUMALATOR
051C  53 0F               ANL   A,#15
051E  03 25               ADD   A,#.LOW.HEXTAB
0520  A3                  MOVP  A,@A
0521  84 5B               CALL  OUTCHAR
0523  FD                  MOV   A,R5         RESTORE ACC.
0524  83                  RET
0525  30 31 32 33 HEXTAB  DB    '0123456789ABCDEF'     'TABLE ON SAME PAGE AS 'OUTHEX'
0529  34 35 36 37
052D  38 39 41 42
0531  43 44 45 46
0535              GETCHAR
                  *
                  * IF DISABLE COMMAND RECEIVED
                  * THEN WAIT FOR ENABLE COMMAND AND RETURN NULL CHARACTER
                  * ELSE IF END THEN SEND TO MESSAGE AND RETURN NULL CHARACTER
                  * ELSE RETURN RECEIVED CHARACTER IN ACCUMALATOR
```

```
0535  B9 20            MOV   R1,#INCHAR
0537  27               CLR   A               CLEAR RECEIVE BUFFER AT SAME TIME
0538  21               XCH   A,@R1           AS GETTING RECEIVE CHARACTER
0539  D3 13            XRL   A,#DC3          DISABLE CHAR?
053B  C6 4A            JZ    GETCLP2         YES
053D  D3 13            XRL   A,#DC3          (PUT ACCUM BACK THE WAY IT WAS)
053F  D3 05            XRL   A,#ENQ
0541  C6 46            JZ    GETCH2
0543  D3 05            XRL   A,#ENQ          (PUT ACCUM BACK THE WAY IT WAS)
0545  83               RET                   RETURN - ACCUMALATOR IS RECEIVED CHARACTER
0546  B4 51    GETCH2  CALL  OUTID           SEND ID MESSAGE
0548  27               CLR   A               THEN RETURN WITH NULL CHARACTER
0549  83               RET
054A  27       GETCLP2 CLR   A               (CLEAR RECEIVE BUFFER)
054B  21               XCH   A,@R1           THEN WAIT FOR ENABLE CHAR
054C  D3 11            XRL   A,#DC1
054E  96 4A            JNZ   GETCLP2
0550  83               RET                   RETURN - ACCUMALATOR IS NULL

0551  B9 E6    OUTID   MOV   R1,#LOW.IDMSG
0553  74 0C            CALL  OUTLAD
0555  23 0D    OUTCRLF MOV   A,#CR
0557  B4 5B            CALL  OUTCHAR
0559  23 0A            MOV   A,#LF
               *
               * ADD START BIT, PARITY BIT, AND STOP BIT TO 7-BIT DATA
               * CHARACTER IN ACCUMALATOR.
               * SEND AT 1200 BAUD.
               * BIT TIME IS 833.3US.
               *
055B           OUTCHAR
055B  15               DIS   I               DISABLE RECEIVE INTERRUPTS
               * DELAY FOR OTHER END TO FINISH SENDING STOP BIT BEFORE WE
               * SEND A RESPONSE.
055C  BF A2            MOV   R7,#162
055E  EF 5E            DJNZ  R7,$
               * START BIT
0560  8A 40            ORL   P2,#TAEN        ENABLE DATA TRANSMIT
0562  97               CLR   C               CLEAR PARITY
0563  9A 7F            ANL   P2,#-1-TXD      0 BIT
0565  B8 07            MOV   R0,#7           BIT COUNTER - 7 DATA, 1 PARITY
0567  BF A2            MOV   R7,#162
0569  EF 69            DJNZ  R7,$            (9+(162*2)*2.5) = 832.5US
               * DATA BITS
056B  77       OUTLP   RR    A
056C  F2 72            JB7   OUT2
056E  9A 7F            ANL   P2,#-1-TXD      0 BIT
0570  44 74            JMP   OUT4
0572  8A 80    OUT2    ORL   P2,#TXD         1 BIT
0574  A7               CPL   C               COMP CARRY EACH TIME A '1' BIT IS SENT
0575  00               NOP
0576  BF A2    OUT4    MOV   R7,#162
0578  EF 78            DJNZ  R7,$            (9+(162*2)*2.5) = 832.5US
057A  E8 6B            DJNZ  R0,OUTLP
               * PARITY BIT
057C  77               RR    A               LEAVE ACCUMALATOR THE WAY WE FOUND IT
057D  F6 83            JC    OUT6
057F  9A 7F            ANL   P2,#-1-TXD      PARITY BIT IS A '0'
0581  A4 87            JMP   OUT8
0583  8A 80    OUT6    ORL   P2,#TXD         PARITY BIT IS A '1'
0585  00               NOP
0586  00               NOP
0587  BF A6    OUT8    MOV   R7,#166
```

```
0589 EF 89              DJNZ    R7,$
                * STOP BIT
058B 8A 80              ORL     P2,#TXD          1 BIT
058D BF A8              MOV     R7,#168
058F EF 8F              DJNZ    R7,$             ((168*2)*2.5) = 840.0US
0591 9A BE              ANL     P2,#-1-TXEN      TRANSMIT DISABLE
0593 05                 EN      I                ENABLE RECEIVE INTERRUPT
0594 83                 RET
                *
                *
                *
0595 F0         SENDHEX MOV     A,@R0            END-OF-DATA?
0596 C6 9D              JZ      SENDFX           YES
0598 94 17              CALL    OUTHEX           SEND HEX
059A 18                 INC     R0
059B A4 95              JMP     SENDHEX
059D 83         SENDFX  RET
                *
                *
                *
059E F0         SENDBUF MOV     A,@R0            END-OF-DATA?
059F C6 AF              JZ      SENDBEX          YES
05A1 D3 20              XRL     A,#' '           SKIP BLANKS
05A3 C6 AC              JZ      SENDB4
05A5 F0                 MOV     A,@R0
05A6 6A                 ADD     A,R2             ACCRUE HASH TOTAL
05A7 57                 DA      A
05A8 AA                 MOV     R2,A
05A9 F0                 MOV     A,@R0
05AA 94 58              CALL    OUTCHAR          SEND CHARACTER
05AC 18         SENDB4  INC     R0
05AD A4 9F              JMP     SENDBUF
05AF 83         SENDBEX RET
                *
                *
                *
05B0 B9 26      CLRBACK MOV     R1,#BACKSB
05B2 B1 00              MOV     @R1,#0
05B4 83                 RET
                *
                * INTERRUPT OCCURS ON ZERO LEVEL OF START/STOP ASYNC START BIT
                * THE ASYNC DATA IS DEMODULATED AS START, 7 DATA, EVEN PARITY.
                * IT PLACES GOOD CHARACTERS IN THE RECEIVE BUFFER OVERWRITING
                * ANY OLD CHARACTER.
                *
                * THE MAIN PROGRAM POLLS RECEIVE BUFFER FOR DATA = NON-NULL CHARACTER.
                * IF IT IS NECESSARY TO CLEAR (NULL) THE RECEIVE BUFFER, THEN IT MUST
                * DONE IN ONE INDIVISIBLE INSTRUCTION OR DISABLE INTERRUPTS FOR THE
                * TIME REQUIRED. THE FORMER IS PREFERRED USING A 'XCH @R' INSTRUCTION
                * WITH THE ACCUMALATOR NULL.
                *
05B5 99 7F      INT     ANL     P1,#-1-DEEPER    TURN OFF IN CASE RECEIVE DATA HANGS US UP
05B7 D5                 SEL     RB1              PUT RESERVED FOR INTERRUPT
05B8 AA                 MOV     R2,A             SAVE ACCUMALATOR
                * START BIT CENTER (ALLOW FOR INT,JMP CYCLES)
05B9 BF 4D      INTLP   MOV     R7,#77           WAIT FOR CENTER OF START BIT
05BB EF BB              DJNZ    R7,$             (12+((77*2)*2.5)=415.0US
05BD 86 C1              JNI     INTDAT           START BIT
05BF A4 E9              JMP     INTERR           IGNORE BAD CHARACTERS
                * 1ST DATA BIT CENTER
05C1 97         INTDAT  CLR     C                PARITY FLIP-FLOP
05C2 B8 08              MOV     R0,#8            7 DATA BITS + 1 PARITY
05C4 BF A3              MOV     R7,#163          WAIT FOR CENTER OF NEXT BIT
```

```
05C8  EF C6                DJNZ    R7,$            (7+(16*2)*2.5)=#32.5US
                  * EACH DATA BIT CENTER
05CA  20 CF       INTOLP   JNT     INTOP10
05CA  43 01                ORL     A,#1            '1' BIT RECEIVED
05CC  A7                   CPL     C               TOGGLE PARITY
05CD  04 D4                JMP     INTOA14
05CF  53 FE       INTOA10  ANL     A,#-1-1         '0' BIT RECEIVED
05D1  00                   NOP
05D2  00                   NOP
05D3  00                   NOP
05D4  00          INTOA14  NOP
05D5  77                   RR      A               SHIFT BIT AROUND FOR NEXT
05D6  BF A0                MOV     R7,#160         WAIT FOR CENTER OF NEXT BIT
05D8  EF D8                DJNZ    R7,$            (13+(160*2)*2.5)=#32.5US
05DA  EE CA                DJNZ    R6,INTOLP
                  * STOP BIT CENTER (15+(160*2)*2.5)=#37.5US
05DC  F6 E9                JC      INTERR  PARITY ERROR - EVEN PARITY WILL DROP THRU ON BREAK
05DE  53 7F                ANL     A,#127          MASK OFF PARITY
05E0  AB                   MOV     R3,A            SAVE RECEIVED CHARACTER
05E1  D3 03                XRL     A,#ETX          IF RESET CHARACTER
05E3  C6 EB                JZ      INTRS1          GOTO RESTART PROGRAM
05E5  B9 20                MOV     R1,#INCHAR      ELSE
05E7  FB                   MOV     A,R3
05E8  A1                   MOV     @R1,A           STORE RECEIVED CHARACTER IN RECEIVE BUFFER
05E9  FA          INTERR   MOV     A,R2            RESTORE ACCUMULATOR
05EA  93                   RETR
                  * SET UP STACK FOR 'RETR' SO RETURNS TO ADDRESS ZERO OF PROGRAM
                  * WITH PSW C, AC, F0, AND BS ALL ZERO.
                  * 'RETR' REQUIRED TO ALLOW ANY MORE INTERRUPTS.
05EB  B9 08       INTRS1   MOV     R1,#STACK       POINT TO RETURN STACK
05ED  27                   CLR     A
05EE  A1                   MOV     @R1,A           SET RETURN PC
05EF  19                   INC     R1
05F0  A1                   MOV     @R1,A           SET RETURN PSW, PC
05F1  17                   INC     A               BUMP STACK POINTER
05F2  D7                   MOV     PSW,A           SET STACK POINTER
05F3  93                   RETR                    (SP)<--(SP-1) PC<--((SP)) (PSW4-7)<--((SP))
                  *
05F4  B9 23       SETCPTR  MOV     R1,#CHARPTR     INIT CHARACTER DECODE POINTER
05F6  B1 29                MOV     @R1,#CHARBFG
05F8  83                   RET
                  *
                  *
                  *
05F9  B9 23       SETAPTR  MOV     R1,#CHARPTR     INIT CHARACTER DECODE POINTER
05FB  B1 36                MOV     @R1,#CHARADD
05FD  83                   RET
05FE                       PAGE    256
                  *
0600  B9 26       SETBACK  MOV     R1,#BACKSW
0602  B1 FF                MOV     @R1,#255
0604  83                   RET
                  *
                  *
                  * WHILE NOT ERROR
                  *                  IF PTR > END=(3+24+5)
                  *                  THEN ERROR ELSE
                  *                                 \
                  *                                  \
                  *                                   \
                  *                               U(+24+5+24)T
```

```
                     *                    /  \
                     *                   /    \
                     *                  /      \
                     *                 /  G(+24)
                     *                /  /  \
                     *               /  /    \
                     *              /  /  /   \        THE TREE LOOKS FOR OUTSIDE FRAMING
                     *             /  /  G(+26)        OF THE COUNTS WORKING TOWARDS THE
                     *            /  /  /  \           CENTER, IE., CHECK FOR LEFT GUARD,
                     *           /  /  /    \          RIGHT GUARD, AND THEN CENTER GUARD
                     *          /  /  /      \         OF LARGEST BARCODE 1ST. THEN TRY
                     *      G(+10+5+16)T    UPC-A      NEXT LARGEST BARCODE.
                     *          / \         EAN-13
                     *         /   \
                     *        /     \
                     *       /    G(+16)
                     *      /    /  \                  NOTE:
                     *     /    /    \                 THE DIRECTION OF A UPC-E CODE
                     *    /    /      \                IS AMBIGUOUS WHEN THE 1ST (LEFT-
                     *   /    /  G(+18)                MOST) CHARACTER IS A 4 OR 6. BY
                     *  /    /  / _  \                 FRAMING A FORWARD CODE 1ST IT IS
                     * /    /  /      \                POSSIBLE ON A DECODE ERROR TO RE
                     */    /  /      EAN-8             FRAME CORRECTLY.
                     *  G(+24+21)
                     *   / \
                     *  /   \
                     * _/__G(+28)                      G = GUARD FUNCTION
                     * /  /   \                               FINDS 3 GUARD BARS @P1.
                     */  /     \                              RETURNS PTR TO RIGHT GUARD
                     * G(+2)    \                             BAR. RETURNS ERROR IF NOT
                     * / \     UPC-E                          GUARD BARS.
                     */   \    FORWARD
                     *.    \
                     * PTR+1   UPC-E                   T = TEST FOR THAT MANY COUNTS
                     *         BACKWARD                    BETWEEN PTR AND EOC.
                     *
                     * ENDWHILE
                     *
                     *
                     *           DECISION TREE FOR DETERMINING BARCODE TYPE
                     *
                     *
                     *
                     *      Q = (1) QUIET ZONE             G = (3) END GUARD BARS
                     *      A = (3) ADDON GUARD BARS       N = (4) NUMERIC DIGIT
                     *      C = (5) CENTER GUARD BARS      D = (2) ADDON DELINEATOR
                     *      Z = (6) ZERO SUPPRESSED CENTER GUARD BARS
                     * (N) = NUMBER OF COUNTS
                     *
                     * UPC-A/EAN-13          QGNNNNNNCNNNNNNGQ
                     * UPC-E FORWARD         QGNNNNNNZQ
                     * UPC-E BACKWARD        QZNNNNNNGQ
                     * EAN-8                 QGNNNNCNNNNGQ
                     * ADDON-2               QANDNQ
                     * ADDON-5               QANDNDNDNDNQ
                     *
                     * THE BARCODE COUNTS ARE SCANNED TO FIND THE 'G' AND 'C' PATTERN.
                     * FROM THIS PATTERN A PARTICULAR BARCODE FORMAT IS ASSUMED.
                     * THE ABOVE DECISION TREE IS USED TO IDENTIFY THE PATTERN.
                     *
0x05 Re 25           FRAME   MOV     R0,@EOCPTR      GET EOCPTR FOR END-OF-COUNTS TESTS
0x07 FU                      MOV     A,@R0
0x08 AA                      MOV     R2,A
```

```
0009  80 22      FRAMLP4 MOV   R0,#FRAMPTR      PTR IS SAVED TO ALLOW FRAMING RE-SEARCHES
000B  F0                 MOV   A,@R0            FROM POSITION OF LAST FRAME
000C  A9                 MOV   R1,A             CURRENT FRAMING PTR TO R1
                 * ENOUGH COUNTS FOR ANY KIND OF BARCODE?
000D  F9         FRAMLP5 MOV   A,R1
000E  37                 CPL   A                DON'T NEED 'INC A' BECAUSE OF R2, 0 VALUES
000F  6A                 ADD   A,R2             ADD FOR ADDR
0010  E6 8C              JNC   FRAMERR          CHECK FOR MINIMUM COUNTS (SHORTEST
0012  03 DF              ADD   A,#-(3+24+6)     CODE) LEFT TO SEARCH
0014  E6 8C              JNC   FRAMERR
                 * FIND LEFT END OF FRAME
0016  D4 91              CALL  LEFTGRD          CHECK LEFT GUARD AND QUIET ZONE
0018                     JERR  FRAMLP6
001A  F9                 MOV   A,R1
001B  A0                 MOV   @R0,A            SAVE LAST FRAMING PTR
001C  03 02              ADD   A,#2             BUMP FRAMING PTR TO 1ST COUNT
001E  A8                 MOV   R0,A             R0 PTR TO 1ST COUNT
                 * UPC-A OR EAN-13?
001F  03 35              ADD   A,#24+5+24       BUMP PTR TO RIGHT SIDE OF CODE COUNTS
0021  A9                 MOV   R1,A
0022  03 03              ADD   A,#3             6N+C+6N+G+D
0024  37                 CPL   A                ARE THEIR ENOUGH COUNTS FOR THIS CODE TYPE
0025  6A                 ADD   A,R2
0026  F6 3A              JNC   FR4C4            NOT ENOUGH - TRY NEXT SHORTEST CODE
0028  D4 8A              CALL  RITEGRD          LOOK FOR GUARD AND QUIET ZONE ON RIGHT END
002A                     JERR  FR4C4
002C  F8                 MOV   A,R0
002D  03 18              ADD   A,#24
002F  A9                 MOV   R1,A
0030  D4 7F              CALL  CNTRGRD          CHECK CENTER GUARD PATTERN
0032                     JERR  FR4C4
0034  BF 00              MOV   R7,#0            UPC-A OR EAN-13
0036  C4 0A              JMP   FRAMOK
                 * EAN-8?
0038  F8         FR4C4   MOV   A,R0
0039  03 25              ADD   A,#16+5+16       BUMP PTR TO RIGHT SIDE OF CODE COUNTS
003B  A9                 MOV   R1,A
003C  03 03              ADD   A,#3             4N+C+4N+G+D
003E  37                 CPL   A                ARE THEIR ENOUGH COUNTS FOR THIS CODE TYPE
003F  6A                 ADD   A,R2
0040  F6 52              JNC   FRGO7            NOT ENOUGH - TRY NEXT SHORTEST CODE
0042  D4 8A              CALL  RITEGRD          LOOK FOR GUARD AND QUIET ZONE ON RIGHT END
0044                     JERR  FRGO7
0046  F8                 MOV   A,R0
0047  03 10              ADD   A,#16
0049  A9                 MOV   R1,A
004A  D4 7F              CALL  CNTRGRD          CHECK CENTER GUARD PATTERN
004C                     JERR  FRGO7
004E  BF 01              MOV   R7,#1            EAN-8
0050  C4 0A              JMP   FRAMOK
                 * UPC-E FORWARD?
0052  F8         FRGO7   MOV   A,R0
0053  03 1B              ADD   A,#24+3          BUMP PTR TO RIGHT SIDE OF CODE COUNTS
0055  A9                 MOV   R1,A             THEIR ARE ENOUGH COUNTS BECAUSE OF MIN TEST
0056  D4 8A              CALL  RITEGRD          LOOK FOR GUARD AND QUIET ZONE ON RIGHT END
0058                     JERR  FRAMLP4          CHECK ZERO GUARD - RIGHT 3 COUNTS
005A  F8                 MOV   A,R0
005B  03 18              ADD   A,#24
005D  A9                 MOV   R1,A
005E  D4 7F              CALL  CNTRGRD          CHECK FOR CENTER GUARD PATTERN ON RIGHT
0060                     JERR  FR7G6
0062  BF 03              MOV   R7,#3            UPC-E FORWARD
0064  C4 0A              JMP   FRAMOK
                 * UPC-E BACKWARD?
```

```
0066  D6 0F      FRZ6G    CALL    FRAMB2
0068                      JERR    FRAMER4
006A                      FRAMOK  RETUR
006C                      FRAMERR RETERR
                 *
                 * TRY TO FRAME A BACKWARD UPC-E
                 *
006F  F0         FRAMB2   MOV     A,R0         LOOK FOR ZERO GUARD ON LEFT END OF COUNTS
0070  03 FF               ADD     A,#-2        LEFT 3 COUNTS ALREADY CHECKED
0072  A9                  MOV     R1,A         THEIR ARE ENOUGH COUNTS BECAUSE OF MIN TEST
0073  03 05               ADD     A,#5         ADJUST R0 BECAUSE OF ZERO GUARDS ON LEFT
0075  A8                  MOV     R0,A
0076  D4 7F               CALL    CNTRGRD      CHECK FOR CENTER GUARD PATTERN ON LEFT
0078                      JERR    FRB2EA
007A  BF 02               MOV     R7,#2        UPC-E BACKWARD
007C                      RETUR
007E  83         FRB2EA   RET
                 *
                 * TEST FOR 3 SETS OF GUARD BARS
                 *
007F  D4 9B      CNTRGRD  CALL    GUARD        CHECK GUARD - LEFT 3 COUNTS
0081                      JERR    ZGRDEA
0083  D4 9B               CALL    GUARD        CHECK GUARD - MIDDLE 3 COUNTS
0085                      JERR    ZGRDEA
0087  C4 9B               JMP     GUARD        CHECK GUARD - RIGHT 3 COUNTS
0089  83         ZGRDEA   RET
                 *
                 * TEST FOR GUARD BARS AND RIGHT QUIET ZONE
                 *
008A  D4 9B      RITEGRD  CALL    GUARD        CHECK GUARD
008C                      JERR    RITGEA
008E  C4 C6               JMP     QUIETR
0090  83         RITGEA   RET
                 *
                 * CHECK FOR GUARD BARS AND LEFT QUIET ZONE
                 *
0091  D4 9B      LEFTGRD  CALL    GUARD        CHECK LEFT GUARD AND QUIET ZONE
0093                      JERR    LEFGEA
0095  C4 BC               JMP     QUIETL       CHECK FOR LEFT QUIET ZONE
0097  83         LEFGEA   RET
                 *
                 * GUARD RETURNS A POINTER TO THE RIGHT BAR OF 3 GUARD BARS
                 * STARTING AT INITIAL VALUE OF POINTER.
                 *
                 * ON ENTRY:
                 * R1 POINTS TO BEGIN OF GUARD BAR TEST LOCATION
                 *
                 * ON EXIT:
                 * R1 = R1+1
                 * IF NOT GUARD BARS THEN ERROR SET.
                 * IF GUARD BARS THEN ERROR NOT SET.
                 *
                 * GUARD BARS = 3 COUNTS WHERE:
                 *         1ST-X <= 3RD COUNT <= 1ST+X, 2ND COUNT SKIPPED
                 *         IF X=0 THEN X IS MADE TO BE 1. THIS ENSURES THAT
                 *         COMPARISONS OF SMALL (<4) COUNTS ARE MADE WITH A TOLERANCE OF
                 *         AT LEAST +/-1.
                 *
0098  F1         GUARD    MOV     A,@R1        1ST COUNT
0099  77                  RR      A            50%
009A  53 3F               ANL     A,#03F       MASK OFF HIGH 2 BITS
009C  96 9F               JNZ     GARD2        IF % OF COUNT=0
009E  17                  INC     A            THEN MAKE IT 1
```

```
0A9F  A8         GARD2   MOV    R0,A
0AA0  61                 ADD    A,@R1
0AA1  AD                 MOV    R5,A           1ST COUNT + 8
0AA2  F8                 MOV    A,R0
0AA3  37                 CPL    A
0AA4  17                 INC    A
0AA5  61                 ADD    A,@R1
0AA6  A8                 MOV    R0,A           1ST COUNT - 8
0AA7  19                 INC    R1             SKIP 2ND COUNT
0AA8  19                 INC    R1
0AA9  F1                 MOV    A,@R1          3RD COUNT
0AAA  C9                 DEC    R1             (LEAVE R1 POINTING AT MIDDLE GUARD BAR)
0AAB  37                 CPL    A
0AAC  68                 ADD    A,R0
0AAD  F6 B9              JC     GARDERR        ERROR - 3RD COUNT < 1ST-8
0AAF  19                 INC    R1
0AB0  F1                 MOV    A,@R1
0AB1  C9                 DEC    R1
0AB2  37                 CPL    A
0AB3  17                 INC    A
0AB4  6D                 ADD    A,R5
0AB5  E6 B9              JNC    GARDERR        ERROR - 3RD COUNT > 1ST+8
0AB7                     RETOK
0AB9             GARDERR RETERR
                 *
                 * QUIET COMPARES A GUARD COUNT TO THE COUNT WHERE THE QUIET ZONE SHOULD
                 * BE THE COMPARISON IS DONE BY ADDING THE 2 GUARD COUNTS NEAT TO THE
                 * QUIET ZONE TO TAKE ADVANTAGE OF DELTA DISTANCE. THIS COUNT IS SHIFTED
                 * LEFT TO MAKE IT 4 MODULES WIDE. THE QUIET ZONE COUNT SHOULD BE AT LEAS
                 * 4.5 TIMES 1 MODULE. IN THIS CASE, WE ARE COMPARING THE QUIET ZONE COUN
                 * TO (4 1-MODULE COUNTS)+1.
                 *
0ABC  C9         QUIETL  DEC    R1
0ABD  C9                 DEC    R1
0ABE  F1                 MOV    A,@R1          LEFT QUIET ZONE COUNT
0ABF  AF                 MOV    R7,A
0AC0  19                 INC    R1
0AC1  F1                 MOV    A,@R1          1ST GUARD COUNT
0AC2  19                 INC    R1
0AC3  61                 ADD    A,@R1          PLUS 2ND GUARD COUNT
0AC4  C6 D3              JMP    QUIETC
0AC6  19         QUIETR  INC    R1
0AC7  19                 INC    R1
0AC8  F9                 MOV    A,R1           SAVE RIGHT QUIET ZONE ADDR FOR ADDON
0AC9  B9 24              MOV    R1,#ADDPTR
0ACB  A1                 MOV    @R1,A
0ACC  A9                 MOV    R1,A
0ACD  F1                 MOV    A,@R1          RIGHT QUIET ZONE COUNT
0ACE  AF                 MOV    R7,A
0ACF  C9                 DEC    R1
0AD0  F1                 MOV    A,@R1          1ST GUARD COUNT
0AD1  C9                 DEC    R1
0AD2  61                 ADD    A,@R1          2ND GUARD COUNT
0AD3  F6 DE      QUIETC  JC     QUIETER        OVERFLOW ON SUM OF 2 GUARD COUNTS
0AD5  F7                 RLC    A              2(ACCUMULATOR) = 4*GUARD COUNT
0AD6  F6 DE              JC     QUIETER        OVERFLOW
0AD8  37                 CPL    A
0AD9  6F                 ADD    A,R7
0ADA  E6 DE              JNC    QUIETER        QUIET COUNT < 4*GUARD COUNT
0ADC                     RETOK
0ADE             QUIETER RETERR
```

```
                    *
                    * QUIETA COMPARES THE DELINEATOR COUNTS AT R1 TO THE COUNT AT R1+5
                    * WHICH IS WHERE THE QUIET ZONE SHOULD BE. THE 2 DELINEATOR COUNTS
                    * ARE SUMMED AND MULTIPLIED BY 2 TO GIVE A 4 MODULE COUNT. THIS COUNT
                    * IS THEN COMPARED TO THE QUIET ZONE COUNT.
                    *
0AE1  F1            QUIETA  MOV   A,@R1          1ST DELINEATOR COUNT
0AE2  19                    INC   R1
0AE3  61                    ADD   A,@R1          PLUS 2ND DELINEATOR COUNT
0AE4  F6 E6                 JC    QUAERR         OVERFLOW
0AE6  AF                    MOV   R7,A           SAVE SUM
0AE7  F9                    MOV   A,R1
0AE8  03 05                 ADD   A,#5
0AEA  A9                    MOV   R1,A
0AEB  FF                    MOV   A,R7
0AEC  97                    CLR   C
0AED  F7                    RLC   A              2(SUM)
0AEE  F6 E6                 JC    QUAERR
0AF0  37                    CPL   A              NEGATE SUM
0AF1  61                    ADD   A,@R1          PLUS QUIET ZONE COUNT
0AF2  E6 E6                 JNC   QUAERR
0AF4                        RETOK
0AF6                QUAERR  RETERR
                    *
                    * PUT EOD INTO COUNT BUFFER AND SAVE EOD ADDR
                    *
0AF8  B0 00         CNTEOD  MOV   @R0,#EOD       WRITE END-OF-COUNTS
0AFA  B9 25                 MOV   R1,#FORPTR     SAVE EOD ADDR
0AFC  F8                    MOV   A,R0
0AFD  A1                    MOV   @R1,A
0AFE  83                    RET
0700                        PAGE  256            NEXT PAGE
                    *
                    * TRY TO DECODE AN ADDON CODE OF 2 OR 5 CHARACTERS
                    *
0700  B8 26         DECOAD  MOV   R0,#BACKSW     FORWARD OR BACKWARDS
                     IF DEBUG
                     ENDIF
0702  F0                    MOV   A,@R0
0703  96 0D                 JNZ   DECBKAD        BACKWARDS
                    * FORWARD SCAN - SETUP POINTERS AND COUNTS FOR RIGHT, FORWARD ADDON
0705  B8 24                 MOV   R0,#ADDPTR     POINT TO LEFT END OF RIGHT, FORWARD ADDON
0707  F0                    MOV   A,@R0          FRAMPTR = RIGHT QUIET ZONE
0708  B8 22                 MOV   R0,#FRAMPTR    FORPTR = ENDPTR
070A  A0                    MOV   @R0,A
070B  E4 1C                 JMP   DECOAD2
                    * BACKWARD SCAN - SETUP POINTERS AND COUNTS FOR LEFT, BACKWARDS ADDON
070D  B9 22         DECBKAD MOV   R1,#FRAMPTR    FRAMPTR = BEGINNING OF COUNTS
070F  23 4C                 MOV   A,#CNTBEG
0711  21                    XCH   A,@R1
0712  07                    DEC   A
0713  B8 25                 MOV   R0,#FORPTR     FORPTR = FRAMPTR-1
0715  A0                    MOV   @R0,A
0716  07                    DEC   A
0717  A9                    MOV   R1,A           POINT R1 AT RIGHT QUIET ZONE OF ADDON
0718  B8 3C                 MOV   R0,#CNTBEG     POINT R0 AT LEFT END OF ADDON
071A  94 CE                 CALL  SWAPIT         SWAP COUNTS THAT REPRESENT ADDON END-FOR-END
                    * WHICH TYPE OF ADDON IF ANY?
071C  B8 22         DECOAD2 MOV   R0,#FRAMPTR    FRAMPTR POINTS TO LEFT QUIET ZONE OF ADDON
071E  B9 25                 MOV   R1,#FORPTR     FORPTR POINTS TO RIGHT QUIET ZONE OF ADDON
                     IF DEBUG
                     ENDIF
                    * ENOUGH COUNTS FOR ADDON-2?
```

```
0720 F0              MOV   A,@R0
0721 03 0E           ADD   A,#14          ADDON-2 IS 14 COUNTS
0723 F6 7A           JC    DECADER        OVERFLOW OF POINTER
0726 61              ADD   A,@R1
0727 F6 7A           JNC   DECADER        NOT ENOUGH COUNTS FOR ADDON-2 OR 5
0729 F0              MOV   A,@R0          SETUP POINTER FOR QUIET ZONE TEST
072A 03 08           ADD   A,#8           POINT TO LAST ADDON-2 DELINEATOR PAIR
072C A9              MOV   R1,A
072D 94 E1           CALL  QUIETR
072F                 JERR  DECUAD4
                   * TRY DECODING ADDON-2
0731 94 F9   DECAD2  CALL  SETRPTR        INIT ADDON CHARACTER BUFFER POINTER
0733 B9 27           MOV   R1,#FRAMPTR    ADJUST PTR 2 COUNTS LEFT OF 1ST CHAR
0735 F1              MOV   A,@R1
0736 03 02           ADD   A,#2           INC PTR PAST QUIET ZONE AND 1 GUARD
0738 A8              MOV   R0,A           R0 POINTS TO ADDON COUNTS
0739 54 45           CALL  CHAD2IS
073B                 JERR  DECADER
                   * DO ADDON-2 MOD CHECK
073D 74 C4           CALL  MCHKAD2        DO MOD CHECK ON ADDON-2 CODE
073F                 JERR  DECADER        CHECK ERROR
0741 23 04           MOV   A,#ADDON2
0743 F4 76           JMP   DECUADT
                   * ENOUGH COUNTS FOR ADDON-5?
0745 B9 25   DECUAD4 MOV   R1,#FOPTR
0747 F0              MOV   A,@R0
0748 03 20           ADD   A,#32          ADDON-5 IS 32 COUNTS
074A F6 7A           JC    DECADER        OVERFLOW OF POINTER
074C 37              CPL   A
074D 61              ADD   A,@R1
074E F6 7A           JNC   DECADER        NOT ENOUGH COUNTS FOR ADDON-2
                   * TEST FOR ADDON-5 QUIET ZONE
0750 F0              MOV   A,@R0
0751 03 1A           ADD   A,#26
0754 D4 E1           CALL  QUIETR
0756                 JERR  DECADER
                   * TRY DECODING ADDON-5
0758 B4 F9   DECAD5  CALL  SETRPTR        INIT ADDON CHARACTER BUFFER POINTER
075A B9 22           MOV   R1,#FRAMPTR    ADJUST PTR 2 COUNTS LEFT OF 1ST CHAR
075D 03 02           ADD   A,#2           INC PTR PAST QUIET ZONE AND 1 GUARD
075F A8              MOV   R0,A
0760 54 43           CALL  CHAD3IS        R0 POINTS TO ADDON COUNTS
0762 54 45           CALL  CHAD2IS
0764                 JERR  DECADER        ERROR ON DECODE OF ADDON-5
                   * DO ADDON-5 MOD CHECK
0766 94 93           CALL  DIRAD5         GET CHECK CHAR PER DIRECTION BITS
0768                 JERR  DECADER        ERROR, TRY DECODING ADDON-2
076A 37              CPL   A              OR
076B 17              INC   A              ADJUST RETURNED CHECK CHARACTER
076C 03 0A           ADD   A,#10          TO MODULOUS 10
                     MOV   R0,#LOW.CHKAD5 ADDON-5 CHECK MULTIPLIER TABLE
0770 74 70           CALL  MCHKAD5        AND PASS IT TO THE MODULO CHECK ROUTINE
0772                 JERR  DECADER        CHECK ERROR, TRY ADDON-2
0774 23 08           MOV   A,#ADDON5
0776 F4 06   DECUADT CALL  TYPEOR         TYPE CHARACTER .OR. ADDON TYPE
                     RETURN
             DECADER CALL  CHADEUD
077C                 RETURN
                   *
077F                 INIT
```

```
                  * INIT THOSE THINGS NORMALLY HANDLED BY HARDWARE RESET
                  * IN CASE OF WARM RESET CAUSED BY RECEIPT OF AN ETX CHARACTER.
0/7F   99 00             ANL    P1,#0              ALL PORT BITS TO '0'
0781   9A 00             ANL    P2,#0              ALL PORT BITS TO '0'
0783   B9 20             MOV    R1,#INCHAR         NULL-OUT COMMUNICATION BUFFER
0785   B1 00             MOV    @R1,#NULL
0787   89 85             ORL    P1,#RECHARG+CLOCK+GREEN+RED     BOTH LITES ON
                  * TRANSMIT DATA TO HANK
                  * ENABLE DAR AND TRIGGER INPUT BITS BY OUTPUTTING A '1'
                  * ENABLE TRANSMIT DATA - RECEIVE DATA ALWAYS ENABLED
0789   8A 80             ORL    P2,#TAR+HARBIT+TRIGH
                  * 3 LONG BEEPS (IF NOT PORTABLE)
078B                     JPORT  INIT2
078B   94 00             CALL   BEEP               BEEP 100MS
078F   94 17             CALL   DELAY50            WAIT 500MS
0791   94 00             CALL   BEEP
0793   94 17             CALL   DELAY50
0795   94 00             CALL   BEEP
0797   99 BF             ANL    P1,#-1-GREEN       TURN OFF GOOD READ LITE TILL ACK RECEIVED
0799              INIT2
                  * SEND HELLO TO HOST
0799   23 07      INITLP2 MOV   A,#DEL
079B   94 5B             CALL   OUTCHAR
                  * TILL GOOD RESPONSE
079D   BC 1E             MOV    R4,#30             LOOP TIMER - 0.5 SEC
079F   94 35      INITLP4 CALL  GETCHAR            GET RECEIVED CHARACTER
07A1   D3 06             XRL    A,#ACK
07A3   C6 AB             JZ     INIT4              EXIT WHEN ACK RECEIVED
07A5   ED 9F             DJNZ   R5,INITLP4
07A7   EC 9F             DJNZ   R4,INITLP4
07A9   E4 99             JMP    INITLP2            RE-SEND 'HELLO'
07AB              INIT4
07AB   89 40             ORL    P1,#GREEN          TURN ON GOOD READ LITE
07AD   83                RET
                  *
                  * IF NOT PORTABLE THEN WAIT FOR TRIGGER SWITCH TO BE RELEASED FOR 100MS.
                  * RETURN WHEN TRIGGER SWITCH IS DEPRESSED.
                  *
07AE              WAIT
                  * WAIT FOR TRIGGER TO BE RELEASED
07AE   BE 0C      WAITDF  MOV   R6,#12             100MS COUNTER
07B0   F4 CB      WAITLP2 CALL  TRIGGER            GET TRIGGER SWITCH
07B2   96 AE             JNZ    WAITDF             TRIGGER SWITCH ON - START 100MS OVER
07B4   EF B0             DJNZ   R7,WAITLP2
07B6   EE B0             DJNZ   R6,WAITLP2
                  * WAIT FOR TRIGGER OR DC2 (HANDLE DISABLE CHARACTER)
07B8   99 DF      WAITON  ANL   P1,#-1-RED         IF DISABLE RECEIVED THEN
07BA   94 35             CALL   GETCHAR            WAIT AT 'GETCHAR' WITH READY LITE OFF
07BC   89 20             ORL    P1,#RED            UNTIL ENABLE IS RECEIVED.
07BE   D3 12             XRL    A,#DC2             EXIT IF DC2 RECEIVED
07C0   C6 CA             JZ     WAITRET
07C2   BF 00             MOV    R7,#0              DELAY SO THAT DUTY CYCLE OF LOCP
07C4   EF C4             DJNZ   R7,$               HAS LITE ON MOST OF TIME.
07C6   F4 CB             CALL   TRIGGER            OFF FOR 100MS - WAIT FOR ON
07C8   C6 B8             JZ     WAITON
07CA   83         WAITRET RET
                  *
                  * READ TRIGGER SWITCH - RETURN TRUE/FALSE IN ACCUMULATOR
                  *
07CB   0A         TRIGGER IN    A,P2               TRIGGER SWITCH PORT
07CC   37                CPL    A                  TRIGGER SWITCH IS NEGATIVE LOGIC
07CD   53 40             ANL    A,#TRIGH           MASK OFF ALL BUT TRIGGER SWITCH BIT
07CF   83                RET
```

```
                       *
                       *
                       *
07D0  B9 27            TYPESTR  MOV   R1,#CHARTYP
07D2  43 30                     ORL   A,#'0'          MAKE ASCII NUMERIC
07D4  A1                        MOV   @R1,A
07D5  83                        RET
                       *
                       *
                       *
07D6  B9 27            TYPEOR   MOV   R1,#CHARTYP
07D8  41                        ORL   A,@R1           .OR. TYPE CHARACTER WITH ADDON CODE IN ACCUM
07D9  A1                        MOV   @R1,A
07DA  83                        RET
                       *
                       *
                       *
07DB  B9 28            F1STR    MOV   R1,#CHARF1      STORE EAN-13 F1 CHARACTER
07DD  A1                        MOV   @R1,A           OR UPC-E NUMBER SYSTEM NUMBER
07DE  83                        RET
                       *
                       *
                       *
07DF  B9 2F            CHK2STR  MOV   R1,#CHARBEG+6   STORE UPC-E CHECK DIGIT TO RIGHT
07E1  A1                        MOV   @R1,A           OF #DDDDDD.
07E2  19                        INC   R1
07E3  B1 0D                     MOV   @R1,#EOD        STORE EOD
07E5  83                        RET
                       *
                       *
                        IF (S-1)/(0*256)
                        ENDIF
                       END
07E6                   RDXI1    EQU   END-BEGIN
07E6                   *
                       *          SPARKLE/TERMINAL INTERFACE DESCRIPTION
                       *
                       *
                       *        BARCODE        ----------         ----------
                       *       : :  : :::      :        :  LINK   :          :
                       *       : :  : :::----->: SPARKLE :<-------->: TERMINAL :
                       *       : :  : :::      :        :         :          :
                       *                       ----------         ----------
                       *
                       *SPARKLE        IS THE HAND HELD BARCODE READER.
                       *
                       *TERMINAL       IS ANY DEVICE WHICH WILL RECEIVE THE DECODED
                       *               BARCODE TRANSMITTED BY SPARKLE.
                       *
                       *LINK           IS THE INTERFACE OVER WHICH DATA FLOWS BETWEEN
                       *               SPARKLE AND TERMINAL.  DATA TRANSMITTED BY
                       *               SPARKLE TO THE TERMINAL IS CALLED TRANSMIT
                       *               DATA (TAD).  DATA TRANSMITTED BY THE TERMINAL TO
                       *               SPARKLE IS CALLED RECEIVE DATA (RAD).
                       *
                       *
                       *SPARKLE OPERATION
                       *               SPARKLE READS BARCODES PLACED IN FRONT OF IT WHEN THE
                       *               TRIGGER SWITCH IS DEPRESSED BY THE OPERATOR.  SPARKLE
                       *               WILL THEN TURN OFF THE READY AND ERROR LIGHTS AND FLASH
                       *               A BRIGHT, SHORT DURATION LIGHT TO ILLUMINATE AND READ
                       *               THE BARCODE IN FRONT OF IT.  THE BARCODE MUST BE IN THE
                       *               FIELD OF VIEW OF SPARKLE WHICH IS 2.5".  EACH CONTRASTING
```

```
*            EDGE IN THE FIELD OF VIEW IS STORED AS A COUNT IN SPARKLE'S
*            MEMORY.  SPARKLE CAN STORE 190 COUNTS.  THE COUNTS ARE
*            STORED FROM LEFT TO RIGHT AS THE OPERATOR WOULD VIEW THE
*            BARCODE. IT IS IMPORTANT TO NOTE THAT ANY EXTRANEOUS EDGES
*            TO THE LEFT OF THE BARCODE THAT ARE IN SPARKLE'S FIELD OF
*            VIEW WILL USE UP COUNTS SUBTRACTING FROM THE STORAGE
*            AVAILABLE FOR THE ACTUAL BARCODE'S COUNTS.
*
*
*               BARCODE         SPARKLE
*                         ----------------
*                                          \
*                 :       :                 \
*                 :<------:-L LIGHT SOURCE   \
*                 :-------:--->: SENSOR ARRAY \
*                 :       :                    \
*                         ------------          \
*                                     \          \
*                 :       :            \          \
*                 :<----->:             \          \
*                   FOCUS                \          \
*                 1.0 TO .5"              \          \
*                                          ----------
*
*            SPARKLE WILL TRY TO DECODE THE BARCODE.  IF SUCCESSFULL,
*            IT WILL TRANSMIT THE DECODED BARCODE TO THE TERMINAL.  IF
*            SPARKLE IS UNSUCCESSFULL OR THE TERMINAL INDICATES A BAD
*            READ THEN SPARKLE WILL RE-FLASH AND DECODE THE BARCODE
*            UPTO 20 TIMES AT A RATE OF 4 TIMES PER SECOND FOR AS LONG
*            AS THE TRIGGER SWITCH IS DEPRESSED.  AFTER A GOOD READ
*            SPARKLE WILL TURN THE READY LIGHT ON AND EMIT A SHORT BEEP.
*            AFTER AN UNSUCCESSFULL READ SPARKLE WILL TURN ON THE READY
*            AND ERROR LIGHTS - NO BEEP.  AFTER A BARCODE READ ATTEMPT
*            THE TRIGGER SWITCH MUST BE RELEASED FOR 100MS BEFORE SPARKLE
*            WILL INITIATE ANOTHER BARCODE READ CYCLE.
*
*
*
*LINK ELECTRICAL SPECIFICATION
*            REFER TO THE SCHEMATIC DIAGRAM FOR SPARKLE.  DATA
*            IS RECEIVED/DRIVEN BY A SN75117N OVER A BALANCED
*            2-WIRE SHIELDED, TWISTED WIRE PAIR WITH A 120 OHM
*            TERMINATION RESISTOR.  A LOW LEVEL (START BIT/SPACE)
*            IS 0V.  A HIGH LEVEL (STOP BIT/MARK) IS +5V.
*
*LINK DATA FORMAT
*            START/STOP ASYNC,
*            7 BIT ASCII,
*            EVEN PARITY,
*            1 STOP BIT,
*            1200 BAUD.
*
*
*LINK DATA PROTOCOL
*            SPARKLE SUPPORTS HALF-DUPLEX DATA COMMUNICATION, IE.,
*            IT CANNOT RECEIVE AND TRANSMIT DATA SIMULTANEOUSLY.
*            THEREFORE, THE TERMINAL MUST NOT TRANSMIT TO SPARKLE
*            WHILE SPARKLE IS TRANSMITTING A CHARACTER.  IF IT DOES,
*            THEN THE TWO DATA CHARACTERS WOULD BE WIRE-ORED CAUSING
*            AN ERROR OR MISSED CHARACTER FOR THE TERMINAL AND
*            SPARKLE.  THE LEADING EDGE OF THE RAD START BIT CAUSES
*            AN INTERRUPT TO SPARKLE WHICH CAUSES SPARKLE TO
*            PROCESS THE RECEIVED CHARACTER.  CHARACTERS WITH PARITY
*            OR FRAMING ERRORS AND CHARACTERS THAT ARE NOT PART OF
*            THE PROTOCOL SET ARE IGNORED.
```

```
*
*               THE TERMINAL CAN "LOCK-UP" SPARKLE BY HOLDING RXD LOW.
*               SPARKLE WILL REMAIN DEDICATED TO RXD (IT WILL NOT BE
*               ABLE TO CONTINUE PROCESSING OR RESPOND TO OPERATOR
*               REQUESTS) UNTIL RXD GOES HIGH.  SPARKLE DOES DISABLE
*               THE RXD INTERRUPT WHILE IT IS TRANSMITTING A
*               CHARACTER; BETWEEN CHARACTERS IT IS ENABLED.
*
*               ANY CHARACTER TRANSMITTED BY THE TERMINAL TO SPARKLE
*               WHILE THE INTERRUPT IS DISABLED WILL CAUSE AN INTERRUPT
*               WHEN ITS DATA BIT STREAM GOES LOW AFTER THE INTERRUPT
*               IS ENABLED.  THIS WILL MOST LIKELY BE DEMODULATED AS AN
*               ERROR BY SPARKLE BECAUSE OF THE LOSS OF START BIT EDGE
*               SYNCHRONIZATION.
*
*LINK PROTOCOL CHARACTER SET
*               HEX ASCII USE
*               03  ETX    RESET SPARKLE - FROM TERMINAL
*               05  ENQ    SEND ID - FROM TERMINAL
*               06  ACK    MESSAGE OK - FROM TERMINAL
*               07  BEL    POWER UP MESSAGE - FROM SPARKLE
*               0A  LF     LINE FEED - FROM SPARKLE
*               0D  CR     CARRIAGE RETURN - FROM SPARKLE
*               11  DC1    ENABLE SPARKLE - FROM TERMINAL
*               12  DC2    INITIATE READ CYCLE - FROM TERMINAL
*               13  DC3    DISABLE SPARKLE - FROM TERMINAL
*               15  NAK    MESSAGE NOT OK - FROM TERMINAL
*               30  0      ALPHANUMERIC AND SPECIAL - FROM SPARKLE
*               .   .      .
*               .   .      .
*               .   .      .
*               5A  Z      ALPHANUMERIC AND SPECIAL - FROM SPARKLE
*
*
*       POWER UP
*               WHEN POWERED UP SPARKLE WILL TURN ON THE READY AND ERROR
*               LIGHTS THEN BEEP 3 TIMES.  AFTER THIS, SPARKLE WILL
*               TRANSMIT AN ASCII BELL CHARACTER EVERY 5SECS UNTIL AN
*               ASCII ACK IS RECEIVED.  SPARKLE WILL THEN TURN OFF THE
*               ERROR LIGHT AND BE READY TO READ BARCODES.
*
*       DC1, DC3
*               TRANSMITTING A DC3 TO SPARKLE WILL DISABLE SPARKLE FROM
*               TRANSMITTING DATA OR READING BARCODES UNTIL A DC1 IS
*               RECEIVED.  ANY TIME SPARKLE IS WAITING FOR A DC1 THE READY
*               LIGHT WILL BE OFF; THE ERROR LIGHT MAY BE ON OR OFF
*               DEPENDING ON THE STATUS OF THE LAST BARCODE READ.
*
*       DC2
*               WHEN WAITING FOR THE TRIGGER TO BE DEPRESSED, SPARKLE
*               WILL RESPOND TO RECEIVING A DC2 THE SAME AS THE TRIGGER
*               BEING DEPRESSED.
*
*       ETX
*               AN ASCII ETX RECEIVED AT ANY TIME WILL CAUSE SPARKLE TO
*               RESET THE SAME AS IF POWERED OFF THEN ON.
*
*       ENQ
*               IF AN ENQ IS RECEIVED, SPARKLE WILL SEND A MESSAGE INDICATING
*               THE PROGRAM NAME AND VERSION.
```

```
*
*SCAN BARCODE FORMAT
*                   A DECODED BARCODE IS TRANSMITTED AS A SEQUENCE OF ASCII
*                   CHARACTERS AS FOLLOWS:
*
*
*                   DECODED BARCODE CHARACTER STREAM
*
*                           T B...B H CR LF
*
*                   WHERE:
*                   T IS THE BARCODE TYPE - 1 ASCII CHARACTER.
*                   B IS THE NUMERIC CONTENT OF THE BARCODE.
*                   H IS AN ASCII MODULOUS 10 HASH OF T AND B.
*                   R IS AN ASCII CR.
*                   L IS AN ASCII LF.
*
*
*                   TYPE (T)                FORMAT (B...B)
*                   0 = UPC SHORT           NDDDDDDC
*                   1 = EAN SHORT           FNDDDDDC
*                   2 = UPC LONG            NDDDDDDDDDDC
*                   3 = EAN LONG            FNDDDDDDDDDDC
*                   4 = UPC SHORT ADDON=2   NDDDDDDCAA
*                   5 = EAN SHORT ADDON=2   FNDDDDDCAA
*                   6 = UPC LONG ADDON=2    NDDDDDDDDDDCAA
*                   7 = EAN LONG ADDON=2    FNDDDDDDDDDDCAA
*                   8 = UPC SHORT ADDON=5   NDDDDDDCAAAAA
*                   9 = EAN SHORT ADDON=5   FNDDDDDCAAAAA
*                   : = UPC LONG ADDON=5    NDDDDDDDDDDCAAAAA
*                   ; = EAN LONG ADDON=5    FNDDDDDDDDDDCAAAAA
*                   * = BAD (PORTABLE ONLY) (NO DATA)
*
*
*                           WHERE:
*                           N IS THE NUMBER SYSTEM DIGIT
*                           D ARE THE BARCODE DIGITS
*                           C IS THE CHECK DIGIT
*                           F IS THE EAN FLAG 1
*                           A ARE THE ADDON CODE DIGITS
*
*
*
*           BARCODE TRANSMISSION
*                   THE DECODED BARCODE DATA STREAM IS TRANSMITTED AS A
*                   CONTINUOUS CHARACTER STREAM.  AFTER SPARKLE HAS
*                   TRANSMITTED THE BARCODE IT WILL WAIT FOR EITHER AN
*                   ASCII ACK OR NAK FROM THE TERMINAL.  IF A VALID ACK
*                   IS RECEIVED THEN SPARKLE WILL INDICATE A GOOD READ.
*                   IF A NAK OR NO VALID RESPONSE IS RECEIVED WITHIN HALF
*                   OF A SECOND THEN SPARKLE WILL CONSIDER THE READ TO BE
*                   BAD.  IF SPARKLE IS IN THE PORTABLE MODE (TO STRAPPED
*                   LOW), THEN SPARKLE WILL RE-SEND THE DATA ON A NAK AFTER
*                   A 10MS DELAY RATHER THAN RE-READ THE BARCODE.
*
*
*
*        1         2         3         4         5         6         .7
*...5....0....5....0....5....0....5....0....5....0....5....0....5....0..
*
*
* FOP                               FOR 2'S COMP VALUE IN ACCUMALATOR
*       CPL     A                   JC = A<=B; JNC A>B
```

```
                    INC     A               FOR 2'S COMP VALUE NOT IN ACCUMULATOR
                    ADD     A,H             JC = A<B; JNC = A>=B
              ; OR
                    MOV     A,B-VALUE
                    ADD     A,B
              ; THEN
                    JC      A<=B
                    JNC     A>B
              ;
              ; FOR
                    ADD     A,B-VALUE
              ; THEN
                    JC      A=>B
                    JNC     A<B
              ;
              ;
01EB                END
```

CROSS REFERENCE

```
LABEL      VALU      REFERENCE

ACK        0006      -122   599    601   1946
ADDUN2     0004      -150   1866
ADDUN5     0008      -151   1906
ADDP18     0029      -172   1750   1871
ADJ2       00C2       365    367   -369
ADJ4       00C6       366   -370
ADJAX      00C8       363   -373
ADJLP      00B7      -362    372
ADJUST     00B5       212   -361
BACKCHR    0080      -153    760
BACKSB     0020      -174   1394   1474   1815
BARBIT     0010      -119    282   1929
BEEP       0400       420  -1041   1933   1935   1937
BEEPEN     0080      -106   1042   1045   1810
BEEPIP     0402     -1042   1049
BEGIN      0000      -192   2017
BEGIN2     0005       195   -197
BEL        0007      -132   1941
C1EQ1      0282       667    670   -690
C2EQ1      028E       685   -700
C3EQ1      02A5       673    676   -718
C3EQ7      02A7       717   -719
CHAD2IB    0245      -645   1861   1892
CHAD3IB    0243      -644   1891
CHADEOR    04DC       555  -1244   1911
CHAN       0249       633    634    635    636    637    638   -640
CHAN2      0299       679   -709
CHAN4      02B1       695    708   -729
CHAN41B    0236       476    477   -635
CHAN6      0206       756    761   -766
CHAN61B    0232       436    439    496    568   -633
CHANADD    0036      -182    589    948   1002   1155   1163   1244   1466
CHANBEG    0029      -179    442    447    450    452    480    485    512
                      522    570    574   1125   1146   1428   1462   2007

CHANEN1    02D3       659   -762
CHANENR    02D4       654    664    688    715   -763
CHANEX     02E3       649   -779
CHANF1     0028      -176    465    951   2001
CHANI      0247       644    645   -646
CHANP1B    0023      -171    767   1461   1467
CHANS      0027      -176    587
```

```
CHANTYP   0027     -177   551  1987  1994
CHKA13    03A3      460  -983
CHKAP5    03BF     -992  1902
CHKEN     03A1      486  -982
CHKZ012   03B6      510  -980
CHKZ3     03B7      532  -969
CHKZ4     03AC      534  -986
CHKZ59    03A6      510  -985
CHKZS1R   070F     1132  1140 -2007
CHR1ANB   0355      756  -889
CHR1ANF   0346      752  -877
CLOCK     0001     -113   256   258   259   263   265   272   276
                    298  1925
CLRBACK   05B0      470 -1394
CNTBEG    003C     -185   253   323   326   361   417  1072  1826
                   1835
CNTEND    0100     -186   291
CNTEOD    00F9      299   352 -1804
CNTMGND   087F     1582  1601  1616  1641 -1652
CR        0000     -140  1316
DC1       0011     -126  1309
DC2       0012     -128  1970
DC3       0013     -130  1297  1299
DCHKLP2   04A4    -1170  1176
DEBUG     0000       -3   202   213   419   544   556   584   764
                    775   856   867   976  1160  1186  1195  1206
                   1226  1816  1840
DECAD2    0731    -1856
[illegible] 0758  -1888
DECADER   077A     1845  1848  1863  1867  1874  1877  1884  1894
                   1898  1905 -1911
DECHKAD   0700     1819 -1827
DECDAD2   071C     1825 -1836
DECDAD4   074B     1854 -1871
[illegible] [illegible]  542 -1815
DECDADY   077E     1869 -1907
DECDERR   01BC      423   455   456   459   463   479   483   508
                    511   515   521  -549
DECDOK    01BA     -543
DECDT     01B4      471   473   491  -539
[illegible] [illegible]  215  -416
DECODLP   0104     -414   441   540
DECTAB    0114      479  -434
DELAY     081C     1055  1057 -1059
DELAY1    081A      806 -1058
[illegible] 0816    234 -1056
[illegible] 0812  -1054  1936  1938
DELP2     0810    -1060  1064
DELP4     081F    -1061  1063
DELTA1    0844      857   862 -1094
DELTENP   0460     1100 -1110
DELTOK    0464     1105  1109  1113 -1115
[illegible] [illegible] 1000 -1163
DIRAD5    0493    -1155  1096
DIRC12    0479     1131 -1135
DIRCE4    04CB     1216 -1221
DIRCHK    04A1     1127  1146  1157 -1165
DIRCHKE   0487      457 -1146
DIRCHK2   0467      497   574 -1125
DIRCLR    04C2    -1215  1220
DIRCOMP   04C2      451   573 -1214
DIRERR    0460     1189 -1196
DIRTAB5   0373     -925  1158
```

```
DIRIANE    0369    -913  1149
DIRIANZ    035B    -901  1128  1136
DIRIS4     04B0    1194 -1197
DIRISEX    04C0    1193 -1205
DIRISLP    04B2   -1191  1195  1197
DIRISI     04AE     443   453   461 -1185
DMPLP2     0430    1070 -1074  1080
DMPLP4     0432   -1075  1084
DMPLP8     0434   -1076  1082
DUMP6      043E    1080 -1082
DUMPC4     0428   -1069
DUMPCHTS   042C   -1071
DUMPFX     0448    1078 -1087
EAN        0001    -147   472   490
EANA       0153     433  -470
END        07F6   -2016  2017
ENO        0005    -133  1300  1302
EOD        0000    -143   554   774  1034  1245  1604  2016
EODPTR     0025    -173  1548  1605  1631  1639  1671
EOF        0167     404  -406
ETX        0003    -135  1441
FIBIR      070B     425  1134  1142  1151 -2001
FIL12      00A0     329  -338
FIL14      00A3     337  -340
FILT6      00A5     339  -341
FILTFOD    0082     331   343  -351
FILTER     0088     211  -323
FILTFX     0083     325  -352
FILTLP     0094    -330   345   350
FILTMAT    00AC     333  -348
FINDEND    037F     796  -836
FINDT      0300     650  -792
FINMIN     0306    -794   799
FLASH      0010    -109   263   265
FM4C4      0638    1575  1576  1584 -1586
FMAMBZ     069F     506  1622 -1636
FMANE      0605     421 -1546
FMANEND    066C    1558  1560 -1626
FMANLP4    [illegible] -1551  1612  1624
FMANLP6    0600   -1555  1564
FMANOK     066A    1586  1605  1620 -1625
FMANPTR    0024    -170   416   502  1551  1623  1627  1636  1657
                   1607
FMBZFX     007E    1643 -1648
FMBZ       0652    1594  1597  1603 -1607
FMZ6G      0666    1616 -1624
GARB2      069F    1696 -1700
GARBFMR    06B9    1714  1721 -1725
GETCH2     0546    1301 -1304
GETCHAR    0535     598 -1286  1945  1966
GETCLP2    054A    1298 -1307  1310
GREEN      0040    -107   209   225   230  1925  1938  1952
GUARD      0698    1652  1655  1658  1663  1671 -1695
HEXIMM     0525    1273  1278 -1283
IDNLRG     03E0   -1034  1314
INCHAR     0020    -167  1298  1943  1923
INIT       077F     197 -1916
INIT2      0799    1912 -1915
INIT4      07A6    1947 -1951
INITLP2    0799   -1941  1950
INITLP4    079F   -1945  1948  1949
INT        05B5     195 -1410
INTDA1     05C1    1410 -1419
```

```
INTUAT0    05CF     1424 -1426
INTUAI4    05D4     1427 -1432
INTULP     05C6    -1424  1436
INTERN     05F9     1417  1436 -1446
INTLP      05B9    -1419
INTR81     05E8     1442 -1451
LEFGEX     0697     1673 -1675
LEFIGND    0691     1562 -1671
LP         000A    -141   1316
LONG       0002    -149   970    972
MAD2FNR    03D9     1014 -1016
MCHK2      0391     955  -962
MCHK4      0396     963  -967
MCHKAD2    03C4    -1000  1065
MCHKAD5    0370    -940   1903
MCHKFX     03A0     971  -975
MCHKLP2    0386     950  -953   966
MCHKLP4    038C    -956   960
MODCHK     0382    -461   489  -537  -951
NAK        0015    -124   602
NULL       0000    -137   1924
OUT2       0572     1340 -1343
OUT4       0576     1342 -1346
OUT6       0583     1351 -1354
OUT8       0587     1353 -1357
OUTAREX    03F5     1028 -1032
OUTCDAS    0504    -1254
OUTCHAR    0550     594   1029  1254  1256  1261  1265  1275  1280
                    1317 -1325  1387  1942
OUTCLIN    0506    -1265
OUTDASH    04A6    -1255
OUTERN     0500    -1251
OUTHFA     0512     1077 -1270  1371
OUTID      0551     1306 -1314
OUTLINE    0585     595   1085  1087  1266 -1316
OUTLP      056B    -1339  1348
OUTSB      0BAA     1081  1083  1452 -1460
OUT3AN     03DC    -1026  1031  1315
OUAERN     06F6     1782  1790  1793 -1797
OUIETA     06E1    -1779  1652  1682
OUIETC     06D3     1740 -1759
OUIETER    06DE     1759  1761  1764 -1766
OUIETL     06BC     1674 -1738
OUIETN     06C0     1660 -1747
R6R7ENR    00D2     384  -406
RAVSK1     00C9    -379   685   713
RANBEG     0070    -159   166
RANEND     0100    -160
RDSLBA     00A9    -258   260   261
ROXIL      07E0    -2017
READ       0036     210  -246
READ2      0060     279  -281
READ6      0070     285  -293
READEX     0084     292  -296
READLP     0058    -269   293   294
RECHANG    0004    -111   255   274   275   290   1925
RED        0020    -108   209   1925  1967  1969
RITEGND    068A     1576  1595  1610 -1663
RITGFA     0690     1065 -1067
ROMBEG     0000    -156   191
SAMPLE     0006    -110   270   271
SCAN       0007    -201   227   237
SCAN2      0006     205  -207
```

```
SCAN4      0010      217  -220
SCANLP2    0011     -210   235
SCHERR2    0029      219   222  -226
SCHERR4    0037      229   233  -236
SEND       0280      270  -583   607
SENDM4     05AC     1381 -1388
SENDREX    05AF     1379 -1390
SENDRUF    059E      586   590 -1376  1389
SENDTHR    0220      605  -614
SENDREX    0595    -1369  1373
SENDOK     0238      600  -616
SENDR4     0227      603  -606
SENDRLP    0215     -596   609   610   611
SENHEX     0590     1370 -1374
SETAPIR    05F8    -1467  1856  1886
SETBACK    0600      449   487   569 -1474
SETCRMD    05FA      427   565 -1461
SHORT      0000     -148   490   536
SP         0020     -142  1260
STACK      0908     -165  1451
START      0002     -114   255   257   263   266
SWAP       04CC      448   486   571 -1225
SWAPEX     04BB     1233 -1240
SWAPLP     04CB    -1229  1239  1836
TABEND     0343      854  -864
TABELP7    033B     -849   854
TABSRCH    0334      753   759  -846  1129  1139  1150  1159
TRIGGER    07C8      428  1962  1974 -1980
TRIGR      0028     -118  1929  1982
TRYB       0021     -168   407   430
TAD        0080     -116  1334  1341  1343  1352  1354  1360  1929
TAPE       0049     -117  1332  1363
TYPEOK     07D6     1907 -1994
TYPESTR    07D0      541 -1987
UECU12     01AE      526  -530
UEC3       01A8      527  -532
UEC4       01AA      529  -534
UECC       01B0      531   533   535  -537
UECHK      0194      500   516  -522
UEPZ       0179      490  -502
UELM       012B      443  -447
UELEANL    013F      460  -474
UELF       0138      440  -457
UPC        0000     -140   470   516
UPCBFA     01DA      568  -575
UPCUM      01C8      509   519  -565
UPCLANL    0118      432  -436
UPCLB      0190      434  -519
UPCLF      016F      435  -494
VECTOR3    0003     -157   194
VECTOR7    0007     -156
WAIT       07AE      206 -1959
WAITLP2    07B0    -1962  1964  1965
WAITOF     07AE    -1961  1963
WAITON     07B8    -1967  1975
WAITRET    07CA     1971 -1976
ZERDEA     00B9     1654  1657 -1659

                         ***** ERROR LIST *****

LINE  ADDR  ERR

# ASSEMBLER ERRORS =    0
```

What we claim:

1. In portable bar code reader system, (a) a hand-held bar code reader having an elongated hand grip portion for grasping in the hand of a user and having a reader head portion connected with said elongated hand grip portion, (b) said elongated hand grip portion having a length and cross sectional configuration so as to be grasped by the hand with the fingers in gripping relation thereto, (c) said hand-held bar code reader having a bar code sensing region, and having a window to be directed toward a bar code in said sensing region and providing for transmission of light between the bar code sensing region and the interior of the reader head portion, (d) a photodetector positioned within said reader head portion for sensing light reflected from a bar code located within said bar code sensing region, so as to generate a bar code signal representing the bar code, (e) said hand-held bar code reader having a reflected light path therein from the window to the photodetector, and having an optical system positioned in said reflected light path between said window and said photodetector for receiving light reflected from a bar code in said bar code sensing region during a bar code reading operation and for directing the reflected light onto said photodetector for sensing thereby while the reader head portion is substantially spaced from the bar code and free of any contact with the bar code carrier, and without requiring any movement of the hand-held bar code reader as a whole to effect a complete bar code reading operation, (f) a printed circuit board in said hand-held bar code reader having circuitry thereon connected with said photodetector for transmitting the successive bar code signals generated by said photodetector, and (g) said printed circuit board having said optical system mounted thereon, and having said photodetector secured therewith, so that the printed circuit board, optical system and photodetector comprise a unitary mounting framework for mounting in the bar code reader.

2. In a portable bar code reader according to claim 1, said photodetector having pins directly extending into holes of said printed circuit board.

3. In a portable bar code reader according to claim 1, said reader head portion having a light source supplying light via an outgoing light path to said sensing region.

4. In a portable bar code reader according to claim 3, said optical system defining a reflected light path of length between the window and the photodetector which substantially exceeds the direct distance between the window and the photodetector.

5. In a portable bar code reader according to claim 4, said optical system, said light source, and said photodetector all occupying a space within the reader head portion, said reader head portion having a width not substantially greater than a value of the order of three inches and a length not substantially greater than a value of the order of two and one quarter inches.

6. In a portable bar code reader according to claim 5, said elongated hand grip portion having width and height dimensions tapering from a maximum cross section to a substantially reduced cross section in a direction toward a rear end of the elongated hand grip portion.

7. In a portable bar code reader according to claim 1, said reader head portion having a light source supplying light via an outgoing light path to said sensing region, said hand-held bar code reader having portable battery power supply means for supplying energizing power to said light source, and said hand-held bar code reader, exclusive of said portable battery power supply means, having a weight not exceeding a value of the order of eight ounces.

8. In a portable bar code reader according to claim 6, said reader head portion having a top surface portion which extends at a substantial acute angle to the horizontal when the hand-held bar code reader is oriented in scanning relation to a bar code having a vertical disposition, so as to facilitate observation of a bar code as the hand-held bar code reader is placed in scanning relation to such a bar code by the user.

9. In a portable bar code reader according to claim 8, said optical system comprising a mirror in the reflected light path extending near the top of the space within the reader head portion and spaced rearwardly from the window for receiving reflected light transmitted through the window from a bar code and for directing such reflected light from a bar code downwardly and forwardly within said reader head portion.

10. In a portable bar code reader according to claim 9, said hand-held bar code reader having portable battery power supply means for supplying energizing power to said light source, and said hand-held bar code reader, exclusive of said portable battery power supply means, having a weight not exceeding a value of the order of eight ounces.

11. In a portable bar code reader according to claim 1, said reader head portion having a top surface portion which extends a substantial acute angle to the horizontal when the hand-held bar code reader is oriented in scanning relation to a bar code having a vertical disposition, so as to facilitate observation of a bar code as the hand-held bar code reader is placed in scanning relation to such a bar code by the user.

12. In a portable bar code reader according to claim 1, said hand-held bar code reader having portable battery power supply means for supplying energizing power to said reader, and said hand-held bar code reader, exclusive of said portable battery power supply means, having a weight not exceeding a value of the order of eight ounces.

13. In a portable bar code reader according to claim 1, said hand-held bar code reader being part of a completely portable bar code reader system which is completely portable without requiring any connecting wires to stationary equipment.

14. In a portable bar code reader according to claim 1, said optical system comprising a narrow optical aperture with a height parallel to the bars of a bar code of a value of the order of four millimeters.

15. In a portable bar code reader according to claim 1, said hand-held bar code reader being operative to collect light energy from a bar code sensing region defined by convergent marginal reflected light paths forming respective angles to a central light path of values in the range from about ten degrees to about twenty degrees.

16. In a portable bar code reader according to claim 1, said unitary mounting framework supporting a filter in the reflected light path between the window and the photodetector, serving to block wavelengths greater than a value of the order of seven hundred nanometers from reaching the photodetector.

17. In a portable bar code reader according to claim 1, said optical system defining a reflected light path of length between the window and the photodetector which substantially exceeds the direct distance between the window and the photodetector.

18. In a portable bar code reader according to claim 1, said reader head portion having a light source supplying light via an outgoing light path to said sensing region, said optical system, said light source, and said photodetector all occupying a space within the reader head portion, said reader head portion having a width not substantially greater than a value of the order of three inches and a length not substantially greater than a value of the order of two and one quarter inches.

19. In a portable bar code reader according to claim 1, said elongated hand grip portion having width and height dimensions tapering from a maximum cross section to a substantially reduced cross section in a direction toward a rear end of the elongated hand grip portion.

20. In a portable bar code reader according to claim 1, said reader head portion having a top surface portion which extends at a substantial acute angle to the horizontal when the hand-held bar code reader is oriented in scanning relation to a bar code having a vertical disposition, so as to facilitate observation of a bar code as the hand-held bar code reader is placed in scanning relation to such a bar code by the user.

21. In a portable bar code reader according to claim 1, said optical system comprising a mirror in the reflected light path extending near the top of the space within the reader head portion and spaced rearwardly from the window for receiving reflected light transmitted through the window from a bar code and for directing such reflected light from a bar code and for directing such reflected light from a bar code downwardly and forwardly within said reader head portion.

22. In a portable bar code reader system, (a) a hand-held bar code reader having an elongated hand grip portion for grasping in the hand of a user and having a reader head portion connected with said elongated hand grip portion, (b) said elongated hand grip portion having a length and cross sectional configuration so as to be grasped by the hand with the fingers in gripping relation thereto, (c) said hand-held bar code reader having a bar code sensing region, and having a window to be directed toward a bar code in said sensing region and providing for transmission of light between the bar code sensing region and the interior of the reader head portion, (d) a photodetector positioned within said reader head portion for sensing light reflected from a bar code located within said bar code sensing region, so as to generate a bar code signal representing the illuminated bar code, (e) said hand-held bar code reader having a reflected light path therein from the window to the photodetector, and having an optical system positioned in said reflected light path between said window and said photodetector for receiving light reflected from a bar code in said bar code sensing region during a bar code reading operation and for directing the reflected light onto said photodetector for sensing thereby while the reader head portion is substantially spaced from the bar code and free of any contact with the bar code carrier, and without requiring any movement of the hand-held bar code reader as a whole to effect a complete bar code reading operation, said optical system comprising a reflecting mirror aligned with said window and spaced a substantial distance from the window for receiving reflected light as it travels from the window, and for redirecting the reflected light generally toward a frontal end of the reader head portion, (f) a printed circuit board in said hand-held bar code reader having circuitry thereon connected with said photodetector for transmitting the successive bar code signals generated by said photodetector, and (g) said printed circuit board having said photodetector secured thereto, and having said optical system fastened thereto so that the reflecting mirror is positioned relative to the photodetector by virtue of their common association with the printed circuit board.

23. In a portable bar code reader system according to claim 22, said photodetector having pins directly extending into holes of said printed circuit board, and electrically connecting with said circuitry on said printed circuit board via said pins.

24. In a portable bar code reader system according to claim 22, said reader head portion having only one printed circuit board therein.

25. In a portable bar code reader according to claim 22, said optical system defining a reflected light path of length between the window and the photodetector which substantially exceeds the direct distance between the window and the photodetector.

26. In a portable bar code reader according to claim 22, a light source having associated circuit components on the printed circuit board and connected therewith, said optical system, said light source, and said photodetector all occupying a space within the reader head portion, said reader head portion having a width not substantially greater than a value of the order of three inches and a length not substantially greater than a value of the order of two and one quarter inches.

27. In a portable bar code reader according to claim 26, said reader head portion which contains the optical system, the light source and the photodetector having a maximum height dimension of not greater than about one inch.

28. In a portable bar code reader according to claim 27, said reader head portion having a configuration at its top side which is unobstructed so as to facilitate observation of a bar code over the top side of the reader head portion as the hand-held bar code reader is placed in scanning relation to such a bar code by the user.

29. In a portable bar code reader according to claim 28, said reflecting mirror in the reflected light path extending in an upper portion of the space within the reader head portion and spaced rearwardly from the window for receiving reflected light transmitted through the window from a bar code and for directing such reflected light from a bar code downwardly and forwardly within said reader head portion such that the reflected light path has a folded configuration.

30. In a portable bar code reader according to claim 29, said hand-held bar code reader having portable battery power supply means for supplying energizing 34. In a portable bar code reader according to claim 22, said printed circuit board having a filter in the reflected light path between the window and the photodetector, serving to block wavelengths greater than a value of the order of seven hundred nanometers from reaching the photodetector, said filter being secured with said printed circuit board so as to be removable from the reader head portion as a unit therewith.

35. In a portable bar code reader according to claim 22, said reader head portion having a light source supplying light via an outgoing light path to said sensing region, means secured with said printed circuit board for limiting the effective cross section of one of the outgoing light path and the reflected light path, said means providing a narrow rectangular optical aperture with a longer axis aligned with the long axis of the bars of the bar code when the hand-held bar code reader is oriented in scanning relation to a bar code.

36. In a portable bar code reader according to claim 35, said means secured with said printed circuit board providing a narrow rectangular optical aperture with a height parallel to the bars of a bar code of a value of the order of four millimeters.

* * * * * power to said light source, and said hand-held bar code reader, exclusive of said portable battery power supply means, having a weight not exceeding a value of the order of eight ounces.

31. In a portable bar code reader according to claim 22, said hand-held bar code reader having portable battery power supply means for supplying energizing power to said reader, and said hand-held bar code reader, exclusive of said portable battery power supply means, having a weight not exceeding a value of the order of eight ounces.

32. In a portable bar code reader according to claim 31, said hand-held bar code reader being part of a completely portable bar code reader system which is completely portable without requiring any connecting wires to stationary equipment.

33. In a portable bar code reader according to claim 22, said reflecting mirror being operative to collect light energy from a bar code sensing region defined by convergent marginal reflected light rays forming respective angles to a central longitudinal reflected light ray of values in the range from about ten degrees to about twenty degrees.

UNITED STATES PATENT AND TRADEMARK OFFICE

CERTIFICATE OF CORRECTION

PATENT NO. : 5,233,172

DATED : August 3, 1993

INVENTOR(S) : George E. Chadima, Jr.
Vadim Laser

It is certified that error appears in the above-identified patent and that said Letters Patent is hereby corrected as shown below:

Column 1, Section 60: in the Related U.S. Application Data, "August 6, 1994" should read August 6, 1984.

Signed and Sealed this

Thirtieth Day of August, 1994

Attest:

BRUCE LEHMAN

*Attesting Officer*

*Commissioner of Patents and Trademarks*